United States Patent
Bjornstad et al.

(10) Patent No.: US 9,967,638 B2
(45) Date of Patent: May 8, 2018

(54) OPTICAL SWITCHING

(71) Applicant: TransPacket AS, Oslo (NO)

(72) Inventors: Steinar Bjornstad, Bekkestua (NO); Jan Petter Braute, Oslo (NO)

(73) Assignee: TransPacket AS, Olso (NO)

( * ) Notice: Subject to any disclaimer, the term of this patent is extended or adjusted under 35 U.S.C. 154(b) by 0 days. days.

(21) Appl. No.: 15/375,415

(22) Filed: Dec. 12, 2016

(65) Prior Publication Data
US 2017/0094379 A1    Mar. 30, 2017

Related U.S. Application Data

(63) Continuation of application No. 13/983,228, filed as application No. PCT/GB2012/050202 on Jan. 31, 2012, now Pat. No. 9,521,093.

(30) Foreign Application Priority Data

Feb. 1, 2011  (GB) .................................. 1101709.2
Jun. 27, 2011  (GB) .................................. 1110854.5

(51) Int. Cl.
*H04Q 11/00*    (2006.01)
*H04L 12/935*   (2013.01)
(Continued)

(52) U.S. Cl.
CPC ..... *H04Q 11/0066* (2013.01); *H04B 10/2504* (2013.01); *H04L 47/628* (2013.01);
(Continued)

(58) Field of Classification Search
CPC ................................................ H04Q 11/0066
See application file for complete search history.

(56) References Cited

U.S. PATENT DOCUMENTS

| 5,900,957 A | 5/1999 | Van Der Tol |
| 5,917,804 A | 6/1999 | Shah |

(Continued)

FOREIGN PATENT DOCUMENTS

| WO | 2005/004363 | 1/2005 |
| WO | 2005/069561 | 7/2005 |
| WO | 2007/021199 | 2/2007 |

OTHER PUBLICATIONS

Bjornstad et al., "A Packet-Switched Hybrid Optical Network with Service Guarantees", IEEE Journal on Selected Areas in Communications, vol. 24, No. 8, pp. 97-107, (Aug. 2006).

(Continued)

*Primary Examiner* — Andrew Lai
*Assistant Examiner* — Andrew C Lee
(74) *Attorney, Agent, or Firm* — Diederiks & Whitelaw, PLC

(57) ABSTRACT

A network node comprises an optical input, an optical output, a random-access queue and processing system. It receives a data packet, at the optical input and determines whether to process it as a guaranteed-service packet or as a statistically-multiplexed packet. A guaranteed-service packet is output within a predetermined maximum time of receipt, optionally within a data container comprising container control information. A statistically-multiplexed packet is queued. The node determines a set of statistically-multiplexed packets that would fit a gap between two guaranteed-service packets; selects one of the packets; and outputs it between the two guaranteed-service packets.

21 Claims, 31 Drawing Sheets

(51) Int. Cl.
  *H04B 10/25* (2013.01)
  *H04L 12/863* (2013.01)
(52) U.S. Cl.
  CPC ..... *H04L 49/3036* (2013.01); *H04Q 11/0062*
    (2013.01); *H04Q 2011/0064* (2013.01); *H04Q*
    *2011/0083* (2013.01)

(56) References Cited

U.S. PATENT DOCUMENTS

| | | | |
|---|---|---|---|
| 6,580,535 | B1 | 6/2003 | Schonfelder |
| 6,654,374 | B1 | 11/2003 | Fawaz |
| 6,721,315 | B1* | 4/2004 | Xiong .................. H04L 49/254 370/389 |
| 6,728,270 | B1 | 4/2004 | Meggers |
| 7,046,665 | B1 | 5/2006 | Walrand |
| 7,215,637 | B1 | 5/2007 | Ferguson |
| 8,073,328 | B2 | 12/2011 | Bjornstad |
| 9,071,381 | B2 | 6/2015 | Bjornstad |
| 2001/0033581 | A1 | 10/2001 | Kawarai |
| 2002/0163933 | A1 | 11/2002 | Benveniste |
| 2003/0002577 | A1 | 1/2003 | Pinder |
| 2003/0048506 | A1 | 3/2003 | Handelman |
| 2003/0063348 | A1* | 4/2003 | Posey, Jr. ................ H04L 45/00 398/49 |
| 2003/0133406 | A1 | 7/2003 | Fawaz |
| 2003/0138253 | A1* | 7/2003 | Kim .................... H04J 14/0227 398/69 |
| 2004/0042460 | A1 | 3/2004 | Gruhl |
| 2004/0071469 | A1* | 4/2004 | Baldine ............... H04J 14/0227 398/79 |
| 2004/0095884 | A1* | 5/2004 | Lee .................... H04Q 11/0067 370/235 |
| 2004/0151171 | A1 | 8/2004 | Lee |
| 2004/0170165 | A1* | 9/2004 | Maciocco .......... H04Q 11/0066 370/389 |
| 2004/0258407 | A1* | 12/2004 | Maciocco .......... H04Q 11/0066 398/45 |
| 2004/0264960 | A1* | 12/2004 | Maciocco .......... H04Q 11/0066 398/49 |
| 2005/0018661 | A1 | 1/2005 | Kelley |
| 2005/0244158 | A1* | 11/2005 | Luft .................... H04B 10/032 398/59 |
| 2006/0159454 | A1 | 7/2006 | Bjornstad |
| 2007/0067487 | A1 | 3/2007 | Freebairn |
| 2007/0133557 | A1 | 6/2007 | Lee |
| 2007/0206602 | A1 | 9/2007 | Halabi |
| 2007/0212071 | A1 | 9/2007 | Guo |
| 2008/0198866 | A1 | 8/2008 | Shahar |
| 2009/0207866 | A1 | 8/2009 | Cholas |

OTHER PUBLICATIONS

Kimsas et al., "*Reservation Techniques in an OpMiGua Node*", Optical Network Design and Modeling: [Lecture Notes in Computer Science; LNCS], pp. 146-155, (May 2007).

Puleio, "*An Innovative Synchronization Technique for OpMiGua-Based Mobile Backhauls: The IEE 1588v2 HPTS Scheme*", pp. 1-96, (Jul. 2010).

Sheeshia et al., "*Synchronous Optical Burst Switching*", Proceedings on the First International Conference on Broadband Networks, First International Conference, pp. 4-13, ( Oct. 2004).

Nakahara et al., "*40-Gb/s 32-Bit Optical Packet Compressor-Decompressor Based on an Optoelectronic Memory*", IEEE Photonics Technology Letters, vol. 16, No. 7, pp. 1751-1753, (Jul. 2004).

Takenouchi et al., "*40-Gbits/s 32-Bit Optical Packet Compressor/Decompressor Based on a Photonic Memory*", Lasers and Electro-Optics, 2004 Conference, (May 2004).

Bjornstad et al., "*A Hybrid Packet/Time Slotted Circuit Switched Scheme (HPTS)*", ICTON, pp. 97-100, (2008).

Breusegem et al., "Emulation *of Overspill Routing in Optical Networks*", ECOC 2005 Proceedings, vol. 2, pp. 271-272.

Breusegem et al., "*Overspill Routing in Optical Networks: A True Hybrid Optical Network Design*", vol. 24, No. 4, pp. 13-25, (Apr. 2006).

Gauger et al., "*Hybrid Optical Network Architectures: Binging Packets and Circuits Together*", IEEE Communications Magazine, pp. 36-42, (Aug. 2006).

Nord et al., "*OpMiGua Hybrid Circuit-and Packet-Switched Test-Bed Demonstration and Performance*", IEEE Photonics Technology Letters, vol. 18, No. 24, pp. 2692-2692, (Dec. 2006).

\* cited by examiner

OPTICAL SWITCHING

CROSS-REFERENCE TO RELATED APPLICATION

This application represents a continuation application of U.S. patent application Ser. No. 13/983,228, now U.S. Pat. No. 9,521,093, entitled "Optical Switching" filed 1 Aug. 2013, which represents a U.S. National Stage Application of PCT/GB2012/050202 entitled "Optical Switching" filed 31 Jan. 2012. The entire contents of these applications are incorporated herein by reference.

BACKGROUND OF THE INVENTION

This invention relates to methods and apparatus for optical data switching.

Fibre optic networks have traditionally been used for the circuit-switched transport of data, e.g. in telecoms networks. Data travelling between two nodes follows a dedicated circuit or path through the network, from start to finish. This is a very reliable way of transporting data, since there is no contention between data travelling along different paths. The end-to-end transport delay is low and predictable.

However, circuit switching is usually wasteful of resources, since bandwidth must be reserved for a particular path even if that path is empty of traffic for much of the time.

An alternative model for directing network traffic is packet switching, in which packets of data are given a destination address and are allowed to travel along a "best effort" route from start to destination, as determined by routers or packet switches along the way. Packets from the same start node may follow different routes to the same destination at different times. At intermediate nodes, or routers, packets may be queued in a buffer, until there is capacity for them to be sent on their next hop. Packets may be dropped if they cannot be routed after a period of time. There is thus no guarantee of timely delivery for packets. Packet will not necessarily arrive in the order in which they were sent.

Packet switching is flexible in its use of available bandwidth, typically resulting in a more efficient use of resources than circuit switching. However, it is not well suited to traffic that must be delivered within a maximum delay period and with negligible packet loss, such as video-conferencing data, live broadcast data and synchronisation signals.

The present inventor has previously contributed to the development of a hybrid approach that combines the flexibility of packet switching with the reliability of circuit switching. This is described in "A Packet-Switched Hybrid Optical Network with Service Guarantees" by Steinar Bjornstad et al., IEEE J. Sel. Areas Commun., Supplement on Optical Communications and Networking, vol. 24, no. 8, pp. 97-107, August 2006.

In the paper referred to above, two classes of data packet are defined: Guaranteed Service Traffic (GST) and Statistically-Multiplexed (SM). A GST packet is switched with constant, short switching delay, and without packet loss or reordering and is thus akin to transmitting the data over a circuit-switched network. An SM packet is switched using a packet-switching approach, in which some packet delay variation and packet loss are tolerated.

In the described hybrid approach, an optical packet-switch node in a wavelength-routed optical network separates incoming GST and SM packets using a polarisation beam splitter. GST packets are delayed using fibre delay lines for a fixed time corresponding to the longest SM packet and then follow wavelength paths through optical cross connects (OXCs) in the node. By contrast, SM packets are buffered, e.g. in electronic memory, and are switched according to their header information.

Incoming GST packets are delayed for the length of the longest SM packet to ensure that any active transmission of any SM packet can be completed, but the GST packets are then sent immediately after this delay. An SM packet is sent out from the node only when a sufficient number of wavelengths (greater than a predetermined minimum) are vacant. GST packets are thereby given priority over SM traffic.

In this known approach, incoming SM packets may be sorted into different electronic queues, where each queue contains SM packets whose lengths are in a range specific to that queue. The system requires fewer wavelengths to be free before an SM packet is sent out from a queue containing shorter packets, while more wavelengths are required to be free before an SM packet is sent out from a queue containing longer packets. Queues containing shorter packets may also be serviced with higher priority than queues containing longer packets. This approach can, to some extent, mitigate the risk of contention which is inherently higher when transmitting longer SM packets.

This known approach enables time-critical traffic, such as video-conference data, to be sent with guaranteed quality of service, while still making use of spare network capacity to send lower-priority traffic.

Nonetheless, the present inventor has come to realise that this approach can be improved upon.

SUMMARY OF THE INVENTION

From a first aspect, the invention provides a method of processing optical data packets, comprising:

receiving a data packet at an optical input;

determining whether to process the data packet as a guaranteed-service packet or as a statistically-multiplexed packet;

if the data packet is to be processed as a guaranteed-service packet, sending the data packet from an optical output within a predetermined maximum time of receiving the data packet;

if the data packet is to be processed as a statistically-multiplexed packet, adding the packet to a queue that can be accessed randomly in time; and for two outbound guaranteed-service packets, determining a plurality of statistically-multiplexed packets whose lengths are such that they would fit in a gap between the two guaranteed-service packets, using a selection process to select a statistically-multiplexed packet from said plurality of statistically-multiplexed packets, and sending the selected statistically-multiplexed packet from the optical output, between the two guaranteed-service packets.

The invention extends to a network node comprising an optical input, an optical output, at least one queue that can be accessed randomly in time, and processing means, wherein the node is configured:

to receive a data packet at the optical input;

to determine whether to process the data packet as a guaranteed-service packet or as a statistically-multiplexed packet;

if the data packet is to be processed as a guaranteed-service packet, to send the data packet from the optical output within a predetermined maximum time of receiving the data packet;

if the data packet is to be processed as a statistically-multiplexed packet, to add the packet to the queue; and for two outbound guaranteed-service packets, to determine a plurality of statistically-multiplexed packets whose lengths are such that they would fit in a gap between the two guaranteed-service packets, to use a selection process to select a statistically-multiplexed packet from said plurality of statistically-multiplexed packets, and to send the selected statistically-multiplexed packet from the optical output, between the two guaranteed-service packets.

The invention further extends to an optical network comprising a plurality of such network nodes connected by optical links.

Thus it will be seen by those skilled in the art that, in accordance with the invention, statistically-multiplexed (SM) packets can be efficiently inserted into gaps in the guaranteed-service traffic (GST), taking account of the actual lengths of the SM packets and the available gaps, and selecting the most appropriate SM packet to insert.

The selection process may comprise selecting the longest of the plurality of statistically-multiplexed packets that would fit in the gap. The longest SM packet will most fully occupy the gap, and can therefore reduce the vacant bandwidth by more than any other of the SM packets. However, other selection processes and criteria are also possible, and further examples are set out below.

By forwarding GST packets within a maximum delay after they are received, the node can preserve service guarantees for GST traffic. In some embodiments, the node may be configured to send guaranteed-service packets after a constant, fixed delay from when they are received, so that the node introduces no jitter or packet-delay variation (PDV) to the GST traffic.

The definitions of the guaranteed-service packets and the statistically-multiplexed packets need not necessarily have any significance beyond the different way in which each class of packet is handled within the node. However, in at least some embodiments, a network may comprise a plurality of nodes, and a packet's membership of one of the classes may be preserved across a plurality of nodes in the network. A network may be such that the transit time for guaranteed-service packets between two points, such as their ingress and egress nodes on the network, is constant or nearly constant (e.g. within predetermined minimum and maximum bounds), while the transit time for statistically-multiplexed packets between two points is unpredictable or variable.

The queue is preferably an electronic queue. The node may therefore be configured to convert an SM packet from optical to electronic form, and to store an electronic SM packet in the queue.

The plurality of statistically-multiplexed packets may be two, three, five, ten or more packets. The packets may be in one or more queues. They may all be in the same queue, but preferably each packet of the plurality is in its own queue.

The node may be configured to determine the plurality of SM packets whose lengths are such that they would fit in a gap between the two GST packets, from a candidate set of SM packets. This candidate set may comprise, or consist of, the head-of-line packets for a plurality of queues. For each head-of-line packet, the node may determine whether the packet length is such that it would fit in the gap between two GST packets.

After selecting a statistically-multiplexed packet from the plurality of statistically-multiplexed packets, but before sending the selected statistically-multiplexed packet from the optical output, between the two guaranteed-service packets, the node may determine a further plurality of statistically-multiplexed packets whose lengths are such that they would fit in the gap between the two guaranteed-service packets reduced by the length of the selected statistically-multiplexed packet. It may use a further selection process (preferably the same as the first selection process) to select a statistically-multiplexed packet from said further plurality of statistically-multiplexed packets. The node may be configured to repeat these determination and selection steps any number of times, with the gap being progressively shortened by the cumulative lengths of all the selected statistically-multiplexed packets whose lengths are such that they would fit in the gap between the two guaranteed. In some embodiments this may be repeated until the node determines that there are no available statistically-multiplexed packets whose lengths are such that they would fit in the remaining gap. The node may then send a plurality of selected statistically-multiplexed packet from the optical output, between the two guaranteed-service packets.

In this way, a gap between the two guaranteed-service packets can efficiently be filled by two or more statistically-multiplexed packets, when it is possible to fit more than one in.

The node may comprise a plurality of electronic queues. For example, the node may have one queue for each input to the node, or for each input on which SM packets can be received. A node may be configured to place received GST packets in an electronic queue (for example, to delay GST packets by an amount equivalent to the longest possible SM packet), although this is not essential. A node may have separate queues for GST packets and SM packets. A queue in the node may be a first-in first-out (FIFO) buffer. Alternatively, it may allow random access to the packets it contains (i.e. packets other than the head-of-line packet can be read from the queue). The queues may be logical structures, and may be implemented physically using any suitable memory or register arrangements. For example, packets from a plurality of queues may be stored on a common random-access memory (RAM) area.

The node may be configured to determine whether any of a plurality of SM packets in a single queue will fit in a gap between two GST packets, and, for a gap large-enough to receive one of the SM packets, to insert the longest such packet that will fit in the gap. This may theoretically improve insertion efficiency compared with a node which just considers the front SM packet in each of a number of queues, since the node may be able to select from a larger pool of SM packets. The node may, for example, be configured to select from pluralities of SM packets in respective queues. However, random access of packets from a queue (rather than first-in first-out, for example) can result in undesirable reordering of SM packets from a single source (e.g. from a single IP address). It may also require additional computational resources, and is therefore not necessarily preferred. In some embodiments, the node comprises a plurality of queues associated with respective optical inputs or with respective packet sources. A node may be configured so that all packets from a particular optical input or source are held in the same queue. If such a node is configured to select SM packets for insertion from head-of-line packets of two or more queues, packet reordering from an input or source can then be avoided.

Determining whether the length of an SM packet and the length of a gap between two outgoing GST packets are such that the packet will fit within the gap may comprise determining the length of the packet and the length of the gap and comparing the two values. It will be appreciated that this is different from an approach of starting to send an SM packet on an output and having to abort the transmission of the SM packet if a GST packet needs to be sent before the entire SM packet is sent.

The node may comprise a plurality of SM-packet queues having associated bandwidths. The values of these bandwidths may be assigned to each node, e.g. by control means, or may be based on the actual rate of data received by, or transmitted from, each queue instantaneously or over a period of time. The node may be configured to insert, into a sufficiently-large gap between two GST packets, an SM packet from the queue that has received the lowest bandwidth out of all the queues. The bandwidth of a queue may be determined based on the rate at which bits are, or have been, leaving (or entering) the queue.

The node may determine from which of a plurality of SM-packet queues to insert an SM packet into a gap based on a scheduling algorithm. The scheduling algorithm may implement any of: fair-queuing, weighted fair-queuing, round-robin, weighted round-robin (WRR), deficit-weighted round-robin (DWRR), modified deficit round-robin (MDRR), or any other suitable approach. The output of the scheduling algorithm may depend on one or more of: the lengths of packets in the queues; the length of the gap; the bandwidth of a queue; and a weight parameter for each queue.

Guaranteed-service packets may pass through the node entirely optically. They may be buffered using one or more fibre delay lines.

Alternatively, the node may be configured to convert a received optical data packet to an electrical form to yield an electrical data packet, and, if the electrical data packet is a guaranteed-service packet, to convert the packet to optical form and send the guaranteed service packet from an optical output within a predetermined maximum time of receiving the optical data packet.

Converting guaranteed-service (GST) packets to electronic form, rather than processing them optically, may be advantageous in some situations. For example, such a node may be able to buffer more GST packets than would otherwise be practicable, or for varying lengths of time. Such a node may be able to determine the size of the gap between two GST packets more easily.

This idea is novel and inventive in its own right, and thus, from a further aspect, the invention provides a method of processing optical data packets, comprising:

receiving an optical data packet;
converting the optical data packet to an electrical form to yield an electrical data packet;
analysing the electrical data packet to determine whether it is a guaranteed-service packet or a statistically-multiplexed packet;
if the electrical data packet is a guaranteed-service packet, converting said packet to optical form and sending said guaranteed service packet from an optical output within a predetermined maximum time of receiving the optical data packet;
if the electrical data packet is a statistically-multiplexed packet, adding said statistically-multiplexed packet to an electronic queue; and
for a statistically-multiplexed packet in the electronic queue, determining whether the length of the statistically-multiplexed packet and the length of a gap between two outgoing guaranteed-service packets are such that the statistically-multiplexed packet will fit within the gap, and, if so, converting the statistically-multiplexed packet to optical form and sending said optical statistically-multiplexed packet between the two guaranteed-service packets.

The invention extends to a network node comprising at least one optical input, an optical output, means for converting data packets between optical and electrical forms, at least one electronic queue, and processing means, wherein the node is configured to:

receive optical data packets at the optical input;
convert the optical data packets to an electrical form to yield electrical data packets;
analyse each electrical data packet to determine whether it is a guaranteed-service packet or a statistically-multiplexed packet;
convert guaranteed-service packets to optical form and send them from the optical output within a predetermined maximum time of receipt at the optical input;
add statistically-multiplexed packets to an electronic queue; and
determine, for a statistically-multiplexed packet in the electronic queue, whether the length of the statistically-multiplexed packet and the length of a gap between two outgoing guaranteed-service packets are such that the statistically-multiplexed packet will fit within the gap, and, if so, convert the statistically-multiplexed packet to optical form and send the statistically-multiplexed packet from the optical output between the two guaranteed-service packets.

The invention further extends to an optical network comprising a plurality of such network nodes connected by optical links.

In some embodiments, the node has a queue (e.g. a single queue) for SM packets, and is configured to determine whether the SM packet at the front of the queue will fit in a gap between two GST packets, and to insert the SM packet between two GST packets once a sufficiently large gap arises.

As in prior approaches, in embodiments of any aspect, a node may receive or send GST packets with a different (e.g. orthogonal) polarisation from SM packets. However, this is not necessary with embodiments of this aspect of the invention, since the node may be configured to distinguish between GST and SM packets by analysing the electrical representation of received packets.

In all of the foregoing aspects, the node may be any network component, such as a switch, a router, an optical add-drop multiplexer (OADM), etc. The node may have a plurality of optical or electrical inputs, each able to receive GST packets, SM packets, or a mixture of both. It may have more than one optical output. The node may support multiplexing of incoming packets, outgoing packets, or both. The node may be configured to send packets from one or more optical outputs using one or more of: statistical multiplexing, wavelength-division multiplexing, time-division multiplexing, and polarisation multiplexing.

In one set of embodiments, the node is an optical muxponder (multiplexing transponder) for relaying traffic between a high-speed network and several slower-speed networks. It comprises a number of (e.g. ten) relatively low-bandwidth (e.g. 1 Gbps) connections (e.g. small form-factor pluggable (SFP)); a relatively high-bandwidth (e.g. 10 Gbps) optical input (e.g. XFP); and a relatively high-bandwidth (e.g. 10 Gbps) optical output (e.g. XFP). The low-bandwidth connections may be optical, electrical, or a mixture of both, and may be inputs, outputs, or bi-directional. Packets received by the node on any of the inputs may be multiplexed on the optical output(s) using one or more of: statistical-multiplexing, time-multiplexing and wavelength-multiplexing. In some embodiments, the muxponder comprises one, two or more bi-directional relatively high-bandwidth optical connections.

A node may be configured to discard an SM packet if a discard criterion is met, such as if some or all of the electronic queues in the node are full.

Not all SM packets received by the node need be sent to the aforesaid optical output (e.g. a line output); similarly, not all GST packets received by the node need be sent from the same optical output. The node may send some SM or GST packets from one or more other outputs (e.g. one or more add-drop outputs), for example, depending on a characteristic of the packet, such as a destination address associated with the packet. The node may be configured to replicate a data packet (SM or GST) and send it from more than one output. Such a packet may be a multicast packet (if it is sent from a subset of the outputs) or a broadcast packet (if it is sent from all the outputs).

Not all SM packets received by the node need be queued. The node may determine whether to place a received packet belonging to the statistically-multiplexed class in an electronic queue, or in which of a plurality of such queues to place the packet, depending on a characteristic of the packet, such as a destination address for the packet. For example, an optical muxponder node may, depending on routing information relating to a received packet, variously route the packet to a packet output ("dropping" the packet), or queue the packet for insertion ("adding"), or re-insertion, on a multiplexed output.

The network may comprise one or more multi-hop packet paths (MHPPs) between pairs of nodes, also involving one or more intermediate nodes. Each multi-hop packet path may be assigned its own wavelength, or may have its own time-slot. Scheduling GST packets in predefined time-slots can enable the aggregation of one or more lower-bit-rate GST streams into a higher bit-rate GST-stream while introducing minimal or zero packet-delay variation (PDV).

GST packets will typically follow multi-hop packet paths and any intermediate nodes along the path will pass on a GST packet within the maximum time delay. Intermediate nodes for SM packets, however, are preferably configured to queue such SM packets before sending them on to the next node.

In some situations it may be desirable to insert GST packets onto the network not only at an ingress node, but also at intermediate nodes that act as bypass nodes for some wavelength or circuit paths containing GST and/or SM packets (such paths being referred to herein as hybrid lines). When inserting a GST packet at an intermediate node, it can be important that GST packets following hybrid lines through the intermediate node are not influenced by the insertion of new GST packets on another hybrid line; i.e. there should be no added packet loss or packet delay variation for the bypassing GST packets.

To this end, in some embodiments, a node may be configured to regenerate all the hybrid lines for which it is an intermediate node. A node may do this by demultiplexing all the hybrid lines at its line inputs and then reinserting the GST packets into the hybrid lines. This may be performed at the interface level, by physically connecting GST drop interfaces to GST add interfaces, or it may be done using internal connections within the node. Along with the regenerated hybrid lines, new hybrid lines may be added which carry GST packets that have not been received at the node's line interfaces. In this way, the node can control the timing of all GST packets being added, dropped, or bypassing the node. In this way, GST packets can be added at an intermediate node without influencing the circuit characteristics (packet delay variation and packet loss) of bypassing GST traffic on hybrid lines.

In any of the foregoing embodiments, an SM packet may be labelled, or otherwise indicated, so as not to be queued by one or more intermediate nodes. Such a hybrid-SM (HS) packet may instead be treated the same as, or similarly to, GST packets by one or more intermediate nodes, so that it follows a multi-hop packet path. In some embodiments, nodes are configured so as to give a received HS packet a lower priority than GST packets but a higher priority than SM packets when scheduling packets on an output. In some embodiments, references herein to SM packets may apply equally to HS packets. In some embodiments, references herein to GST packets may apply equally to HS packets.

In embodiments in which GST packets are scheduled in predefined time-slots, SM packets may be inserted between GST packets within a time-slot, or in a gap between two adjacent GST packets in different time-slots.

The use of time-slots requires accurate time synchronisation between nodes in the network, of at least bit-accuracy level, and also requires a time-slot schedule to be shared among nodes. Such accurate time synchronisation is not always desirable.

Hence, in some embodiments, a node is configured to send one or more guaranteed-service packets in a data container comprising container control information. Because the data container includes control information, a receiving node can determine information about the guaranteed-service packets in the container (e.g. their source or destination) without needing bit-accurate synchronisation between nodes. In some embodiments, for example, byte-level timing variation may be tolerated.

The idea of containers for guaranteed-service packets is believed to be new and inventive in its own right, and thus, from a further aspect, the invention provides a network node comprising one or more inputs and an optical output, wherein the node is configured:

to receive data packets; and within a predetermined maximum time delay from receiving a data packet, to send the data packet from the optical output within a data container comprising container control information.

From a further aspect, the invention provides a network comprising a plurality of interconnected nodes, wherein each node comprises one or more inputs and an optical output, and is configured:

to receive data packets; and within a predetermined maximum time delay from receiving a data packet, to send the data packet from the optical output within a data container comprising container control information.

From another aspect, the invention provides a method of processing data packets using such a node.

The container may comprise a sequence of bits.

The container control information is preferably contained in a container control packet. This packet is preferably located at the start of the container. The container control information may comprise information relating to the length or duration of the container (e.g. the container's length in bytes). It may comprise information relating to the source or destination of the container. It may comprise information relating to the time that the container was scheduled (e.g. a time-stamp). The container control packet may be a GST packet.

The container may contain a plurality of data packets, each received by the node and sent after the predetermined maximum time delay. These packets may be guaranteed-service packets as described previously.

More generally, any optional features of the previous aspects of the invention may be features of these aspects, and vice versa.

However, these later aspects may be used with nodes that switch some or all data packets optically. For example, a node may use one or more fibre delay lines to delay the received packet while constructing the container.

In either case, the container may contain at least one gap between two data packets within the container. In this way, one or more SM packets may be inserted into the container by the node creating the container or by a downstream node. A node may insert an SM packet into a gap between two containers.

Two or more containers may be contained within a super-container comprising super-container control information. This information may comprise some or all of the same elements as container control information.

Allowing gaps in the containers also enables packet-delay variation (PDV) to be minimised. In some embodiments, the node is configured to send the data packets from the optical output after a constant time delay from receiving the packet, or between predetermined minimum and maximum time delays. Thus PDV can be lessened without needing to add time-stamp information to each data packet.

In other embodiments, a node may be configured to group two or more data packets together in a burst; i.e. with no gap or no substantial gap between the two, and to send the burst of packets on an optical output. However, this is generally less preferred, since it can either increase PDV or require additional timing information to be included in the packets or in the container control information, and reduces the opportunity for SM packet insertion.

In some embodiments, a node may group packets into a container which need not necessarily comprise container control information. In some instances, such a container may effectively be a loosely- or accurately-timed time-slot.

Containers, with or without control information, may advantageously be used when a node is configured to receive data packets asynchronously at two or more inputs and wherein the node is configured to aggregate the received data packets on an output using time-multiplexing. The output may be asynchronous or synchronous. The node may comprise a plurality of outputs and be configured to aggregate data from a respective set of inputs on each output. Because the node does not know exactly when the packets will arrive at the two or more inputs (unlike the situation for data packets arriving synchronously at a node, e.g. in well-defined time slots), it is not straightforward to perform the time-multiplexing. One approach is to remove the gaps from between data packets received at an input during a time window, and transmit the resulting burst from the output. However this can introduce packet delay variation (PDV) which is typically undesirable when the data packets are GST packets.

Instead, a network node comprising an optical input and an optical output may be configured:
to receive one or more complete data packets, at a first data rate, at the input during a time window;
if an incomplete data packet is received at the input during the time window, to extend the time window and receive the complete data packet; and
to transmit all the complete data packets received in the time window from the output at a second data rate, faster than the first data rate, with the data packets and any gaps between adjacent data packets being in the same order as the node received them, and with a uniform time compression factor applied to the data packets and to any gaps between adjacent data packets.

This idea is new and inventive in its own right, and thus, from a further aspect, the invention provides a network node comprising an optical input and an optical output, configured:
to receive one or more complete data packets, at a first data rate, at the input during a time window;
if an incomplete data packet is received at the input during the time window, to extend the time window and receive the complete data packet; and
to transmit all the complete data packets received in the time window from the output at a second data rate, faster than the first data rate, with the data packets and any gaps between adjacent data packets being in the same order as the node received them, and with a substantially uniform time compression factor applied to the data packets and to any gaps between adjacent data packets.

This invention extends to a method of processing optical data packets comprising:
receiving one or more complete data packets, at a first data rate, during a time window;
if an incomplete data packet is received at the input during the time window, extending the time window and receiving the complete data packet; and
transmitting all the complete data packets received in the time window at a second data rate, faster than the first data rate, with the data packets and any gaps between adjacent data packets being in the same order as they were received, and with a substantially uniform time compression factor applied to the data packets and to any gaps between adjacent data packets.

The invention also extends to network comprising a plurality of such network nodes and a method of using such a network node to process data packets.

Because the gaps between the received data packets are preserved, no significant packet delay variation is introduced during the aggregation process. A receiving or egress node may be configured to apply the inverse time compression factor. It can thereby output substantially the same stream of data packets as was received by the aggregating node with the inter-packet timings preserved intact. Because other aspects of the invention allow efficient insertion of SM packets in gaps, such an arrangement can allow for the efficient transmission of both GST and SM traffic.

The data packets are preferably received asynchronously (i.e. not in predetermined time slots known to the node). They are preferably GST data packets.

The complete data packets may be sent in a container, with or without a container control packet. The container may be exactly sized to fit the complete data packets, or it may be sized to be equal to the duration of the time window plus the length of the maximum size of a data packet which might be received, according to a network configuration or protocol, scaled by the time compression factor. The node or network may reserve one or more time slots of length equal to the duration of the time window plus the length of the maximum size of a data packet which might be received (scaled by the time compression factor).

The time compression factor preferably equals the ratio of the first data rate (e.g. 1 Gb/s) to the second data rate (e.g. 10 Gb/s); e.g. a tenth. In this example, the node could potentially aggregate data from ten 1 Gb/s inputs onto a single 10 Gb/s output. In practice, the number of active inputs that can be aggregated may depend on the utilisation of the lines. It might, for example, only be possible to aggregate eight 1 Gb/s inputs onto a 10 Gb/s output if all the inputs carry a lot of traffic, because of the need for a time overhead for each line to allow for the inclusion of incomplete data packets.

The time compression factor is preferably constant for a given time window and/or for a given communication session, although it may vary slightly (e.g +/−10 percent). Where the node comprises a plurality of inputs and is configured to aggregate data from these inputs on the output, the inputs may receive data packets at the same or different data rates. If the data rates are different, a different time compression factor may be applied to data packets from each input.

The (unextended) time window may have a predetermined duration, CMIN. The step of extending the time window may be implicit in the operation of the node; e.g. the node may be configured to schedule the data packets on the output as soon as (i) the (unextended) time window has elapsed, and (ii) no incomplete data packet is in a receive buffer connected to the input.

The node may be configured so that, if the time window has been extended by an amount of time, the next time window in respect of the same input will start with a gap corresponding to the amount of extension. This may be necessary in some embodiments to ensure the proper transfer of the timing information relating to the gaps between the packets. When a time window is extended, thereby receiving more data, the extra data would otherwise have fallen within the next time window for the input. If the following time window starts with a corresponding gap, this can allow a receiving node to finish scheduling packets received at a high bit-rate interface out onto a lower bit-rate interface, because the duration of the smallest time window might typically correspond to the time required for transferring data at full data-rate from the input to the output, if the time window is fully utilised.

The invention is not limited to the foregoing aspects.

From another aspect, the invention provides a method for transmitting statistically-multiplexed traffic in a communication network, comprising:

(a) monitoring a gap after a hybrid-line packet, or between hybrid-line packets, arriving at a line-interface input;

(b) if a gap is available and a packet is available in a statistically-multiplexed buffer queue, then monitoring the packet-length of a first packet in the buffer queue; otherwise, returning to step (a); and (c) if the length of said packet is less than or equal to the length of the gap, then scheduling said packet from the selected buffer queue on a line-interface output and updating the length of the gap by subtracting the length of said packet therefrom; otherwise, returning to step (a).

A hybrid-line (HL) packet may be a GST packet or an SM packet that is labelled or tagged as a GST packet, and which operates like a GST packet (such a packet is referred to as a hybrid-SM (HS) packet).

If there is left-over space in the updated gap length, then the method may continue by returning to step (b). If there is no left-over space in the updated gap length, then the method may continue by returning to step (a).

From a further aspect, the invention provides a method for optimizing traffic processing in integrated hybrid networks, comprising:

receiving traffic at line inputs;

identifying the type of packets in received traffic as: guaranteed-service traffic, hybrid-statistically-multiplexed, or statistically-multiplexed;

dropping selected packets from said received traffic to add-drop outputs;

bypassing other packets from said received traffic to line outputs;

adding traffic from add-drop interface inputs to line outputs; and sending traffic from line outputs as containers.

From another aspect, the invention provides a method for optimizing traffic processing in integrated hybrid networks, characterized by receiving traffic at Line inputs, identifying type of packets, GST, HS or SM and/or address of packets in received traffic, dropping selected set of packets from received traffic to Add Drop outputs, bypassing non-selected set of packets from received traffic to Line outputs, adding traffic from AD interfaces inputs to Line outputs, sending traffic from Line outputs.

This optimizing method may be characterized by comprising a drop and bypass process (1100), and an add process (1200), and wherein the processes (1100, 1200) operate independently of each other.

The optimizing method may be characterized by a drop and bypass process (1100) comprising a drop sub-process (1300) and a bypass sub-process (1400), and a drop sub-process (1300) comprising a process for each of the packet types GST, HS and SM, and a bypass sub-process (1400) comprises a process for each of the packet types GST and HS.

The optimizing method may be characterized by an add process (1200) comprising a process for each of the packet types GST, HS and SM, or a process for packet type GST and a process for combined packet types HS and SM, and each packet type process comprising a number of algorithms for queuing and scheduling.

The optimizing method may be characterized by a drop sub-process (1300) dropping SM packets, HS packets and/or GST packets, and a bypass sub-process (1400) bypassing HS packets and/or GST packets, and an add process (1200) adding SM packets, HS packets and/or GST packets, The optimizing method may be characterized by that traffic at lines being transmitted as packets, containers and/or supercontainers.

The optimizing method may be characterized by that selected set of packets can be single GST packets, single HS packets, single SM packets, bursts of GST packets, bursts of HS packets, bursts of SM packets, subsets of HS packets, subsets of SM packets, and/or containers comprising GST packets, HS packets, SM packets, bursts and/or subsets, and/or supercontainers comprising GST packets, HS packets, SM packets, bursts, subsets, and/or containers.

This optimizing method may be characterized by that selected set of packets sent as burst, subset, container and/or supercontainers being deaggregated.

The optimizing method may be characterized by that deaggregated packets and belonging gap interval between packets being upscaled.

The optimizing method may be characterized by
that GST packets, HS packets and/or SM packets selected for dropping being forwarded to outputs of AD interfaces (200).

The optimizing method may be characterized by
that non-selected packets being bypassed and forwarded to outputs of Line interfaces (110).

The optimizing method may be characterized by
that received traffic at inputs of Line Interfaces (110) and bypassing traffic being monitored for detecting packet gaps for insertion of GST packets,
wherein the GST Buffer queue is waiting for reserved timeslot,
and when reserved timeslots are vacant the GST scheduler schedules GST packets to pre-assigned Line Interface Outputs.

The optimizing method may be characterized by
that GST packets, HS packets and/or SM packets received at AD interfaces inputs being separated in AD interfaces (200).

The optimizing method may be characterized by
that GST packets to be added directly being forwarded from AD Interfaces (200) to GST scheduler (150) for scheduling, and GST packets to be added after delay first being sorted into GST buffer queues and secondly forwarded to GST scheduler (150) for scheduling.

The optimizing method may be characterized by
that HS packets and SM packets to be added directly being forwarded from AD Interfaces (200) to SM scheduler (160) for scheduling, and HS and SM packets to be added after delay first being sorted into SM buffer queues and secondly forwarded to SM scheduler (160) for scheduling The optimizing method may be characterized by
that scheduled single packets, bursts, subsets, containers and supercontainers being downscaled.

The optimizing method may be characterized by
that downscaled traffic being inserted into gap intervals between packets, containers and supercontainers at Line outputs.

The optimizing method may be characterized by
a scheduler selecting a set of GST packets from GST buffer queues with total packet length equal to or smaller than detected Line packet gap.

The optimizing method may be characterized by
that when a set of GST packets corresponding to said Line packet gap being located then said set of GST packets being scheduled to Line output for filling said gap.

The optimizing method may be characterized by
that a set of GST packets having at least one GST packet.

The optimizing method may be characterized by
that said HS packets and/or SM packets being sorted into a number of FIFO buffer queues, wherein the number of queues being greater than one.

The optimizing method may be characterized by
monitoring packet lengths of HOL packets, first HS packets and/or first SM packets in said FIFO buffer queues.

The optimizing method may be characterized by
that said line traffic being monitored after GST packet insertion for detecting Line packet gaps.

The optimizing method may be characterized by
a scheduler selecting a set of HS packets from FIFO queues with total packet length equal to or smaller than detected Line packet gap.

The optimizing method may be characterized by
that when a set of HS packets corresponding to said Line packet gap being located then said HS packets being scheduled to Line output for filling said gap.

The optimizing method may be characterized by
that a set of HS packets having at least one HS packet.

The optimizing method may be characterized by
that said line traffic being monitored after HS packet insertion for detecting Line packet gaps.

The optimizing method may be characterized by
a scheduler selecting a set of SM packets from FIFO queues with total packet length equal to or smaller than detected Line packet gap.

The optimizing method may be characterized by
that when a set of SM packets corresponding to said Line packet gap being located then said SM packets being scheduled to Line output for filling said gap.

The optimizing method may be characterized by
that a set of SM packets having at least one SM packet.

The optimizing method may be characterized by
that said sorting follows an algorithm for optimizing buffering of HS packets and/or SM packets into FIFO queues. The optimizing may be based on any suitable criterion or criteria.

The optimizing method may be characterized by
that said algorithm for optimizing sorting of HS packets and/or SM packets into FIFO queues can be
an interfaces algorithm,
a packet length algorithm,
UDP header source port algorithm,
UDP header destination port algorithm,
UDP header source and destination port algorithm,
TCP header source port algorithm,
TCP header destination port algorithm,
TCP header source and destination port algorithm,
QoS algorithm,
Destination address algorithm,
MPLS label algorithm,
Origin address algorithm,
or a combination of said algorithms.

The optimizing method may be characterized by
that said scheduling of HS packets and/or SM packets follows an algorithm for optimizing insertion and throughput of traffic.

The optimizing method may be characterized by
that said scheduling method for optimizing insertion and throughput of traffic can be
a first packet fitting gap algorithm,
a fair bandwidth sharing algorithm,
a longest packet fitting the gap algorithm,
a queue bandwidth sharing with weighting algorithm,
or a combination of said algorithms.

The optimizing method may be characterized by
that line packets having higher or equal bitrate than packets received at AD interfaces,
and said downscaling and said upscaling occurs in the time domain,
and that said downscaling is given by factor BDS,
and that said upscaling is given by factor BUS,
that said BDS and inverse of BUS are determined by the ratio of the bandwidth of aggregation interfaces divided by the bandwidth of the hybrid lines.

The optimizing method may be characterized by
that the same interval in bytes between packets being kept through downscaling and
upscaling,
or
that said downscaling of the interval between packets is determined by a factor BDSBP and said downscaling of the duration of packets is determined by a factor BDSP, and said upscaling of the interval between packets is determined by a factor BUSBP, wherein BUSBP can be inverse of factor BDSBP, and said upscaling of the duration of packets is determined by a factor BUSP, wherein BUSP can be inverse of factor BDSP.

From a further aspect, the invention provides a node arrangement for optimizing traffic processing in integrated hybrid networks, characterized by means for receiving traffic at Line inputs, identifying type of packets, GST, HS or SM and/or address of packets in received traffic, means for dropping selected set of packets from received traffic to Add Drop outputs, means for bypassing non-selected set of packets from received traffic to Line outputs, means for adding traffic from AD interfaces inputs to Line outputs, means for sending traffic from Line outputs.

The node arrangement may be characterized by comprising a Line Interfaces (110) with a number of lines for GST, HS, SM and/or hybrid traffic, a Line Input Buffers (120) for delaying traffic on the line, a Line Monitor Unit (130) for detecting vacant gaps in traffic, an AD interfaces (200) with a number of interfaces units for adding and/or dropping GST packets, HS packets and/or SM packets, a Central Unit (139,140) for dropping, bypassing and/or adding traffic, a GST Buffer Queues (180) for queuing GST packets, a GST scheduler (150) for scheduling GST packets, a SM Buffer Queues (190) for queuing and sorting HS packets and/or SM packets, a SM scheduler (160) for scheduling HS packets and/or SM packets, a Converter Multiplexer Layer (210) for converting, multiplexing and demultiplexing traffic.

The node arrangement may be characterized by that said Converter Multiplexer Layer (210), receiving fiber traffic from a number of fibers and wavelength division demultiplex said fiber traffic, and/or receiving line traffic from a number of outputs at Line Interfaces (110) lines and wavelength division multiplex said line traffic, and in electronic processing of traffic, converting optical fiber traffic into electronic line traffic and electronic line traffic into optical fiber traffic.

The node arrangement may be characterized by that said Line Input Buffers (120) is receiving traffic from the Line Interfaces (110), delaying optical traffic in optical FDLs and electronic traffic in FIFO buffers, and forwarding packets to said Central Unit (139,140), wherein said delay corresponds to duration of a maximum packet length.

The node arrangement may be characterized by that when said packets are being delayed in Line Input Buffer (120), the Central Unit (139,140) receives information from the Line Monitor Unit (130)

identifying the packets addresses, determining the packet types, and finding the gap lengths between bypassing hybrid-line (HL) packets.

The node arrangement may be characterized by that said AD interfaces (200) receiving GST packets, HS packets and/or SM packets from Central Unit (139,140) and dropping said packets to Add Drop outputs, and forwarding GST packets received from Add Drop inputs, to be added to the line traffic, to said GST Buffer Queues (180), and forwarding HS packets and/or SM packets received from Add Drop inputs, to be added to the line traffic, to said SM Buffer Queues (190).

The node arrangement may be characterized by that said GST Buffer Queues (180), comprises a number, i, of buffer queues for storing GST packets.

The node arrangement may be characterized by that said GST Buffer Queues (180) forwarding a set of GST packets to GST scheduler (150).

The node arrangement may be characterized by that said GST scheduler (150) is scheduling a set of GST packets to selected Line outputs.

The node arrangement may be characterized by that said SM Buffer Queues (190) comprises a number, j, of buffer queues for storing HS packets and/or SM packets.

The node arrangement may be characterized by that said SM Buffer Queues (190) forwarding a set of HS packets and/or SM packets to SM scheduler (160).

The node arrangement may be characterized by that said SM scheduler (160) is scheduling a set of HS packets and/or a set of SM packets to selected line outputs.

The node arrangement may be characterized by that said Central Unit (139,140) is circuit switching GST packets and packet switching HS packets and/or SM packets.

The node arrangement may be characterized by that said Central Unit (139,140) can process traffic either electronically or optically, and/or electronically or optically circuit switch GST packets, and/or electronically or optically packet switch HS packets and/or SM packets.

From a further aspect, the invention provides a system for transmitting traffic in integrated hybrid networks, characterized by comprising an ingress node for adding packets to a traffic stream, intermediate nodes for forwarding packets in a traffic stream, and an egress node for dropping packets out of a traffic stream characterized by that SM packets being transmitted at Next Hop Packet Paths, and/or HS packets being transmitted at Multi Hop Packet Paths, and/or SM packets being transmitted at looped Next Hop Packet Paths, and/or GST packets being transmitted at line paths.

The transmitting system may be characterized by a Next Hop Packet Path being a direct transmission path between an ingress node and an egress node and a Multi Hop Packet Path being a transmission path starting at an ingress node, bypassing at least one intermediate node, and ending at an egress node.

The transmitting system may be characterized by that in said Next Hop Packet Path, SM packets being buffered, sorted, scheduled and inserted in vacant gaps between HL packets, containers and/or supercontainers at an ingress node, and said SM packets being selected and dropped in egress node.

The transmitting system may be characterized by
that in said loop Next Hop Packet Path,
an egress node interfaces can be looped allowing SM packets being dropped to again be added into vacant gaps at said egress node.

The transmitting system may be characterized by
that in said Multi Hop Packet Path,
said HS packets being buffered, sorted, scheduled and inserted in vacant gaps between HL packet, containers and/or supercontainers at an ingress node,
said HS packets bypassing at least one intermediate node,
and said HS packets being selected and dropped in an egress node.

From a further aspect, the invention provides a system for transmitting traffic in integrated hybrid networks,
comprising
an ingress node for adding packets to a traffic stream,
intermediate nodes for forwarding packets in a traffic stream,
and an egress node for dropping packets out of a traffic stream,
characterized by
that SM packets being transmitted at Next Hop Packet Paths, and/or
HS packets being transmitted at Multi Hop Packet Paths, and/or
SM packets being transmitted at looped Next Hop Packet Paths, and/or
GST packets being transmitted at line paths.

The transmitting system may be characterized by
that set of packets can be
single HS packets, single SM packets,
bursts of HS packets, bursts of SM packets,
subsets of HS packets, subsets of SM packets,
and/or
containers comprising HS packets, SM packets, bursts and/or subsets,
and/or
supercontainers comprising HS packets, SM packets, bursts, subsets, and/or containers.

The transmitting system may be characterized by
that selected set of packets sent as burst, subset, container and/or supercontainers being de-aggregated.

The transmitting system may be characterized by
that selected set of packets and belonging gap interval between packets being upscaled.

The transmitting system may be characterized by
that upscaled packets selected for dropping being forwarded to outputs of AD interfaces (200).

The transmitting system may be characterized by
that non-selected packets being bypassed and forwarded to outputs of Line interfaces (110).

The transmitting system may be characterized by
that received traffic at inputs of Line Interfaces (110) and bypassing traffic being monitored for detecting packet gaps for insertion of HS packets and/or SM packets,
wherein a packet gap length GHL is given by counted bytes, starting when a container-control packet or a HL packet arrives, counting until receiving end of HL burst or HL packet arrives or until said counted number of bytes is larger or equal to a maximum allowable packet length.

The transmitting system may be characterized by
that HS packets and SM packets to be added directly being forwarded from AD Interfaces (200) to SM scheduler (160) for scheduling,
and HS and SM packets to be added after delay first being sorted into SM buffer queues and secondly forwarded to SM scheduler (160) for scheduling.

The transmitting system may be characterized by
that said HS packets and/or SM packets being sorted into a number of FIFO buffer queues, wherein the number of queues being greater than one.

The transmitting system may be characterized by
monitoring packet lengths of first HS packets and/or SM packets in said FIFO buffer queues.

The transmitting system may be characterized by
a scheduler selecting HS packets and/or SM packets from said FIFO buffer queues with total packet length equal to or smaller than detected Line packet gap.

The transmitting system may be characterized by
that when selected HS packets and/or SM packets corresponding to said Line packet gap being located then said packets being scheduled to Line output for filling said gap.

The transmitting system may be characterized by
that selected packets having at least one HS packet or one SM packet.

The transmitting system may be characterized by
that said sorting follows an algorithm for optimizing buffering of HS packets and/or SM packets into FIFO queues. The optimizing may be based on any suitable criterion or criteria.

The transmitting system may be characterized by
that said algorithm for optimizing sorting of HS packets and/or SM packets into FIFO queues can be
an interfaces algorithm,
a packet length algorithm,
UDP header source port algorithm,
UDP header destination port algorithm,
UDP header source and destination port algorithm,
TCP header source port algorithm,
TCP header destination port algorithm,
TCP header source and destination port algorithm,
Destination address algorithm,
MPLS label algorithm,
Origin address algorithm,
QoS algorithm,
or a combination of said algorithms.

The transmitting system may be characterized by
that said scheduling of HS packets and/or SM packets follows an algorithm for optimizing insertion and throughput of traffic.

The transmitting system may be characterized by
that said scheduling algorithm for optimizing insertion and throughput of traffic can be
a first packet fitting gap algorithm,
a fair bandwidth sharing algorithm,
a longest packet fitting the gap algorithm,
a queue bandwidth sharing with weighting algorithm,
or a combination of said algorithms.

The transmitting system may be characterized by
that scheduled traffic can be single packets, bursts, subsets, containers and supercontainers.

The transmitting system may be characterized by
that scheduled traffic being downscaled and inserted into gap intervals between packets, containers and supercontainers at Line outputs.

The transmitting system may be characterized by
that line packets having higher bitrate than packets received at AD interfaces,
said downscaling and said upscaling occurs in the time domain, said downscaling is given by factor BDS, said upscaling is given by factor BUS, and wherein said BDS and inverse of BUS are determined by the ratio of the bandwidth of aggregation interfaces divided by the bandwidth of hybrid lines.

The transmitting system may be characterized by that the same interval in bytes between packets being kept through downscaling and upscaling, or that said downscaling of the interval between packets is determined by a factor BDSBP and said downscaling of the duration of packets is determined by a factor BDSP, and said upscaling of the interval between packets is determined by a factor BUSBP, wherein BUSBP can be inverse of factor BDSBP, and said upscaling of the duration of packets is determined by a factor BUSP, wherein BUSP can be inverse of factor BDSP.

From a further aspect, the invention provides a method for optimizing traffic processing in integrated hybrid networks, characterized by dynamically selecting processes, sub-processes, packet type processes and algorithms that achieve a high QoS, a minimum level of delay, a minimum PDV, and a maximum use of bandwidth capacity.

From a further aspect, the invention provides a node arrangement for optimizing traffic processing in integrated hybrid networks, characterized by means for hybrid packet switching and hybrid circuit switching, and means for processing traffic both optically and electronically.

From a further aspect, the invention provides a method for transmitting GST traffic in a communication network, characterized by from GST Buffer queue select preceding GST packets and gaps for scheduling, and if selected GST packet is estimated to be scheduled at the border of container with minimum size CMIN, then the container size is increased by overcapacity length GSTMTU to maximum container size CMAX, and said complete GST packet is included in selection of packets.

This transmitting method may be characterized by that GST Scheduler is waiting for reserved timeslot for GST Buffer queue, and in reserved timeslot the GST Scheduler schedules to a pre-assigned Line Interface Output, a container of size CMAX with duration TCM including said selection of GST packets and gaps, wherein the scheduling is starting at the beginning of said timeslot.

This transmitting method may be characterized by that any spaces not filled with payload remains as packet gaps, and gaps between the packets in the container depends on the packets inter-arrival times at AD interfaces.

From a further aspect, the invention provides a method for transmitting SM traffic in a communication network, characterized by (A)

monitoring a gap GHL after a HL packet, or between HL packets, arriving at a Line Interface Input.

This transmitting method may be characterized by (B)

if a gap GHL is available and a packet is available in SM Buffer queue, then monitor the SM packet length SML of a first packet in a SM Buffer queue, if no gap GHL is available or no packet is available in SM Buffer queue, then the method continues according to clause (A).

This transmitting method may be characterized by if a SM packet length SML is equal to or smaller than gap GHL, then said SM packet is scheduled from the selected SM Buffer queue to a Line Interface Output, and gap length GHL is updated by subtracting SM packet length SML from GHL, if a SM packet length SML is larger than gap GHL, then the method continues according to step (A).

This transmitting method may be characterized by if there is left-over space in updated gap GHL, then the method continues according to step (B), or if there is none left-over space in updated gap GHL, then the method continues according to step (A).

From a further aspect, the invention provides a method for transmitting SM traffic in a communication network, characterized by (I)

monitoring a gap GHL after a HL packet, or between HL packets arriving at a Line Interface Input.

This transmitting method may be characterized by (II)

if a gap GHL is available, then monitor the packet lengths of the first packets to find HOL packets of all SM NHPP queues, and find set of packets SMSET from the HOL packets having length smaller or equal to gap GHL, or if no gap GHL is available, then the method continues according to step (I).

This transmitting method may be characterized by if packet is available in SMSET, then the longest SM packet is scheduled from SMSET to a Line Interface Output, and GHL is updated by subtracting scheduled SM packet length from GHL, or if no packet is available in SMSET, then the method continues according to step (I).

This transmitting method may be characterized by if there is left-over space in updated gap GHL, then the method continues according to step (II), or if there is none left-over space in updated gap GHL, then the method continues according to step (I).

This transmitting method may be characterized by if packet is available in SMSET, then a set of queues, QSET, is found, containing the SMSET, and the bandwidth meters of QSET are traversed for finding the queue QLBW having received the lowest bandwidth or the lowest bandwidth times the weight, and HOL packet from the queue QLBW is scheduled, and GHL is updated by subtracting scheduled SM packet length from GHL, or if no packet is available in SMSET, then the method continues according to step (I).

This transmitting method may be characterized by updating Bandwidth Meters showing received bandwidth for all SM NHPP queues, and if there is left-over space in updated gap GHL, then the method continues according to step (II), or if there is no left-over space in updated gap GHL, then the method continues according to step (I).

From a further aspect, the invention provides a method for transmitting HS traffic in a communication network, characterized by (X)
monitoring and finding container-control packets arriving at Line Interface Inputs.

This transmitting method may be characterized by (Y)
finding the gap GHL after end of a container-control packet or HL packet arriving at a line input-interface, and counting bytes until
end of container or
HL packet arrives or
number of bytes is larger than SMMTU.

This transmitting method may be characterized by (Z)
if a gap GHL is available, then monitor the packet lengths of the first packets to find HOL packets of all HS MHPP queues, and find set of packets HSSET from the HOL packets having length smaller or equal to gap GHL,
or if no gap GHL is available,
then if end of container, the method continues according to step (X),
and if not end of container, the method continues according to step (Y).

This transmitting method may be characterized by
if packet is available in HSSET,
then the longest SM packet is scheduled from HSSET to a Line Interface Output,
and GHL is updated by subtracting scheduled HS packet length from GHL,
or if no packet is available in HSSET,
then the method continues according to step (Y).

This transmitting method may be characterized by
if there is left-over space in updated gap GHL, then the method continues according to step (Z),
or if there is none left-over space in updated gap GHL, then the method continues according to step (Z).

This transmitting method may be characterized by
if packet is available in HSSET,
then a set of queues, QSET, is found, containing the HSSET,
and the bandwidth meters of QSET are traversed for finding the queue QLBW having received the lowest bandwidth or the lowest bandwidth times the weight,
and the HOL packet from the queue QLBW is scheduled,
and GHL is updated by subtracting scheduled SM packet length from GHL,
or if no packet is available in SMSET,
then the method continues according to step (Y).

This transmitting method may be characterized by
updating Bandwidth Meters showing received bandwidth for all SM NHPP queues,
and if there is left-over space in updated gap GHL, then the method continues according to step (Z),
or if there is none left-over space in updated gap GHL and not end of container, then the method continues according to step (Y),
or if there is none left-over space in updated gap GHL and end of container, then the method continues according to step (X).

Any of the essential or optional features of any aspect or embodiment of the invention may, wherever appropriate, be used in combination with any other aspect or embodiment described herein.

BRIEF DESCRIPTION OF THE DRAWINGS

Certain preferred embodiments of the invention will now be described, by way of example only, with reference to the accompanying drawings, in which.

DETAILED DESCRIPTION OF THE INVENTION

In general, FIGS. 1-43 relate to principles behind the arrangement, processes, sub-processes and algorithms of embodiments of the invention, while FIGS. 44-62 give examples of processing of traffic on hybrid lines.

Figure 1:
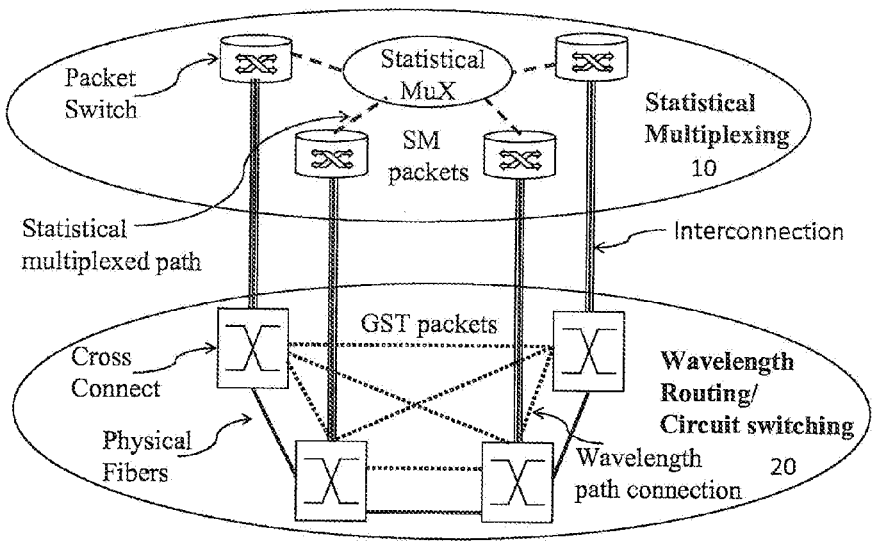
FIG. 1 is a schematic drawing showing an integrated hybrid network.

FIG. 1 shows an optical integrated hybrid network (IHN) comprising a statistical-multiplexing packet-switching layer 10 and a circuit switching layer 20.

In such an integrated hybrid network, all packets are labelled to either follow a Guaranteed Service Transport (GST) path or a Statistical Multiplexed (SM) path through the network.

A GST path is a wavelength path or a circuit path through the network, for transporting GST packets from one node to another node. In a GST path, the GST packets are transmitted utilizing an end-to-end circuit network topology and the packets are therefore scheduled as in circuit switching.

An SM path is a wavelength segment path through the network, for transporting SM packets between nodes. In an SM path, the SM packets are transmitted utilizing a hop-by-hop network topology and the packets are scheduled as in packet switching. The SM packets following an SM path are forwarded according to their address header, and as such, the SM packets follow the same procedure as traditional IP packets and are processed in Ethernet switches or IP routers.

Typically, GST packets will require little or no buffering for solving contention resolution and the GST packets can therefore be forwarded through the switch with a low fixed delay and with zero packet loss. On the other hand, SM packets are switched and buffered like IP or Ethernet packets in a conventional packet switched system and may encounter variable delays.

GST traffic needs a high Quality of Service (QoS) and is therefore given absolute priority over SM traffic. GST paths may be utilized, for example, by video and voice services requiring low packet loss, low packet delays and low Packet Delay Variation (PDV). Unlike GST traffic, SM traffic is especially suitable for services that can tolerate Packet Delay Variation and relatively-high packet delays. Examples of services suitable for SM traffic are email, file-transfer and web-browsing.

SM traffic may be transmitted on GST paths by inserting SM packets in vacant gaps between the GST packets, e.g. in GST wavelength paths. The GST traffic including inserted SM packets is known as hybrid traffic. A hybrid circuit path is defined as a hybrid line. In an integrated hybrid network, GST packets follow a hybrid line from end-to-end. SM packets may follow a hybrid line, but only if there is leftover capacity after transmitting the GST traffic. This type of SM traffic is then a part of the hybrid traffic, following the hybrid line.

Figure 2:
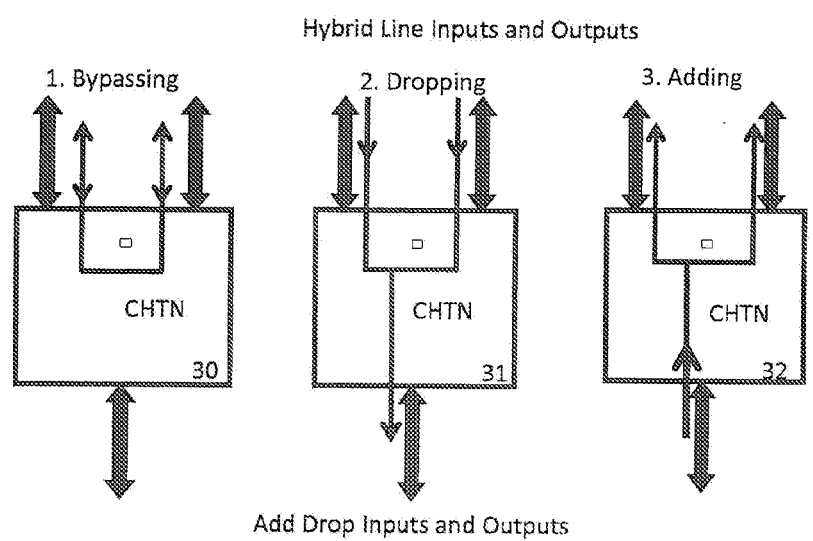
FIG. 2 is a schematic drawing showing three different packet forwarding options for a hybrid traffic node embodying the invention.

FIG. 2 shows three operations that a node embodying the invention may perform on a received packet. There are: "bypassing" the packet 30, "dropping" the packet 31 and "adding" the packet 32. Typically, the node is connected to a hybrid line via bidirectional hybrid line inputs and outputs. Packets to be added onto the hybrid line are received from Add-Drop Inputs, while packets to be dropped from the hybrid line (i.e. removed from the hybrid line to be transported by alternative means, as opposed to being lost) are sent to Add-Drop Outputs. A packet entering the node via the bidirectional hybrid line is identified, e.g. by wavelength, as either a packet to remain on the hybrid line (i.e. to bypass through the node) or as a packet to be dropped to an Add-Drop Interface.

If the hybrid line is not dropped at the node, the hybrid traffic on the hybrid line bypasses the node. Hybrid lines are typically bidirectional and packets may therefore bypass a node in either direction. Moreover, only traffic following a hybrid line may be bypassed in this manner.

In FIG. 2, the "dropping" option illustrates dropping of traffic from hybrid lines. Packets entering via hybrid lines and being identified by address for dropping are forwarded to the Add-Drop Output of the node. The "adding" option in FIG. 2 shows the adding of traffic, whereby packets entering the Add-Drop Inputs are identified in the node and transported to the hybrid lines.

Figure 3:
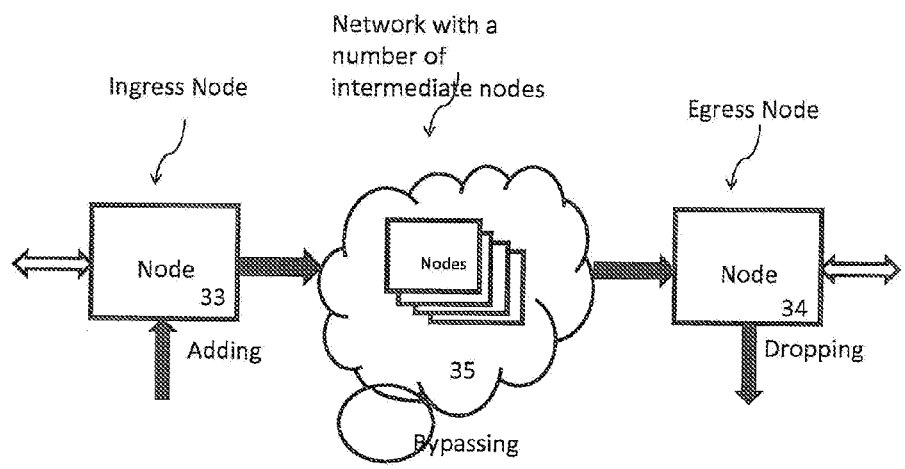
FIG. 3 is a schematic drawing showing an optical communication network with hybrid nodes embodying the invention.

FIG. 3 illustrates an optical network comprising nodes that are adding traffic 33, dropping traffic 34 and bypassing traffic 35. In such a network, to take advantage of the given resources and to increase the capacity, each wavelength may be divided into several sub-circuits using a time-slotted scheme. The use of timeslots on a wavelength enables a higher granularity and gives the opportunity to have several lower bit rate GST channels within a single GST wavelength. SM packets may still be filled in between the GST packets on the different channels.

Such a network may, for example, be a metropolitan area network (MAN) spanning a town or city which uses Coarse Wavelength Division Multiplexing (CWDM) on eight wavelengths. The capacity of each wavelength may be 10 Gbps, which gives a bandwidth higher than the capacity normally required in access networks and in moderately sized metropolitan area network. Such a network may have circuit connections, for example connecting enterprises through an operator network or aggregating traffic from mobile base stations. These types of connections typically require a lower bit rate than a full 10 Gbps. Mobile base stations are commonly equipped with a Gigabit Ethernet interface and hence, a 1 Gbps channel is a more suitable circuit capacity for base stations than 10 Gbps. A time-slotted hybrid scheme can be used in the integrated optical communication networks to set up circuit connections and to divide wavelengths into channels.

A node according to embodiments of the invention, referred to herein as an Optimized Integrated Hybrid Traffic Node (OIHTN), can provide efficient bandwidth utilisation while retaining a high QoS when used in such an integrated hybrid network context. Such a node may implement a method according to embodiments of the invention, referred to herein as an Optimum Integrated Hybrid Traffic Process (OIHTP). The Optimized Integrated Hybrid Traffic Node is dynamically adaptable in operation and is arranged in a versatile manner to utilize the given integrated hybrid network resources in an optimal way.

The Optimized Integrated Hybrid Traffic Node can process two types of packets: SM packets and hybrid-line (HL) packets. An HL packet can be either a GST packet, as described above, or an SM packet that is labelled or tagged as a GST packet, and which operates like a GST packet; such a packet is referred to as a hybrid-SM (HS) packet.

Figure 4:
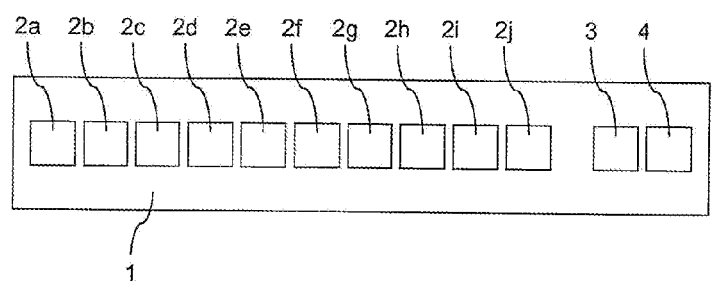
FIG. 4 is a schematic drawing showing a muxponder embodying the invention.

FIG. 4 shows an example of an Optimized Integrated Hybrid Traffic Node implemented as a ten-port muxponder (multiplexing transponder) 1. The node 1 has ten one-Gbps, bi-directional client interfaces 2a-2j and two ten-Gbps, bi-directional line interfaces 3, 4. Each of the line interfaces might typically be connected via a link to another similar node, for example to form a ring topology spanning a town or city. Each of the slower, client interfaces might typically be connected to a company network, or to a Digital Subscriber Line Access Multiplexer (DSLAM) belonging to a residential Internet Service Provider (ISP). The node 1 will receive hybrid line (HL) and SM packets on the line interfaces 3, 4 from neighbouring nodes. If received packets are destined for one of the client interfaces, they will be dropped to the relevant interface. If received HL packets are not destined for one of the client interfaces, they are bypassed by the node. Received SM packets that are not destined for one of the client interfaces are added to a queue in the node, awaiting reinsertion between HL packets at the other line interface 4, 3. Each client interface 2a-2j will typically receive only SM or GST packets. Received GST packets are sent out by the node on the relevant line interface 3, 4. Received SM packets are added to a queue, awaiting insertion between HL packets at the relevant line interface 3, 4.

An overview of some methods embodying the invention will now be given with reference to FIGS. 44 to 62.

Figure 44:
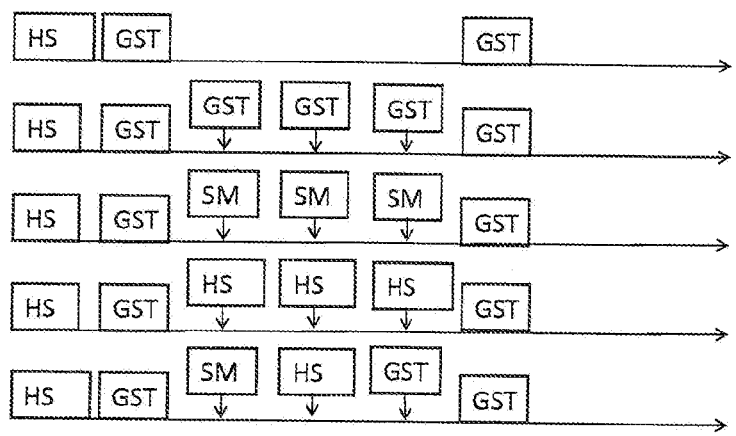
FIG. 44 is a schematic drawing showing an example on how a vacant gap between packets on a hybrid line can be filled with GST packets, SM packets, hybrid-SM packets or a combination of different types of packets.

FIG. 44 shows an example of packets being added to a line. A vacant gap between HL packets at a hybrid line can be filled with GST packets, SM packets, hybrid-SM packets or a combination of different types of packets.

Figure 45:
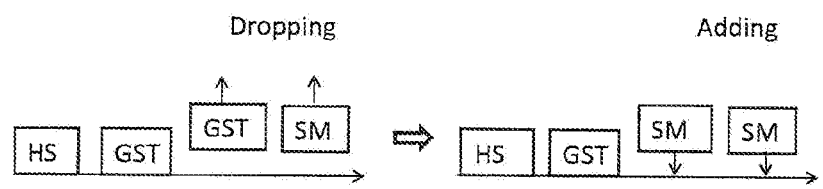
FIG. 45 is a schematic drawing showing an example of dropping and adding of packets on a hybrid line.

FIG. 45 illustrates an example of dropping and adding of packets on a line. In the example, a GST packet and an SM packet is dropped from a line, and in the reminding vacant gap two SM packets are added.

Figure 46:
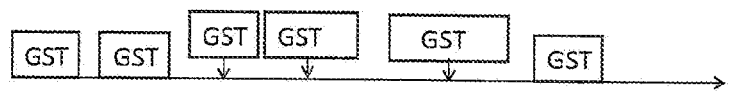
FIG. 46 is a schematic drawing showing an example of adding packets with different packet lengths and gap intervals.

FIG. 46 illustrates an example of adding packets with different packet lengths and gap intervals in a vacant GST path. The packets arriving may be of different size depending on the data quantity transported. In addition, the intervals, or gaps, between packets may be of different lengths since an Optimized Integrated Hybrid Traffic Node can handle asynchronous traffic.

Figure 18:
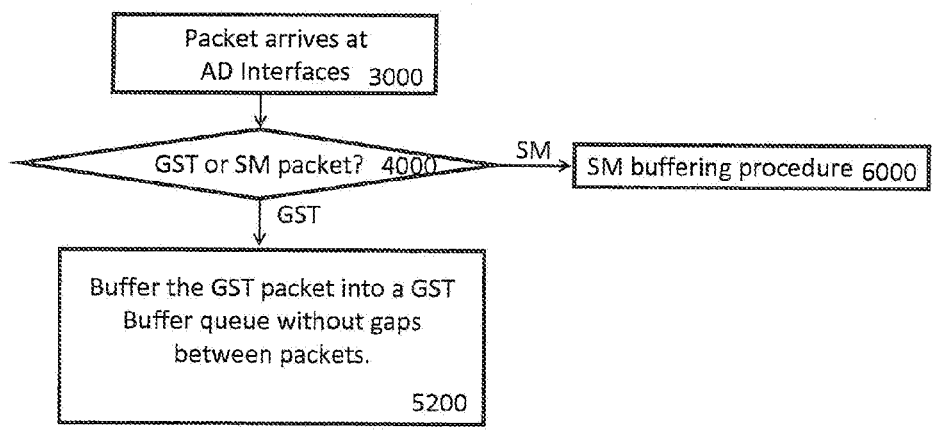
FIG. 18 is a flow diagram showing an algorithm for queuing a GST packet in a burst queue, in a container, with a minimum of gap intervals between GST packets.
Figure 47:
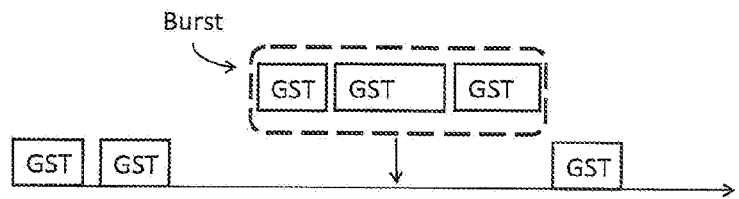
FIG. 47 is a schematic drawing showing an example of adding a burst of GST packets.

FIG. 47 illustrates an example of adding a burst of GST packets on a line. The gap intervals between the added GST packets are set to a minimum. In other words, the gap intervals have been removed in a buffering burst procedure as shown in FIG. 18. The burst of GST packets may be added as a burst in a large single packet on a hybrid line or may be added as a burst into a container on a container hybrid line.

Figure 48:
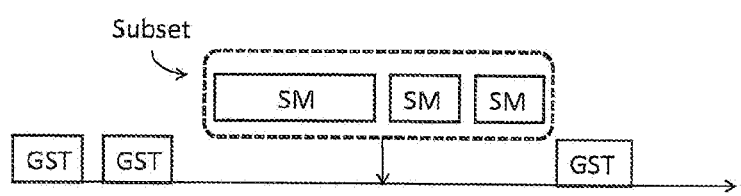
FIG. 48 is a schematic drawing showing an example of adding a subset of SM packets.

It can be possible to assemble packets of the same type, but from different queues, together and insert the selected packets, as one big packet, to fill a vacant gap. There could be several combinations of packets that fit the vacant gap. All the possible combinations form a set of adding options. However, only one combination or a subset of combinations is selected for adding packets and this is defined as the sequence of packets. FIG. 48 illustrates an example of adding a sequence, or subset, of SM packets on a line. In the example, the selected SM packets have different lengths and gap intervals.

Figure 49:
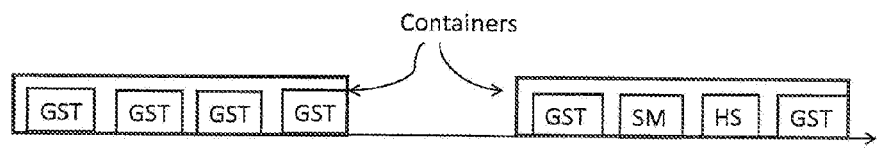
FIG. 49 is a schematic drawing showing an example of containers of a fixed length with packets on a hybrid line.

GST packets may be sent in containers. A container is used for sharing a wavelength or a circuit between several nodes. Each GST path between nodes, in other words a hybrid line, may have a container assigned of a specific length. Typically, each hybrid line is then represented by a container. However, there may be several containers of different size representing one or more hybrid lines. The containers may be synchronized with fixed lengths arriving in timeslots, as in a synchronous system, but may also have variable delay and vary in arrival time, as in an asynchronous system. In some embodiments, if containers are used on a hybrid line, GST and hybrid-SM (HS) packets are inserted into the containers, but SM packets are not bound by the container borders. A container can transport a burst of packets, or a sequence of packets. FIG. 49 illustrates an example in which containers of a fixed length comprise different types of packets.

Figure 50:
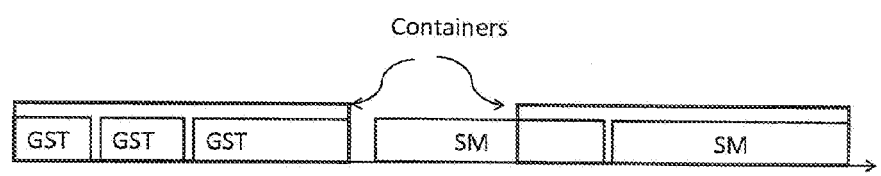
FIG. 50 is a schematic drawing showing an example of a container being filled with a GST packet burst and a container being filled with an SM packet subset.

FIG. 50 shows a container with a burst of GST packets. Another container has no GST packets but is filled with a sequence of SM packets. SM packets are not limited by container borders, but can also fill gap intervals between containers. In the example, the sequence of SM packets extends out of the container and into the gap between the containers. In reality, the container does not really "contain" the SM packets, since there is no relation between the SM packets and the container. As far as the SM packets are concerned, there are only vacant gaps; the insertion of SM packets into a container area is just a coincidence.

Figure 51:
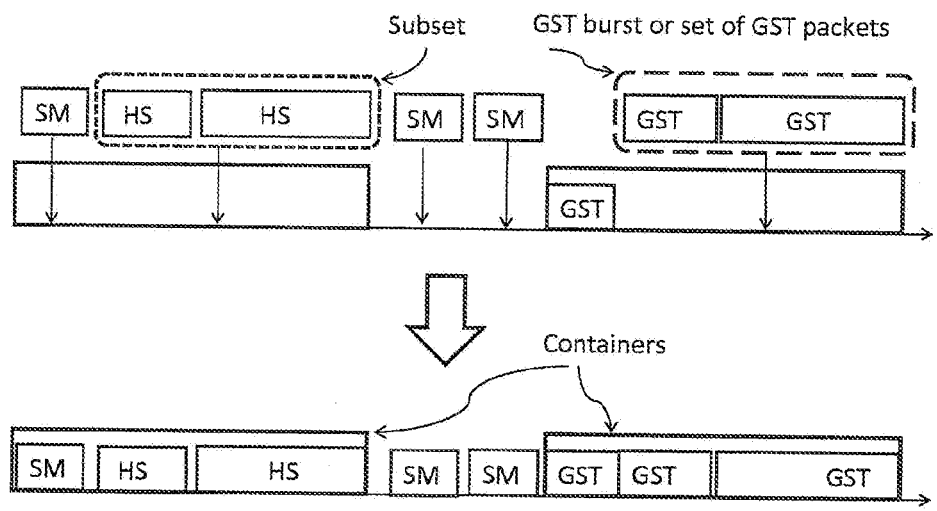
FIG. 51 is a schematic drawing showing an example on how vacant gaps in containers and between containers are filled with packets and group of packets.

FIG. 51 illustrates adding a burst of GST packets, a sequence of hybrid-SM packets, and single SM packets. In the example, a burst of GST packets, with minimum gap intervals is added into a vacant gap interval in a container. The GST packets are of different lengths. In another scenario, instead of adding a GST packet burst, a single set of GST packets may be added. Assuming the same packets in the figure, the set will then comprise two GST packets. In such a scenario, the gaps between the GST packets are preserved. In the other container in FIG. 51, a sequence of hybrid-SM packets is added, but there is still available space in the container. An SM packet is inserted in the remaining gap. In addition, the gap between the containers is vacant and two additional SM packets are thus added to fill this gap.

Figure 52:
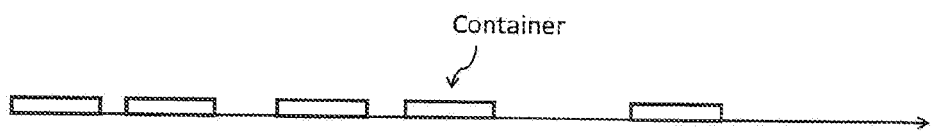
FIG. 52 is a schematic drawing showing an example of container traffic on a hybrid line, wherein the containers have a fixed length and with varying gap interval between the containers.

A wavelength can be divided into several time-slotted line channels and each line channel can be assigned a container, or multiple of containers, of a certain size. FIG. 52 illustrates container-traffic on a particular wavelength. In this example, all the containers are the same length. The gap intervals between the containers may be fixed, or may vary as shown.

Figure 53:
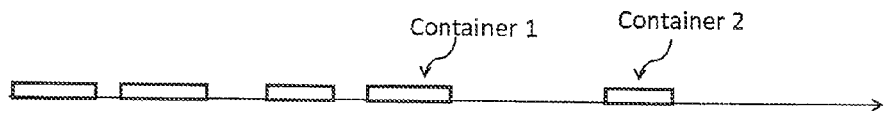
FIG. 53 is a schematic drawing showing an example of container traffic on a hybrid line, with two types of containers having fixed lengths and with varying gap interval between the containers.

FIG. 53 illustrates two types of containers each with fixed but different lengths, and with variable intervals between the containers. Each container size can be assigned to its own path (i.e. a hybrid line), or both container types can be assigned to the same path.

Containers may be accumulated together as super-containers. An Optimized Integrated Hybrid Traffic Node with multiple paths may reserve several containers of fixed length or of different lengths. These containers can be combined into a super-container, thereby reserving part of a wavelength for a hybrid line between one or several Optimized Integrated Hybrid Traffic Nodes.

Figure 54:
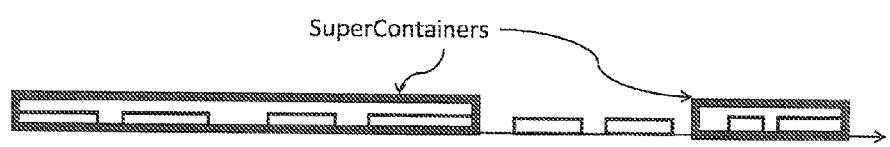
FIG. 54 is a schematic drawing showing an example of super-containers of varying length and gap interval comprising containers of different lengths.

FIG. 54 illustrates super-containers with varying lengths and gap intervals, comprising containers of different sizes. Between the super-containers, there can also be containers and packets, as the example shows.

Figure 55:
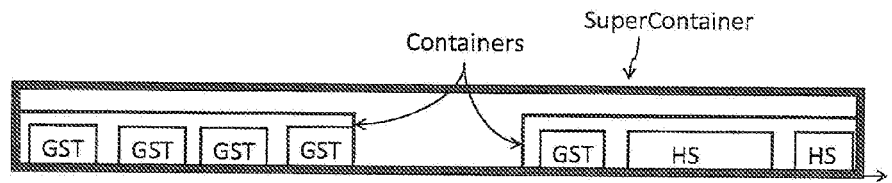
FIG. 55 is a schematic drawing showing an example of a super-container comprising containers of equal length and packets.

FIG. 55 shows a super-container containing two containers, of the same length, transporting GST packets and hybrid-SM packets. Even if the containers are of a common length, the length of a super-container may vary since the gap between the containers within it may vary.

Figure 56:
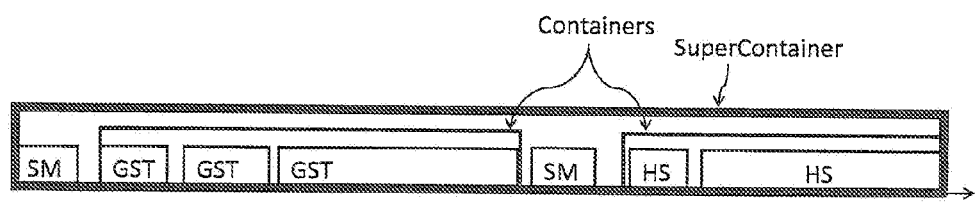
FIG. 56 is a schematic drawing showing an example of a super-container comprising two types of containers of unequal length and packets.

FIG. 56 illustrates a super-container containing two containers, of unequal length, transporting packets. To fill the existing vacant gaps between the containers, an SM packet is added inside the super-container. An SM packet is also inserted after the last container to fill the last vacant gap.

Figure 57:
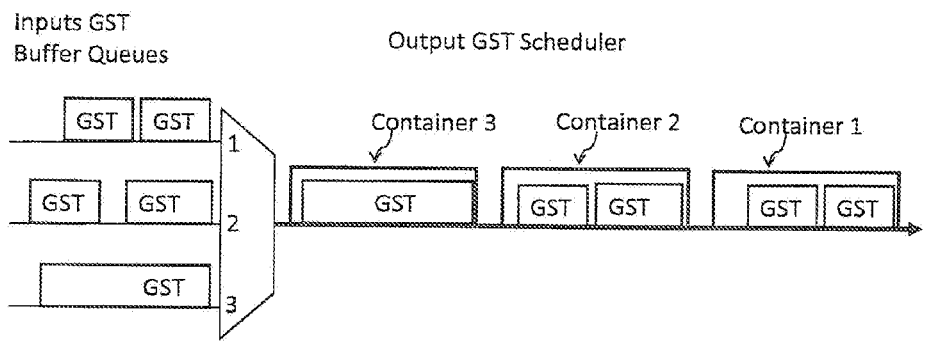
FIG. 57 is a schematic drawing showing an example of GST packets being aggregated and scheduled into continuous containers with minimum gaps between the GST packets.

Packets received from the Add-Drop Interfaces may be aggregated into container queues. FIG. 57 illustrates a GST Buffer Queue 180 receiving GST packets at three different inputs. The GST packets are aggregated into containers in three separated queues and are sent out on a line as three different hybrid lines. In this example, there is a relation between the queue input the packet is received at and the container the packet is sent in. Packets received at the first input are inserted into the first container, packets received at the second input are inserted into the second container, and packets received at the third input are inserted into the third container. The GST packets are aggregated and scheduled in continuous containers or bursts. As shown, the gap intervals between the packets are set to a minimum after being queued in the buffer queues.

Figure 58:
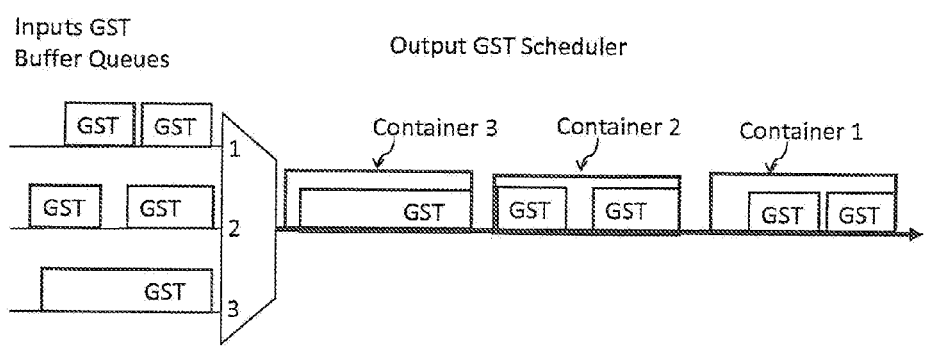
FIG. 58 is a schematic drawing showing an example of GST packets being aggregated and scheduled into containers where the gaps are kept between the GST packets.

FIG. 58 is similar to FIG. 57 except that the gap intervals between the packets are preserved when buffering the GST packets into containers. In this example, GST packets are aggregated and scheduled into containers, preserving the gap interval between the GST packets. There may thus be a variable gap between the GST packets in the container. This can avoid introducing packet delay variation.

The examples in FIGS. 57 and 58 can arise from the GST buffering and scheduling algorithms shown in FIGS. 18, 19, 23 and 24.

Figure 59:
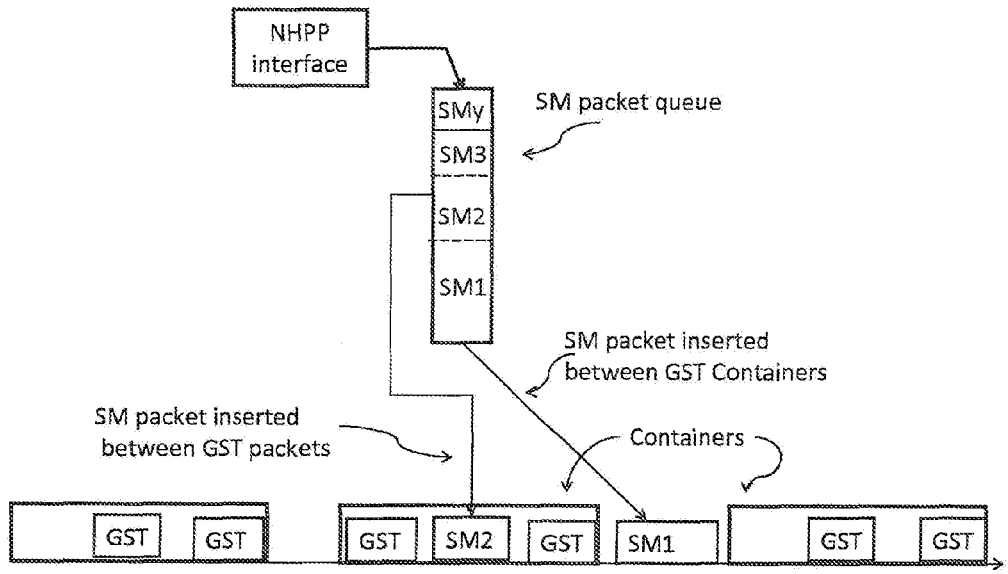
FIG. 59 is a schematic drawing showing an example of adding SM packets from an SM packet queue.

FIG. 59 illustrates adding SM packets from an SM buffer queue. In this example, SM packets are added between containers and inside containers. The SM packets in the queue are of different length.

Figure 60:
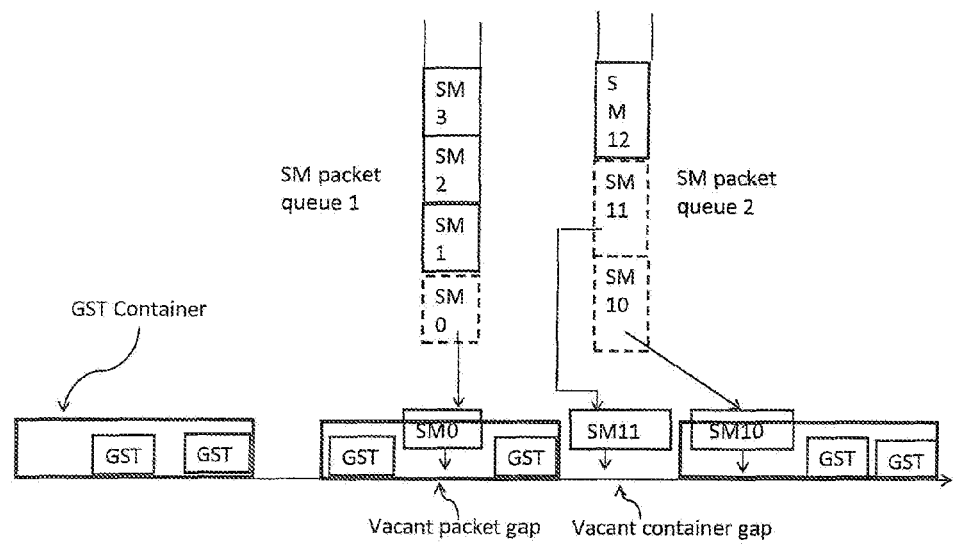
FIG. 60 is a schematic drawing showing an example of adding SM packets in containers and packet gaps from two SM packet queues.

FIG. 60 illustrates adding SM packets from two different queues. In this example, the SM packets buffered in a first SM packet queue have a specific packet size range, while SM packets buffered in a second SM packet queue have another specific packet size range. Two packets are shown being added from the first SM packet queue while one SM packet is added from the second SM packet queue.

Long packets may be added in large gaps and short packets in small gaps, to improve efficiency.

Figure 61:
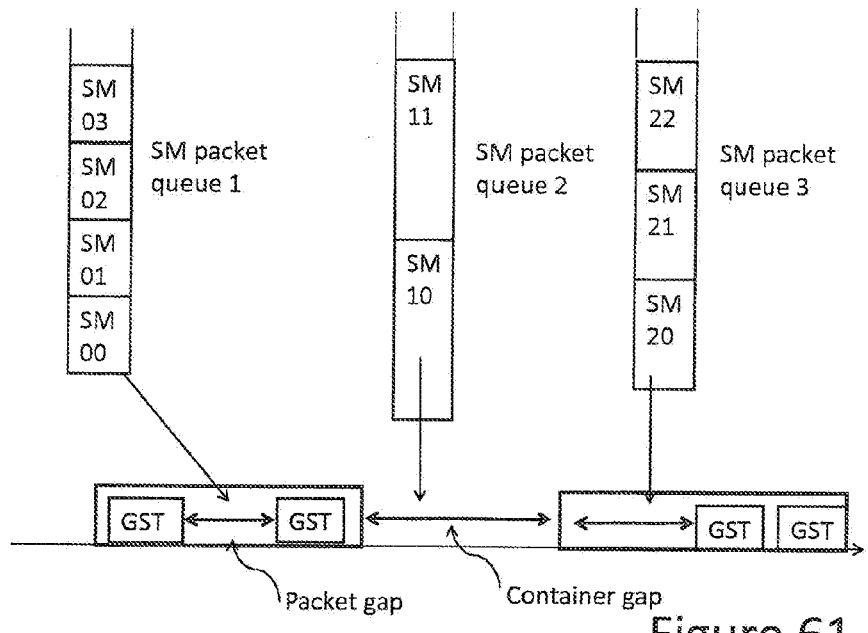
FIG. 61 is a schematic drawing showing an example of adding SM packets, optimized to GST gap-size, from multiple SM packet queues.

FIG. 61 illustrates the adding of SM packets, optimized for filling different GST gap-sizes, using multiple SM packet queues. In this example, there are three different packet size range queues and the SM packets are added into vacant gap intervals corresponding to the packet size intervals of the different queues.

Packets may be sorted into queues, for example according to the interface the packets arrive on, or according to packet source and/or destination address. The packets may thus be sorted into queues independently of the packet lengths. An algorithm for traversing through the queues, for finding the length of the first packet in the queue, can then be applied for finding packets with a suitable length for a specific gap size.

Figure 62:
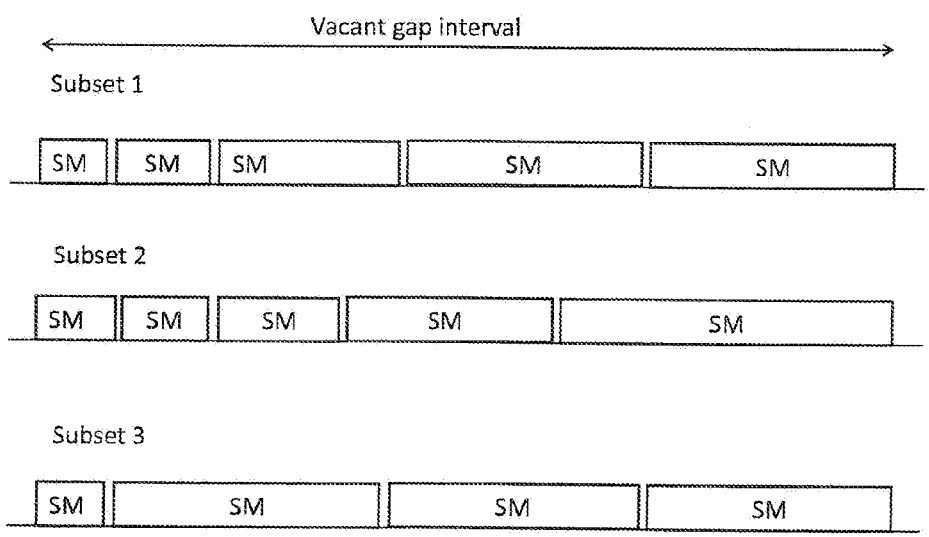
FIG. 62 is a schematic drawing showing an example of combination of SM packets that can fit into a vacant gap.

To improve performance, packets may be combined to fill a large gap. FIG. 62 illustrates possible combinations of SM packets for filling a vacant gap of a specific size. The combination actually selected can depend on parameter settings.

A more detailed description of the implementation of certain embodiments of the invention will now be given with reference to FIGS. 5 to 43.

Figure 5:
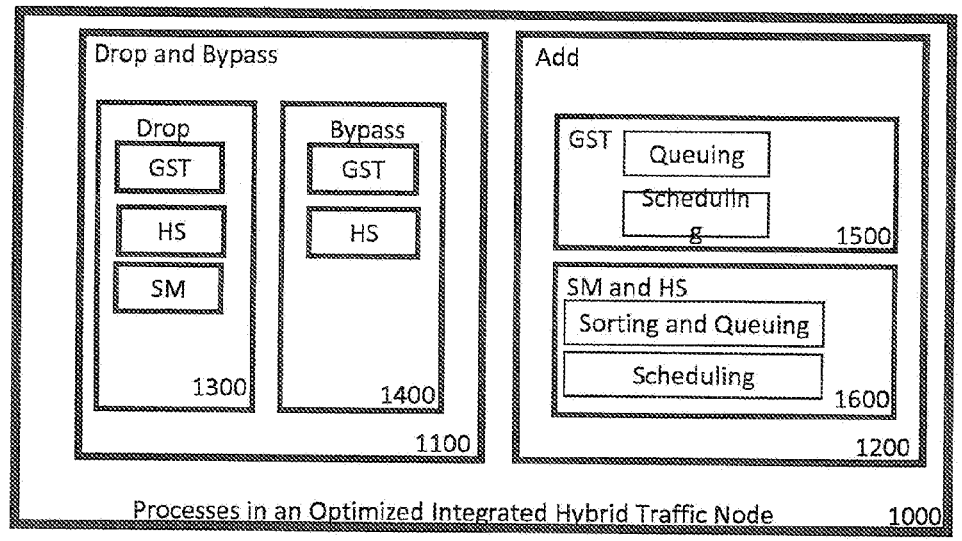
FIG. 5 is a schematic drawing showing an overview of the processes in a node embodying the invention.

FIG. 5 provides an overview of the main processes in an Optimum Integrated Hybrid Traffic Process. The two main processes are "Drop and Bypass" 1100 and "Add" 1200, operating independently of each other. In the "Drop and Bypass" process 1100, the packet type and/or the address of a packet received at the Line Interfaces 110 are identified. Depending on the type of packet and/or the address of the packet, the packet is either dropped in a drop sub-process 1300 or bypassed in a bypass sub-process 1400. Furthermore, each of the sub-processes comprises a process specific for each packet type. For the drop sub-process 1300 there is a process for each of the packet types GST, hybrid-SM and SM. However, the SM packets received from the Line Interfaces 110 are always dropped and as a result there are only packet-type processes for GST and hybrid-SM in the bypass sub-process 1400.

Overall, depending on the packet type and/or the address, a specific packet-type process is selected and the packet is either dropped from a line-interface or forwarded onto a line-interface to another node.

In the Add process 1200 both the address and packet type are identified, and there is a process for each of the packet types GST, hybrid-SM and SM. However, SM and hybrid-SM may also share the same process, since they are both SM type of packets until they are inserted onto a hybrid line.

Further, each specific packet-type process 1500, 1600 contains processes or algorithms for queuing, scheduling and other actions.

In other embodiments, the division between the main processes may be arranged differently from that shown in FIG. 5, and the sub-processes may include other packet type processes with other mechanisms. The Optimized Integrated Hybrid Traffic Node can be versatile and dynamically select the processes, sub-processes, packet type processes and algorithms that achieve the most optimal processing of traffic.

In some preferred embodiments, the order of packet dropping is first SM packets dropped, secondly hybrid-SM packets and then thirdly GST packets. In the adding process, first GST packets are added, secondly hybrid-SM packets and then thirdly SM packets. However, the packet types may, in other embodiments of the invention, be dropped and added in another order. For example, HL packets may be dropped before SM packets and SM packets may be added before HL packets.

In the dropping and adding process, traffic can be transported between lines operating at different bitrates. Generally, in metropolitan area networks (MANs), for example, a hybrid-line channel would transport traffic with a higher bit rate than traffic transported in Access Networks. A hybrid line might transport traffic with a bit rate of 10 Gbps, while a base station in an Access Network, connected to an Add-Drop line of an Optimized Integrated Hybrid Traffic Node, might transport traffic with a bit rate of 1 Gbps. Therefore, to optimize the transport of traffic and to adapt the networks to the differences in connection speed, the Optimized Integrated Hybrid Traffic Node is equipped with traffic transition means. In an Optimized Integrated Hybrid Traffic Node, traffic leaving a hybrid line and entering an Add-Drop line is up-scaled in time rate (i.e. its transmission is slowed down) and traffic entering a hybrid line from an Add-Drop line is downscaled in time rate (i.e. its transmission is sped up).

Figure 6:
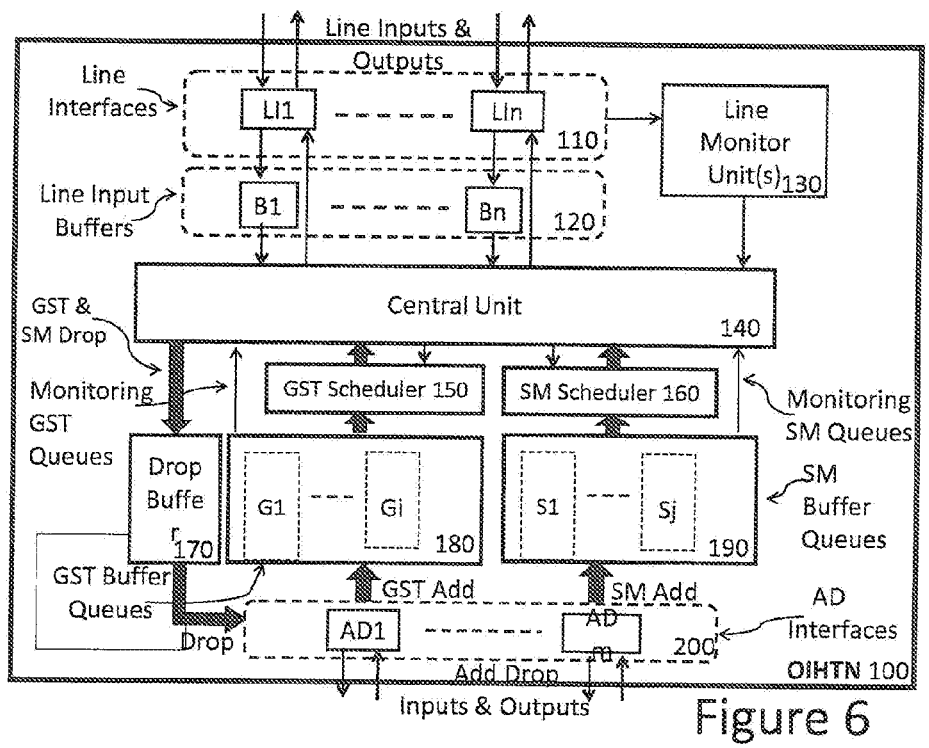
FIG. 6 is a schematic drawing showing the hardware blocks of a node embodying the invention, with electronic processing of packet traffic.

FIG. 6 illustrates the hardware blocks of an Optimized Integrated Hybrid Traffic Node 100. The Optimized Integrated Hybrid Traffic Node 100 contains a number of Line Interfaces 110 and a number of Add-Drop Interfaces 200. Each of the Line Interfaces 110 is connected to a Line Input Buffer 120. Packets entering an input at the Line Interfaces 110 are stored in a corresponding buffer. For example, packets received at Line Interface LI1 are stored in corresponding Buffer B1.

A Line Monitor Unit 130 is connected to the Line Interfaces 110, or may in other embodiments be connected to the Line Input Buffers 120, and forwards information to a Central Unit 140. The Central Unit 140 receives packets from the Line Input Buffer 120 and processes the traffic. Traffic to be dropped is sent to the Drop Buffer 170 and forwarded to outputs of the Add-Drop Interfaces 200. Traffic being added is received at inputs of the Add-Drop Interfaces 200 and separated into GST and SM traffic. The GST traffic proceeds to the GST buffer Queues 180 and is scheduled at the Central Unit 140 by a GST Scheduler 150. Similarly, the SM traffic proceeds to the SM buffer Queues 190 and is scheduled at the Central Unit 140 by an SM Scheduler 150. Afterwards, the Central Unit 140 switches the traffic out at the outputs of the Line Interfaces 110. The buffers 120, 180, 190 may be implemented as First In First Out (FIFO) buffers.

Figure 7:
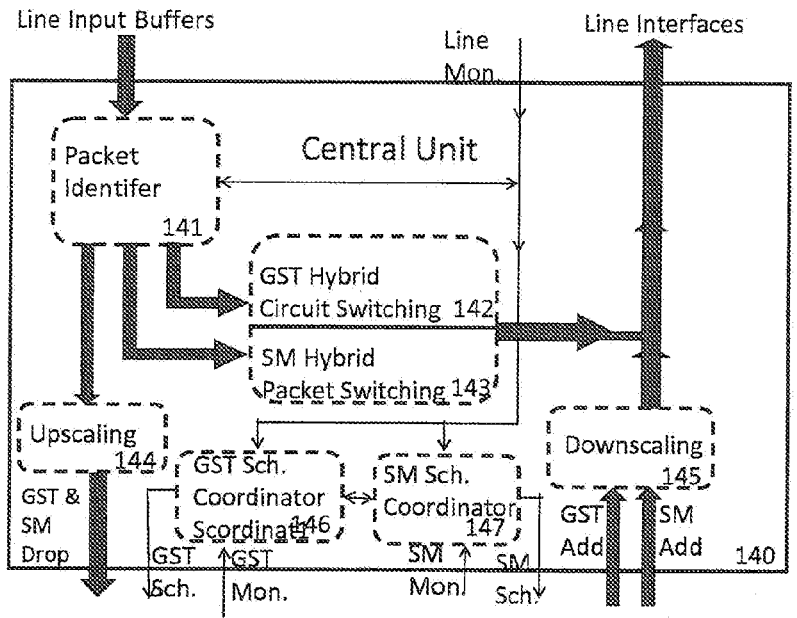
FIG. 7 is a schematic drawing showing the functional blocks of a central unit, located in a node, with electronic separation of traffic.
Figure 8:
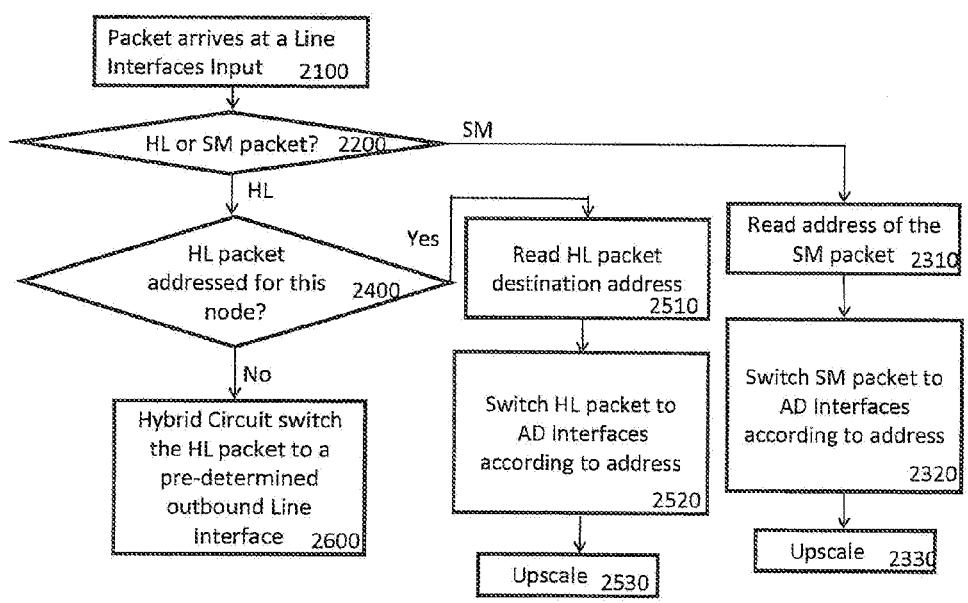
FIG. 8 is a flow diagram showing an algorithm for identifying and separating packets at line inputs.

In the Optimized Integrated Hybrid Traffic Node, the Central Unit 140 controls the switching of packets. FIG. 7 illustrates the functional blocks of a Central Unit 140 and FIG. 8 illustrates the algorithm implemented by a Central Unit 140. In the algorithm, information about packets arriving at the inputs of the Line Interfaces 110 is forwarded by a Line Monitor Unit 130 to a Packet Identifier 141 (step 2100). Based on the received information, the Packet Identifier 141 separates packets into HL or SM packets (step 2200).

If the packet is an SM packet, the address header is read 2310 and the packet is switched to a drop output according to the packet destination address 2320. Before the SM packet is forwarded to the Drop Buffer 170 shown in FIG. 6, the SM packet is disaggregated from a traffic stream and then up-scaled 2330.

If the packet is an HL packet, the HL address may be read and checked against the current node addresses 2400. If the addresses match, then a destination address header is read 2510 and the packet is switched to a drop output according to the packet destination address 2520. Before the HL packet is forwarded to the Drop Buffer 170, the HL packet is up-scaled in time 2530.

If the address does not match any addresses for this node, the HL packet is set for bypass and is forwarded to a predetermined Line Interface Output 2600. In the hybrid switch, the bypassing GST and hybrid-SM packets are Circuit Switched 142 and the bypassing SM packets are Packet switched 143.

However, since a line is an end-to-end connection, and will typically be distinguished from other lines by having a unique wavelength, the reading of an address is optional: an Optimized Integrated Hybrid Traffic Node may know what lines terminate with it, and thus not need to read addresses from HL packets.

Figure 9:
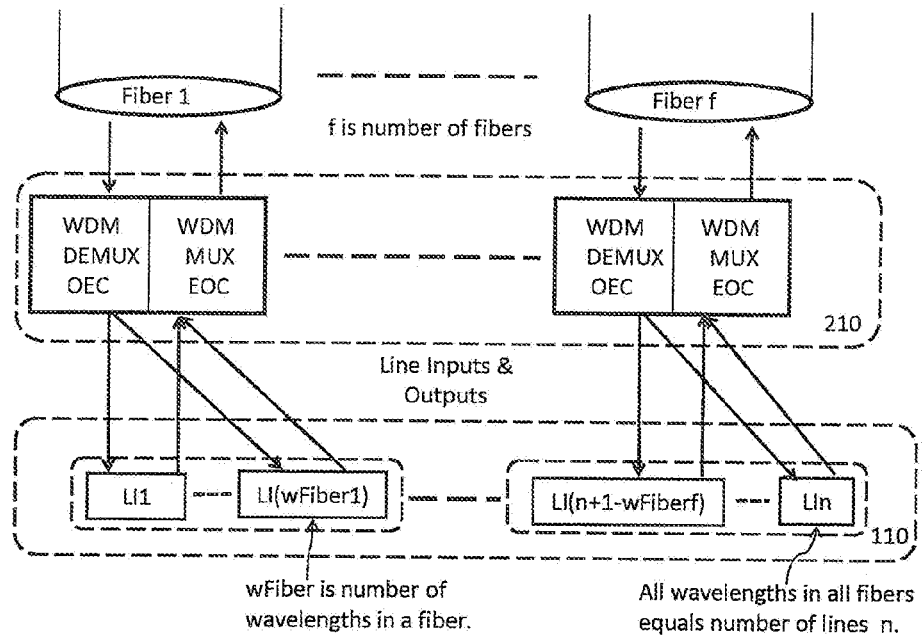
FIG. 9 is a flow diagram showing a hardware block diagram for wavelength multiplexing and de-multiplexing of optical traffic and conversion to electronic signals and back to optical signals for electronic processing of optically transmitted traffic.

In some embodiments of an Optimized Integrated Hybrid Traffic Node, optical traffic is converted and separated into electronic traffic and further processed in an electronic Central Unit 140. FIGS. 6 and 7 show the electronic processing hardware and FIG. 9 illustrates a hardware block diagram for electronic conversion and separation of optical traffic. In the optical fibres shown in FIG. 9, the traffic is bidirectional and the traffic is transported on a number of wavelengths in each fibre. The Converter Multiplexer Layer 210 receives traffic from a number of fibres, and wavelength division de-multiplexes (WDM DEMUX) and converts the traffic from optical to electronic traffic signals (OEC). The electronic traffic signal is forwarded to the Line Interfaces 110 and on to the Central Unit 140 for electronic processing. Traffic to be transported out of the Optimized Integrated Hybrid Traffic Node is collected from the Line Interfaces 110, converted from electrical to optical traffic signals (EOC) and wavelength division multiplexed (WDM MUX) in the Converter Multiplexer Layer 210, before being sent out into a number of fibres. In FIG. 6, the total number of lines in the Line Interface 110 is the sum of all the wavelengths used in all the fibres.

Figure 10:
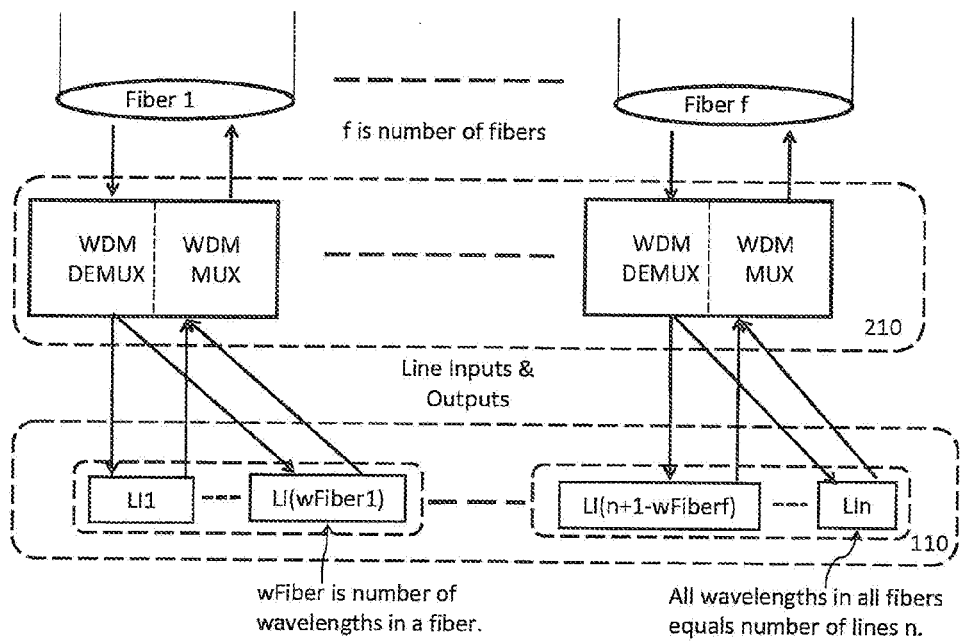
FIG. 10 is a flow diagram showing a hardware block diagram for wavelength multiplexing and de-multiplexing of optical traffic and separation of optical traffic.

However, in other embodiments of the Optimized Integrated Hybrid Traffic Node, not all the optical traffic signal is converted electronically in a Converter Multiplexer Layer 210. FIG. 10 illustrates a block diagram for purely optical separation of optical traffic without optical-to-electrical (OEC) and electrical-to-optical conversion (EOC). In the illustrated embodiment, traffic signals at the Line Interfaces 110 are optical, and to handle traffic optically, the FIFO buffers in the Line Input Buffer 120 in FIG. 6 may be implemented optically using, for example, fibre delay lines (FDL). Furthermore, the electronic Central Unit 140 is substituted with an Optical Central Unit 139.

Figure 11:
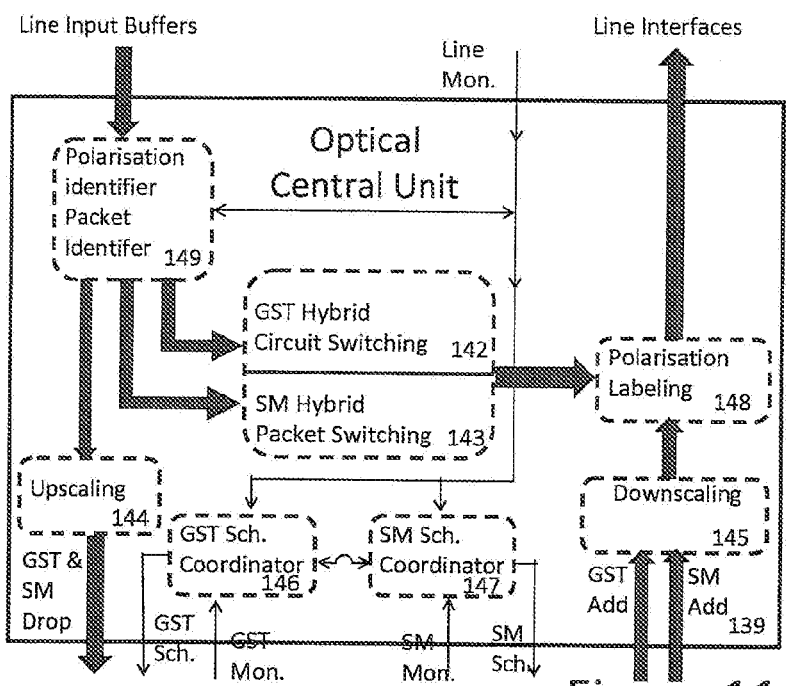
FIG. 11 is a schematic drawing showing the functional blocks of an optical central unit, located in a node, with optical processing of traffic.

FIG. 11 illustrates the functional blocks of an Optical Central Unit 139 for the optical separation of traffic. In the embodiment of the Central Unit, the traffic is forwarded optically from the Line Input Buffers 120 to a Packet Identifier 149. The Packet identifier 149 is equipped with a function for separating packet types optically by the use of, for example, the polarization property of light. Separating packet types by polarization may be implemented by utilizing, for example, polarization beam-splitters.

After the separation of packets, the optical traffic set for dropping may be converted into electronic packet traffic in the Packet Identifier 149, while traffic set for bypassing can be switched in the Hybrid Switches 142, 143. The GST Hybrid Switch 142 and SM Hybrid Switch 143 may process traffic either electronically or optically, or one switch can process traffic optically and the other switch electronically. The Packet Identifier 149 converts the traffic to the proper switching format independently of whether the bypassing traffic is switched electronically or optically. After the switching, the electrical and/or optical traffic is forwarded to the Polarization Labelling Unit 148 which converts any electronic traffic to optical traffic (EOC). The Polarization Labelling Unit 148 combines the packet types by, for example, utilizing optical polarization, before forwarding the traffic to the Line Interfaces 110 and then on to the Wavelength Division Multiplexing Unit 210.

Overall, in the illustrated embodiments the Optimized Integrated Hybrid Traffic Node 100, and more specifically the Central Unit 139, 140, can process traffic electronically and/or optically. GST packets and hybrid-SM packets may be circuit switched electronically or optically while SM packets may be packet-switched electronically or optically.

The Optimized Integrated Hybrid Traffic Node can support the dropping, bypassing and adding processes that are found in the Optimum Integrated Hybrid Traffic Process, in order to increase and optimize the filling rate of packets into vacant gaps on the hybrid lines.

Figure 12:
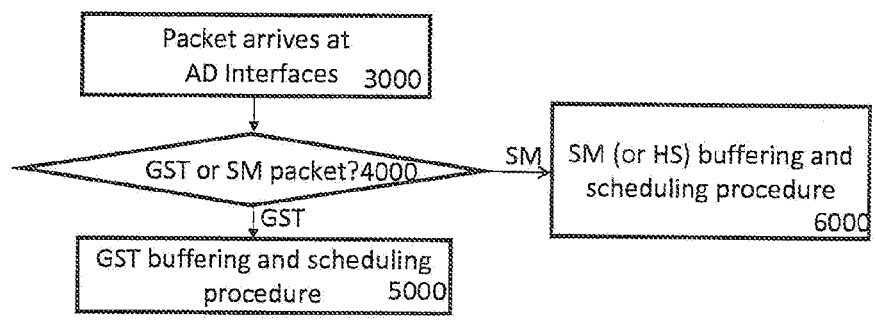
FIG. 12 is a flow diagram showing an overview of the queuing and scheduling algorithm applied for adding traffic.

FIG. 12 gives an overview of the adding algorithm. Packets to be added are received 3000 at the inputs of the Add-Drop Interfaces 200. The type of packet is identified in the Add-Drop Interfaces 200 and they are separated into GST and SM packets 4000. A GST packet, to be added to a hybrid line, is forwarded to the GST Buffer Queues 180 and thereafter scheduled 5000 by a GST Scheduler 150. Similarly, an SM packet to be added to a line-output is forwarded 6000 to the SM Buffer Queues 190 and thereafter scheduled 6000 by an SM Scheduler 160. The scheduled traffic is forwarded to a Central Unit 140.

The GST scheduler 150 is coordinated by a GST Scheduler Coordinator 146 and the SM scheduler 160 is coordinated by an SM Scheduler Coordinator 147. The coordinators receive information about vacant gaps from the Line Monitor Unit 130, information about dropped packets from the Packet identifier 141, 149, and information about available packets in the GST Buffer Queues 180 and SM Buffer Queues 190. On the basis of the received information, the coordinators 146, 147 determine which packets are to be added to the hybrid lines, and forward these packets to the Downscaling Unit 145.

The Downscaling Unit 145 downscales traffic from a higher time rate (lower bit rate) to a lower time rate (higher bit rate) and inserts traffic into vacant gap intervals. The traffic from the hybrid switches 142,143 is combined with the added traffic. If an SM packet should bypass one or more nodes, the Downscaling Unit 145 labels or tags the packet as a hybrid-SM packet, and such a packet is defined as a hybrid-SM (HS) packet. In the receiving node, the label or tag is popped off from the hybrid-SM packet in a Packet Identifier 141, 149. Tagging or labelling and removing the label or tag of packets may be performed by, for example, utilizing Virtual Local Area Network (VLAN) tagging, as defined in the IEEE 802.1Q standard or other IEEE standards defining VLAN tagging or MAC-addressing methods, or Multi-Protocol Label Switching (MPLS) labelling, as defined in the relevant IETF standards.

Figure 13:
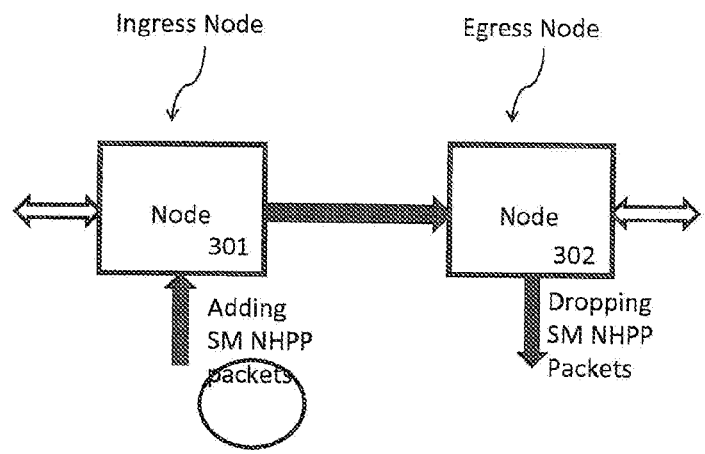
FIG. 13 is a schematic drawing showing a Next Hop Packet Path scenario, wherein packets are only sent between neighbouring nodes.

In the Optimum Integrated Hybrid Traffic Process, SM packets follow either a Next Hop Packet Path (NHPP) or a Multi-Hop Packet Path (MHPP). A Next Hop Packet Path is a path between two neighbouring nodes as illustrated in FIG. 13. At the transmitting node 301, SM packets are buffered, scheduled and inserted into vacant gaps between bypassing GST and hybrid-SM packets (i.e. bypassing HL packets). At a neighbouring node 302, the packets are picked out and dropped. However, an SM packet can be looped within a node, whereby the packet is dropped and is then added to the SM Buffer Queues 190 by the Add-Drop Interfaces 200 for reinsertion. Such an SM packet then competes for vacant packet gaps with other SM packets added at the current node.

Figure 14:
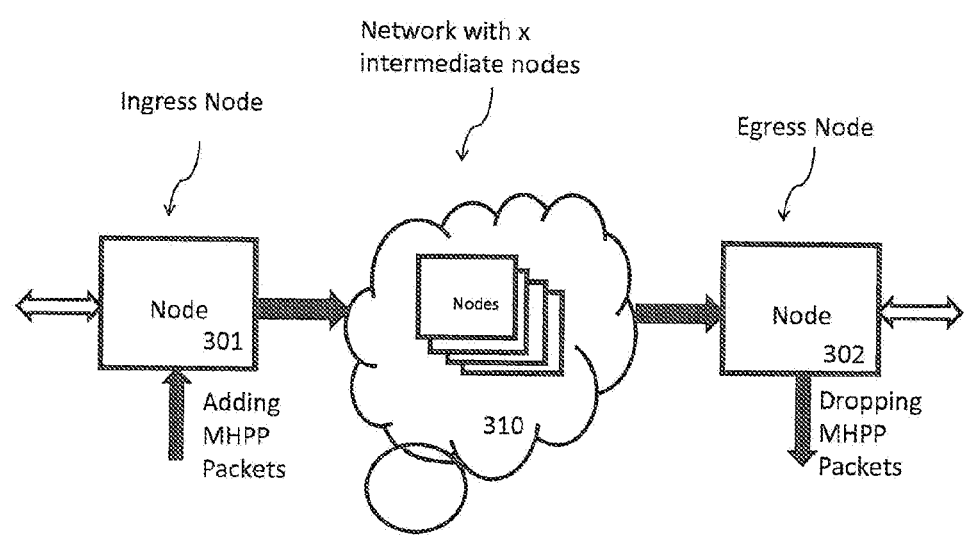
FIG. 14 is a schematic drawing showing a Multiple Hop Packet Path scenario, wherein packets are sent throughway number of intermediate nodes.

While a Next Hop Packet Path is a local path between two neighbouring nodes, a Multi-Hop Packet Path passes through multiple nodes in a network, as illustrated in FIG. 14. If an SM packet is added to a Multi-Hop Packet Path, it is labelled or tagged to be switched as a GST packet, and becomes a hybrid-SM (HS) packet. A hybrid-SM packet is processed as a GST packet at intermediate nodes until the packet reaches the egress node which is the endpoint of the Multi-Hop Packet Path. A hybrid-SM packet following a Multi-Hop Packet Path will have lower priority than a GST packet when being added, but receive absolute QoS guarantees when being switched in bypassing nodes, like a GST packet transported at a hybrid line. To keep the high QoS for HL packets, the hybrid-SM packets are added only to unused gaps between bypassing HL packets scheduled for downstream nodes. Hybrid-SM packets may not be added in HL timeslots or containers belonging to, or reserved by, upstream traffic. This is for avoiding contention between hybrid-SM packets and other HL packets.

Figure 15:
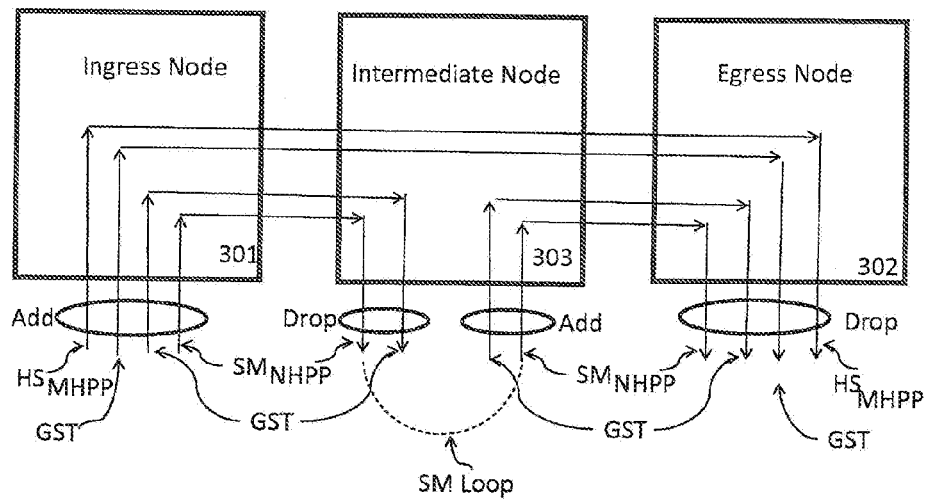
FIG. 15 is a schematic drawing showing an example of adding and dropping of different types of packets in a three node hybrid network.

FIG. 15 provides an overview of Next Hop Packet Path and Multi-Hop Packet Path scenarios. The figure shows the adding and the dropping of packets in a three-node network. In the example, SM Next Hop Packet Path packets are sent from one node to a neighbouring node. In the intermediate node 303, an SM loop is illustrated to show how an SM packet dropped at the intermediate node 303 can be reinserted and forwarded to the downstream neighbouring node 302. The hybrid-SM Multi-Hop Packet Path packets are shown to traverse the network from an ingress node 301 to an egress node 302, while bypassing through an intermediate node 303. GST traffic can be dropped at a neighbouring node (e.g. if it is on a line that ends at that node), but will typically bypass several intermediate nodes before being dropped at an egress node 302.

Figure 16:
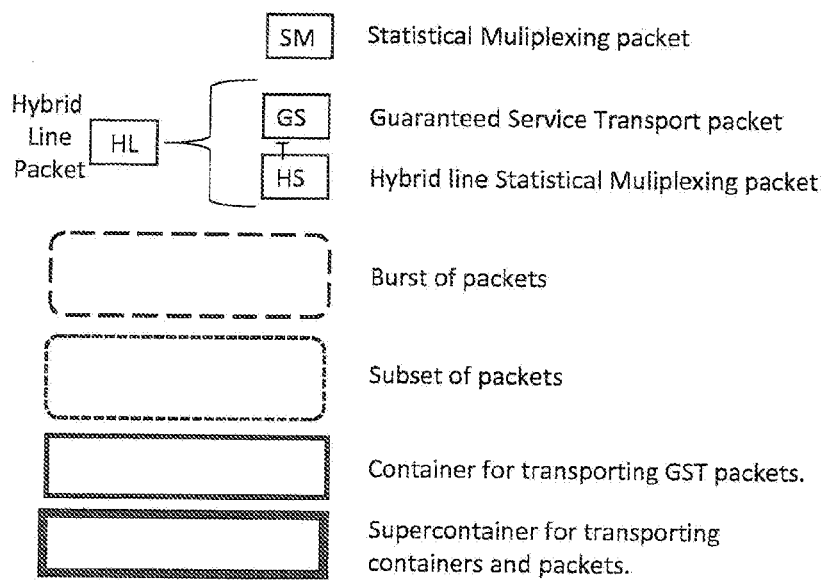
FIG. 16 is a schematic drawing showing an overview of packet types and packet groups.

An Optimized Integrated Hybrid Traffic Node 100 can transport SM and GST packets, but can also group packets together. FIG. 16 gives an overview of packet types and packet groups supported by an Optimized Integrated Hybrid Traffic Node 100. The packet types shown in the figure are SM packets and GST packets. As mentioned earlier, an SM packet may be transported similarly to a GST packet on a hybrid line. The SM packet is then tagged or labelled to operate like a GST packet, and such a packet is defined as a hybrid-SM (HS) packet. Only hybrid-SM or GST packets (collectively called HL packets) follow the hybrid line.

In the Optimized Integrated Hybrid Traffic Node 100, there are several possible algorithms for grouping packets together. In a vacant gap, there may be an opportunity to put packets of the same type together and insert the selected packets, as one big packet, to occupy a vacant gap more efficiently than a single inserted packet would. There may be several combinations of packets that can fit the vacant gap. All possible combinations constitute a set of adding opportunities. However, only one combination, or a sequence, is selected to be added.

Another grouping algorithm is the container algorithm. GST packets and hybrid-SM packets may be aggregated into a set of single packets in a container, or into a burst within a container, before being scheduled onto a hybrid line. Scheduling of individual packets allows a simpler scheduling scheme that gives a minimum delay while transporting packets in containers gives a more complex scheduling scheme. Bursting of GST packets increases throughput for SM and hybrid-SM packets, but does not lead to optimal delay or Packet Delay Variation characteristics.

In the Optimized Integrated Hybrid Traffic Node 100, packets can be aggregated into containers or bursts by the Buffer Queues 180, 190. A burst is typically a collection of packets where the vacant gap intervals between packets are reduced to a minimum; for example to zero. Generally, a decrease in gap intervals between GST packets leads to an increase in the gap interval between adjacent bursts, thereby providing more opportunity to insert SM packets efficiently. Since the gap interval between bursts are larger in size than ordinary GST packets gap intervals, the use of bursts can allow more SM packets to be added. A container can contain a burst, or a collection of packets with gaps between the packets. The purpose of grouping packets into a container is to add a container of packets into a vacant gap (which may be a time-slot) at a hybrid line. The container may start with a container control packet (CCP) with information of the properties of the container such as its length, number of packets, and/or time of scheduling.

GST packets can be transported in groups determined by containers. Containers can therefore also be used to allow several nodes to share a wavelength or a line. Each node may have a container of a specific length and there may be several containers of different sizes on a hybrid line. The allocation of containers may be scheduled and synchronised between nodes in a strict or loose manner, but may also be used without synchronisation. If synchronisation is not applied, low packet-delay-variation (PDV) may not be guaranteed. Reservation of bandwidth available for the containers may be controlled through a management system or control-plane. By monitoring the container-control packets, information about when a container arrives, as well as its length, is available to a node.

In some embodiments, if containers are used on a hybrid line, GST and hybrid-SM packets are included in the containers. However, SM packets are not bound by the container borders and can be inserted anywhere where there is a vacant gap, e.g. within a container, between containers, or overlapping the edges of one or two containers.

In other embodiments, neither hybrid-SM packets nor SM packets are limited by the container borders, and can be inserted in any suitable gap interval. This is typically only appropriate in situations where it is known that no GST packets will be added by any downstream nodes.

A container may transport a burst of packets or a sequence of packets. Moreover, a node may be allocated several containers of different length and the containers may further be combined into a super-container.

Container-control packets (CCP) are a special type of GST packet which can be used to give Optimized Integrated Hybrid Traffic Nodes information about the properties of containers and/or super-containers. A container-control packet may contain parameters to give information such as when a container starts, when a container ends, how long the container is, etc. If there are containers on a hybrid line, the container-control, GST and hybrid-SM packets are, in preferred embodiments, inserted into containers and are never transmitted outside containers.

Figure 17:
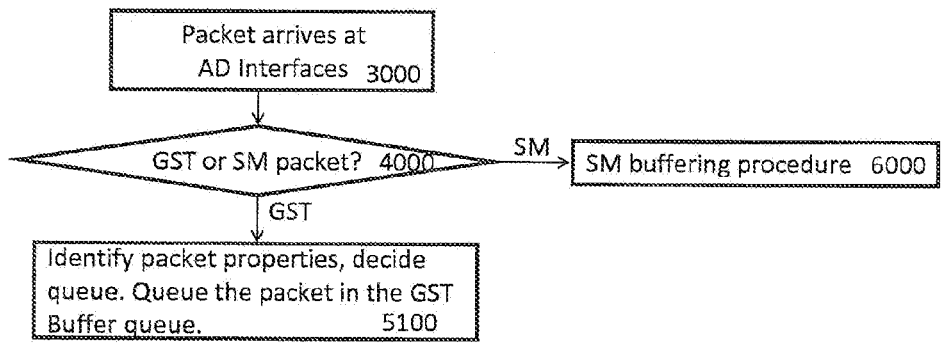
FIG. 17 is a flow diagram showing an algorithm for selecting a queue for a GST packet according to properties of the packet.

The grouping of packets is implemented by the queuing and scheduling processes. A packet to be added to a hybrid line is identified and stored in a queue until the packet is scheduled. However, a packet may also be scheduled directly without first being queued. FIG. 17 illustrates a flow diagram algorithm for selecting a queue for a GST packet according to properties of the packet. A GST packet to be added to a hybrid line is received at an Add-Drop Interfaces Input 3000. The packet type is identified 4000 in the Add-Drop Interfaces 200, and packet properties, such as packet length and destination are identified. A queue is then selected based on packet properties. The GST packet is forwarded from the Add-Drop Interfaces 200 to a selected queue in the GST Buffer Queues 5100. FIG. 17 shows the example of a single GST packet, with no grouping parameter, being selected for a queue. Generally, the number of queues Gi in the GST Buffer Queues 180 is determined by grouping parameters, packet properties and the amount of GST traffic to be added. If the packet is not identified as a GST packet, but identified as an SM packet, the packet follows the SM buffering procedure 6000.

FIG. 18 is a flow diagram algorithm for queuing a GST packet in a burst queue, in a container, with a minimum of gap intervals between GST packets. GST packets may be aggregated into a burst in a GST Buffer queue. The aggregation of packets into bursts has the purpose of managing the guaranteed bandwidth and increasing the throughput of SM traffic. A queue is selected based on grouping parameters and packet properties. Thereafter, the GST packet is forwarded from the Add-Drop Interfaces 200 to a selected queue in the GST Buffer Queues 180 5200. In the example, the grouping parameter is a burst queue with a minimum of gap intervals between the packets.

Figure 19:
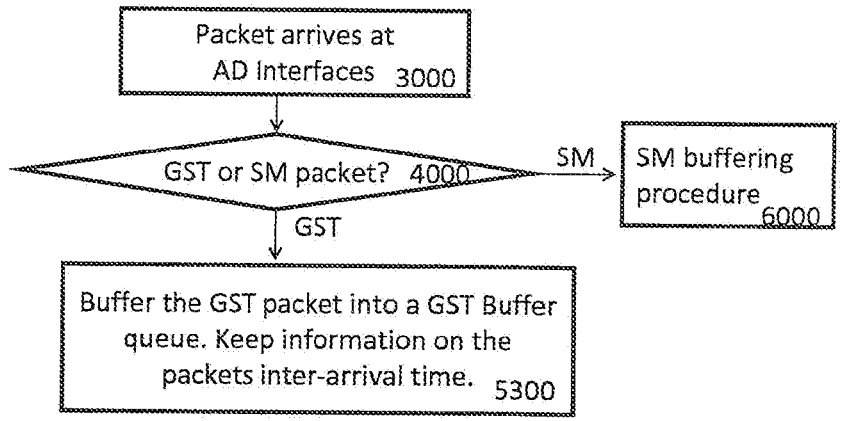
FIG. 19 is a flow diagram showing an algorithm for queuing a GST packet and belonging gap in a container.

FIG. 19 is a flow diagram algorithm for queuing GST packets with gaps in a container while preserving gaps between the packets 5300. Information about the packets' inter-arrival time is kept, and as such Packet Delay Variation is avoided.

The algorithms in FIGS. 18 and 19 may be used in combination with the algorithm in FIG. 17, for first finding a queue for a GST packet according to properties of the GST packet.

Figure 20:
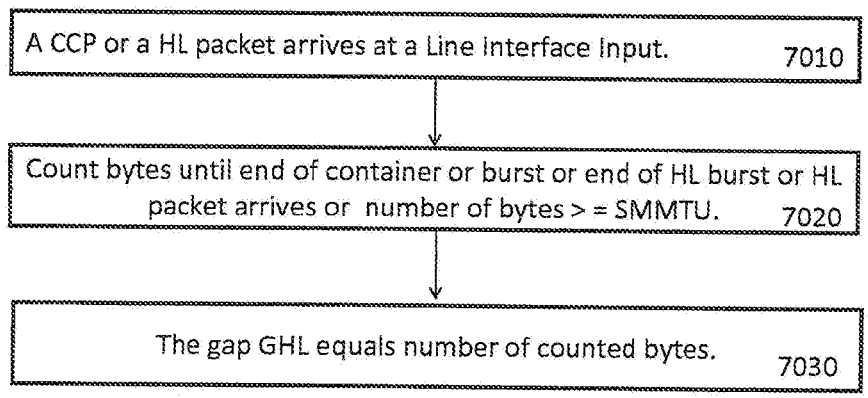
FIG. 20 is a flow diagram showing an algorithm for finding the length of a gap at a line interface input.

As illustrated in FIG. 6, after the GST packets have been queued in the GST Buffer Queues 180, the GST scheduler 150 selects and schedules GST packets in queues to be added to the hybrid lines. The Optimized Integrated Hybrid Traffic Node 100 monitors and determines the size of gap intervals. FIG. 20 illustrates an algorithm for finding the length of a gap (GHL) at a line input. In the algorithm, the Line Monitor Unit 130 monitors the container-control packets and the HL packets arriving at the Line Interface Inputs 7010. If a container-control packet or an HL packet arrives, then bytes are counted from the end of the container or burst until another Hybrid Line packet arrives or until a number of bytes is larger or equal to SMMTU 7020, where SMMTU (SM Maximum Transmission Unit) is a packet size insertion limit determined by a maximum allowable packet length of SM and/or hybrid-SM packets. The gap interval GHL equals the number of counted bytes 7030.

In the Optimum Integrated Hybrid Traffic Process, the scheduling of packets can occur with or without interference from HL packets at the hybrid lines. The Optimized Integrated Hybrid Traffic Node 100 selects the scheduling algorithm giving the highest filling rate in combination with high QoS.

Figure 21:
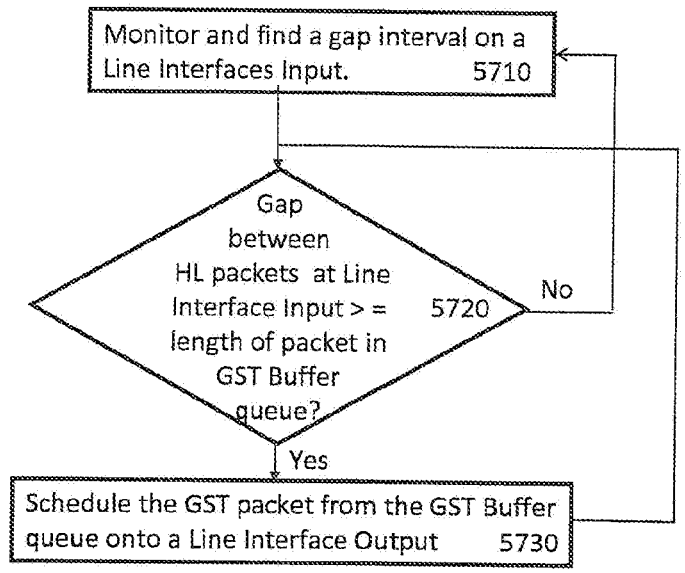
FIG. 21 is a flow diagram showing an algorithm for scheduling a GST packet at a hybrid line, whenever there is a GST packet in a GST queue, without interfering with HL packets.

FIG. 21 illustrates an algorithm for scheduling a GST packet at a hybrid line, whenever there is a GST packet in a GST queue, without interfering with HL packets. In the arrangement, interfering with HL packets gives the same effect as putting variable delay on HL packets. In the algorithm, the Central Unit finds a gap interval 5710 and compares the gap with the length of the GST packets in the GST queues, with the purpose of identifying a GST packet with a packet length less than said gap interval 5720. If a suitable packet is identified, then the GST packet is scheduled and added into the vacant gap 5730. However, if there are no packets with length less than the gap, then the Central Unit finds the next vacant gap, and the algorithm starts over again.

Figure 22:
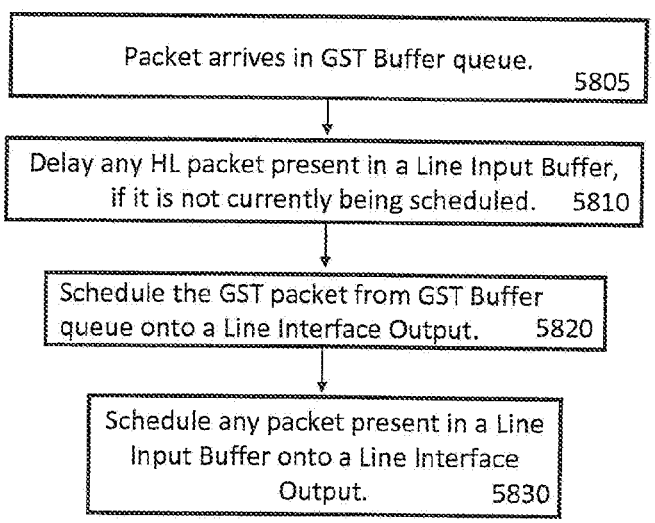
FIG. 22 is a flow diagram showing an algorithm for scheduling a GST packet at a line output and delaying HL packets.

If there exist such circumstances that HL traffic may be interfered with, by putting variable delay on HL packets, another algorithm may be utilized. FIG. 22 illustrates an algorithm for scheduling GST packets at a line output while interfering with HL packets at a line. When a packet arrives in a GST Buffer queue 5805, a Central Unit 139, 140 delays any HL packet present in the Line Input Buffer 120, thereby delaying the scheduling of HL packets except those HL packets currently being scheduled 5810. Then a GST packet is scheduled from a GST Buffer queue and added to a hybrid line 5820, and the delayed HL packets are scheduled onto a Line Interface output 5830. Thereafter, another GST packet is located in the queue and the algorithm is repeated.

In addition to the scheduling of single packets, the Optimum Integrated Hybrid Traffic Process supports the scheduling of a container of packets. For example, GST packets may be aggregated into a container in a GST packet queue. The aggregation of packets into containers suits both the purpose of managing the guaranteed bandwidth and increasing the throughput of SM traffic. The bandwidth of aggregated container outputs is defined as BWAGG and the bandwidth of the GST traffic is defined as BWGST. A burst may be placed in a container and have a specific maximum size CMAX. The scheduling of containers occurs in fixed or loose time intervals, and the time TCC is the exact or approximate interval between containers belonging to a specific HL. The time TCD is the duration of a scheduled container. The bandwidth of a hybrid line is defined as BWHL and given by the periodicity of the time intervals between containers at a specific hybrid line and the maximum length of the container. The number of hybrid lines is defined as NHL. Further, the time downscaling factor is given by BDS and the time up-scaling factor is defined as BUS. The bandwidth of the line on which the aggregated container output is scheduled is defined as BWLINE and is the same as BWAGG if there are no gaps between the NHL containers.

This leads to the equations:

$TCD = CMAX/BWAGG$      1.

$TCC = TCD \times NHL$      2.

$BWHL = CMAX/TCC$      3.

$BDS = 1/BUS = BWAGG/BWHL$      4.

In equation 4, the downscaling factor is greater or equal to 1 and the up-scaling factor is smaller or equal to 1. In some preferred embodiments, the up-scaling factor and the inverse downscaling factors are the same for both the interval between packets and the duration of packets. However, in other embodiments, there may be different scaling factors for the interval between packets and the duration of packets.

The up-scaling and downscaling factors are then given by:
BUSP—up-scaling duration of packets
BUSBP—up-scaling interval between packets
BDSP—downscaling duration of packets
BDSBP—downscaling interval between packets
And the equation 4 expands to:

$$BUSP=1/BDSP \qquad 5.$$

$$BDSBP=1/BUSBP \qquad 6.$$

These factors may be set by parameters other than BWAGG and BWHL.

As an example, the maximum size of a burst may be approximately the size of an Ethernet jumbo frame of 9600 Bytes, where a Byte is 8 bits. In a system aggregating several 1 Gbps streams into a 10 Gbps stream, traffic from each of the 1 Gbps interfaces will be aggregated into containers. Each of the 1 Gbps interfaces is then allocated to a dedicated hybrid line.

Then this gives BWAGG=10 Gbps, CMAX=9600 Bytes and NHL=10.

When calculating the example, the result is:

$$TCD=(9600\times8)/10 \text{ Gbps}=7.68\times10-6 \text{ S}$$

$$TCC=7.68\times10-6 \text{ S}\times10=7.68\times10-5 \text{ S}$$

$$BWHL=9600\times8 \text{ bits}/7.68\times10-5 \text{ S}=1 \text{ Gbps}$$

$$BDS=1/BUS=10 \text{ Gbps}/1 \text{ Gbps}=10$$

FIGS. 18 and 19 show two different algorithms for queuing. Each of the queuing algorithms is accompanied by a scheduling algorithm, as shown in FIGS. 23 and 24.

Figure 23:
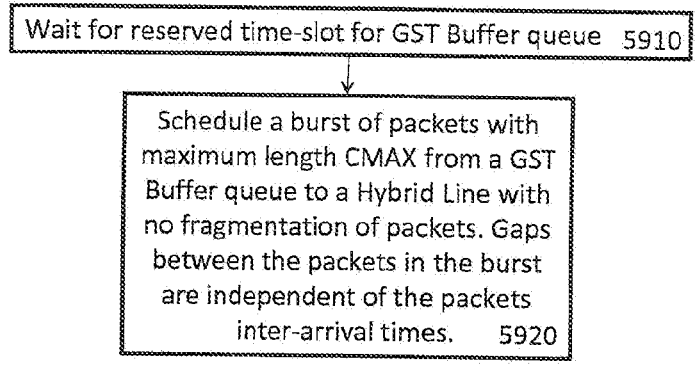
FIG. 23 is a flow diagram showing an algorithm for scheduling a burst or set of single GST packets with minimum packet gap intervals, in a container.
Figure 24:
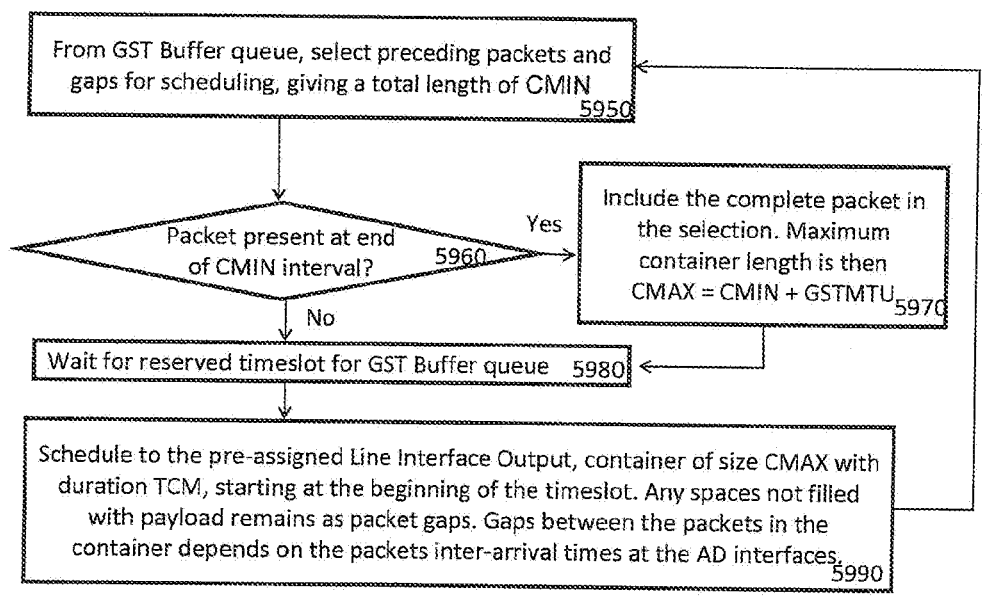
FIG. 24 is a flow diagram showing an algorithm for scheduling a set of single GST packets with packet gap intervals intact, in a container.

FIG. 18 shows a burst queue algorithm for buffering with minimum gap intervals between queued GST packets and FIG. 23 illustrates an algorithm for scheduling a burst, or a set of single packets with minimum packet gap intervals, in a container. A container limits a burst or a set of single packets to a certain length CMAX, and to a specific scheduling time (accurately or loosely defined). In one example, a burst or a set of single packets in a GST Buffer queue waits for a reserved timeslot 5910, and when the reserved timeslot arrives, the burst or set of single packets is scheduled from one of the queues among the GST Buffer Queues 180, onto the reserved timeslot at a hybrid line 5920.

In another example, shown in FIG. 19, the packets and their associated packet gaps are aggregated. However, the length of the packets and packet gaps varies and the aggregation of packets is required to fit into a fixed length container interval, and, as a result, 100 percent utilization of a container interval may not be achieved. The container interval is therefore equipped with an overcapacity length corresponding to a GSTMTU, where GSTMTU (GST Maximum Transmission Unit) is a packet size insertion limit determined by maximum allowable packet length of GST packets. The duration of a GSTMTU at the buffer aggregating side is defined as TAMTU.

The aggregation mechanism works by aggregating packets from the Add-Drop Interfaces 200 within a defined period of time THL. For avoiding packet fragmentation, the GST Buffer Queue 180 is allowed to finish the aggregation of a packet that the GST Buffer Queue 180 started to queue. The container is scheduled on the hybrid line output whenever the appointed container interval is available. The duration of a container interval TCC at the aggregated side, which is the time between each container belonging to a specific hybrid line, is then given by:

$$TCC=(THL+TAMTU)\times(BWHL/BWAGG) \qquad 7.$$

The maximum number of GST aggregation inputs NGI corresponds to the number of hybrid lines NHL and is limited to:

$$NGI=(THL/(THL+TAMTU))\times(BWAGG/BWHL). \qquad 8.$$

Typically for avoiding a large overhead, the GST MTU is much less than the number of bytes being aggregated in THL, in other words THL is much less than TAMTU.

FIG. 19 shows a queuing algorithm for buffering GST packets with the belonging gap interval and FIG. 24 illustrates an algorithm for scheduling a container of packets with packet gap intervals intact. The burst requires that the container is of minimum size CMIN 5950. If there is found that a packet is scheduled at the border of the CMIN interval 5960, then the packet scheduling is allowed to finish by increasing the container length with an overcapacity length CMAX=CMIN+GSTMTU 5970. Afterwards, the scheduler waits for the reserved timeslot for the GST Buffer queue 5980. At the reserved timeslot, a container is scheduled to a pre-assigned hybrid line output. The container is scheduled with a size CMAX, and the container starts at the beginning of the timeslot and have duration TCM. TCM typically corresponds to TCD. Any spaces not filled with payload remains as vacant packet gaps. The size of gaps between packets in a container depends on the packets inter-arrival times at the Add-Drop Interfaces 200. However, before being added to a hybrid line output the packets and the gaps are downscaled in the time domain, given by the BDS factor, to keep the ratio between packet size and packet gaps intact and to adapt to the difference in bit rate 5990.

Referring to the algorithms above, applying SMMTU and GSTMTU, in some embodiments the SMMTU and/or the GSTMTU need not correspond to the maximum allowable packet length of SM and GST packets respectively, but may be set according to other parameters.

In the adding sub-processes and algorithms, comprising queuing and scheduling of GST packets, as discussed above, the packets may be grouped. Grouping alternatives for GST packets are: single packet, burst, containers, super-container, or a combination of these. In addition, each group may have subgroups as shown in the examples in FIGS. 18 and 19. Other grouping alternatives are possible, as the skilled person will appreciate.

In addition to the adding of GST traffic, the Optimum Integrated Hybrid Traffic Process covers the adding of SM traffic and more specific the buffering, sorting and scheduling of hybrid-SM packets and SM packets.

Figure 25:
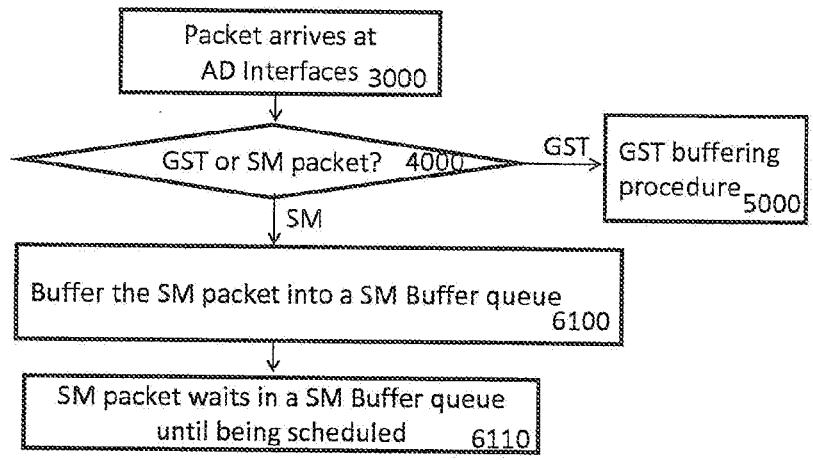
FIG. 25 is a flow diagram showing an algorithm for buffering an SM packet with a single queue for each Add-Drop Interface Input.

FIG. 25 illustrates an algorithm for buffering an SM packet within a single queue for all Add-Drop inputs, or a single queue for each Add-Drop Interface Input. In the algorithm, GST and SM packets are separated 4000 in the Add-Drop interfaces 200, and if the packet is an SM packet then the packet is buffered in a queue in the SM Buffer Queues 190. The queue selected may or may not correspond to the Add-Drop Interface Input at which the SM packet is received. In the SM Buffer queue, the SM packet waits until being scheduled 6110.

Figure 26:
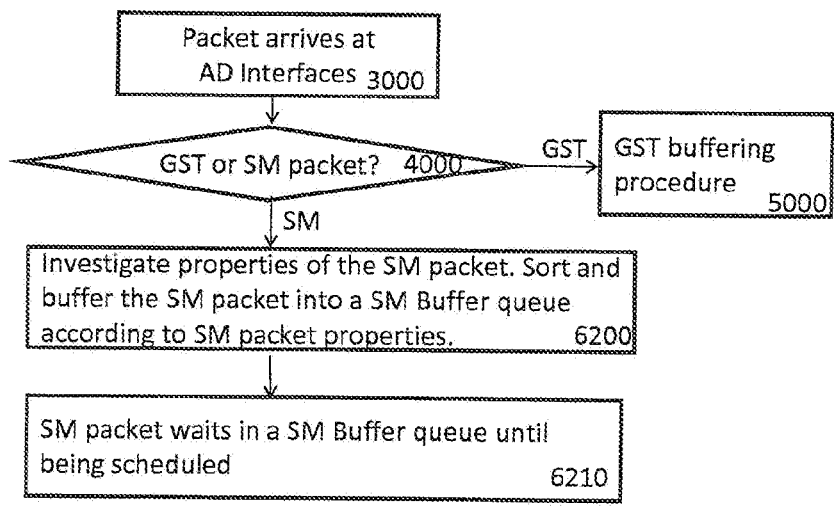
FIG. 26 is a flow diagram showing an algorithm for buffering an SM packet with multiple queues for each Add-Drop Interface Input.

Furthermore, the algorithm can be extended by having multiple queues for each input. FIG. 26 illustrates an algorithm for buffering SM packets with multiple queues for each Add-Drop Interface Input. In the algorithm, GST and SM packets are separated 4000 in the Add-Drop interfaces 200 and subsequently, if the packet is an SM packet, it is sorted and buffered in one of the SM Buffer Queues 190. The queue selected is determined by one or more SM packet properties; for example, a required QoS value, the Add-Drop Interface Input the SM packet is received at, and/or a defined set of properties for an SM packet, correspond to a particular category. In the example, there are multiple queues and categories for each input, and as such when a queue is selected, the SM packet is buffered into an SM Buffer queue corresponding to a defined category 6200. In the SM Buffer queue, the SM packet waits until being scheduled 6210.

Figure 27:
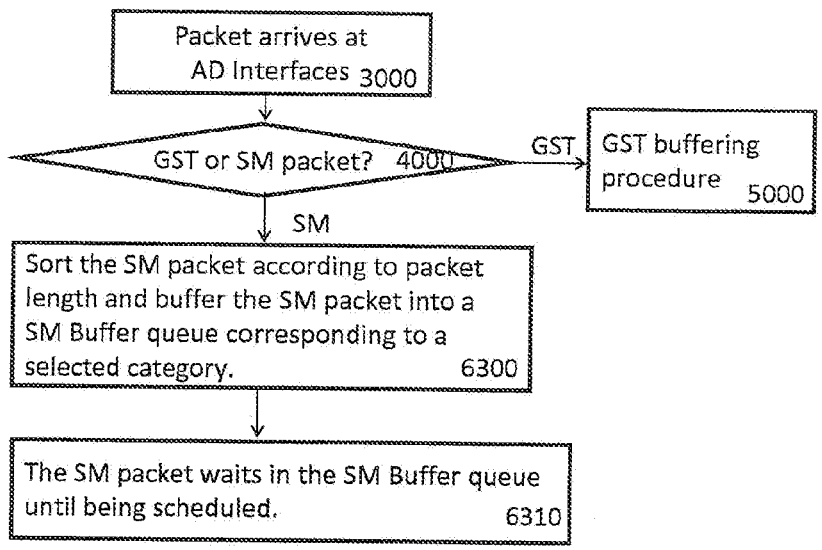
FIG. 27 is a flow diagram showing an algorithm for sorting and buffering of an SM packet into an SM buffer category queue dependent on packet length.

Moreover, the packets may be sorted depending on packet properties or other parameters. FIG. 27 illustrates an algorithm for sorting and buffering an SM packet into an SM buffer category queue according to SM packet length. In the algorithm, an SM packet is sorted according to packet length and buffered into an SM Buffer queue corresponding to the category 6300. Furthermore, categories may be defined as different intervals of packet lengths. When a queue is selected, the SM packet is buffered into an SM Buffer queue corresponding to a selected category 6310. In the SM Buffer queue, the SM packet waits until being scheduled 6310.

Figure 28:
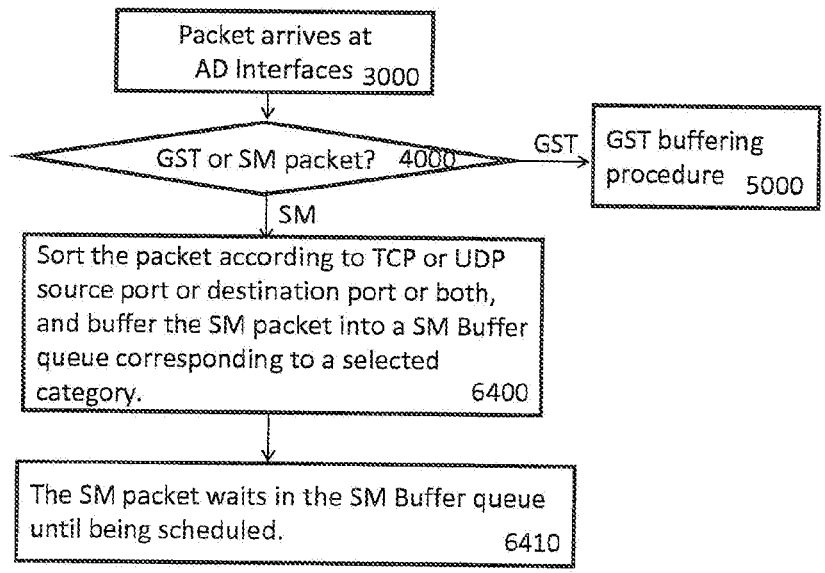
FIG. 28 is a flow diagram showing an algorithm for sorting and buffering of an SM packet into an SM buffer category queue dependent on packet port parameter.

FIG. 28 illustrates an algorithm for sorting and buffering an SM packet into an SM buffer category queue determined by packet Transmission Control Protocol (TCP) or User Datagram Protocol (UDP) source port or destination port or both. In the algorithm, an SM packet is sorted according to TCP or UDP source port or destination port or both, and buffered into an SM Buffer queue corresponding to a selected category 6400. Furthermore, the categories may be defined as different intervals of source and/or destination ports. In the SM Buffer queue, the SM packet waits until being scheduled 6410.

The algorithm for optimizing sorting of hybrid-SM packets and/or SM packets into FIFO queues may be an interfaces algorithm, a packet length algorithm, UDP header source port algorithm, UDP header destination port algorithm, UDP header source and destination port algorithm, TCP header source port algorithm, TCP header destination port algorithm, TCP header source and destination port algorithm, QoS algorithm, destination and/or origin address algorithm, or a combination of any of these algorithms.

Other sorting algorithms may be utilised. Depending on parameter setting, the Optimized Integrated Hybrid Traffic Node may dynamically select one or more sorting algorithms that achieve particularly favourable or optimal processing of HL and SM traffic.

Figure 29:
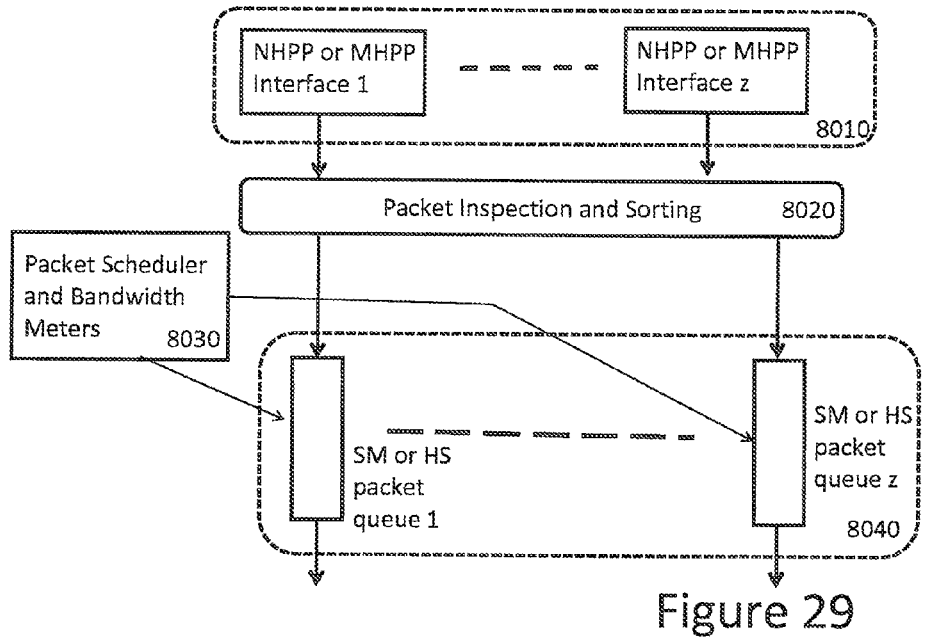
FIG. 29 is a schematic drawing showing an overview diagram for sorting and scheduling of SM Next Hop Packet Path packets and hybrid-SM Multi-Hop Packet Path packets.

In the Optimum Integrated Hybrid Traffic Process, SM packets may be added as SM Next Hop Packet Path packets or as hybrid-SM Multi-Hop Packet Path packets. FIG. 29 gives an overview of an SM and hybrid-SM packet-adding process and more specifically the inspection, sorting and scheduling processes 8020. SM and hybrid-SM packets enter the Next Hop Packet Path and Multi-Hop Packet Path interfaces 8010 respectively, and packets are forwarded as SM or hybrid-SM packets into the Add-Drop Interfaces 200. The interface 8010 may be a combination of Next Hop Packet Path and Multi-Hop Packet Path interfaces, allowing both SM and hybrid-SM packets to enter before being sorted 8020 into queues.

As shown in FIGS. 25-28, packets may be sorted into queues according to packet length, QoS, destination address or other parameters. Packets in queues may be scheduled according to packet parameters alone or be scheduled according to packet parameters and bandwidth meters. Bandwidth meters monitor the bandwidth received by the queues and information may be used for giving priority to queues receiving low or the lowest bandwidth, and/or for giving higher bandwidth to queues according to a configured weight parameter 8030. As such, the scheduling from the SM Buffer Queues 190 and, as thus the SM packet delays, can be controlled 8040.

After the buffering and sorting of SM packets, as shown in the FIGS. 25-28, the packets are scheduled as shown in FIGS. 30-33.

Figure 30:
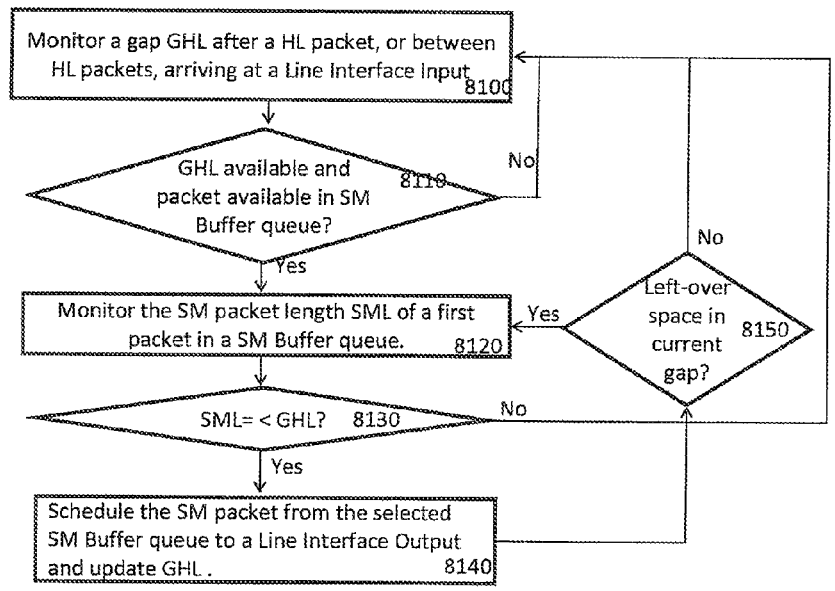
FIG. 30 is a flow diagram showing an algorithm for scheduling a single SM Next Hop Packet Path packet from an SM Buffer queue.

In the example in FIG. 15, SM Next Hop Packet Path packets are sent from one node to a neighbouring node. FIG. 30 illustrates an algorithm for scheduling a single SM Next Hop Packet Path packet from an SM Buffer queue. In the algorithm, a gap after an HL packet or between HL packets (GHL) is monitored at a Line Interface Input 8100. If the gap is vacant for an SM packet and an SM packet is available in an SM Buffer queue 8110, then an SM packet length (SML) of a first packet in an SM Buffer queue is detected 8120. If SML is equal to or smaller than GHL 8130, then the SM packet is scheduled to a Line Interface Output and the GHL is updated by reducing the size of the gap interval GHL by SML, in other words, subtracting SML from GHL to find an updated GHL value 8140. If SML is larger than GHL, the process starts over. If there is still space to be filled in the updated GHL after having scheduled an SM packet, the process finds the SML of the next packet in the SM buffer queue, and the process is repeated 8150.

Figure 31:
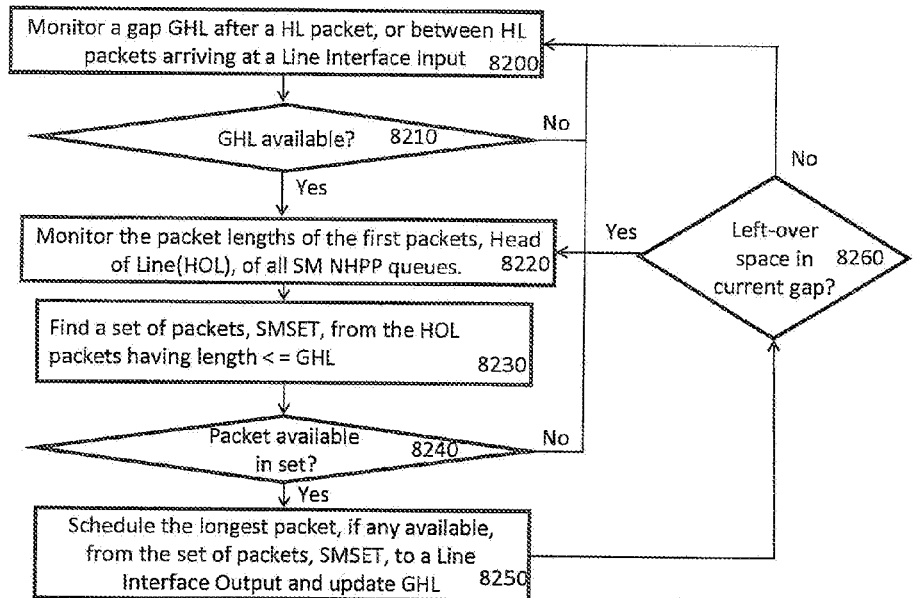
FIG. 31 is a flow diagram showing an algorithm for scheduling an SM Next Hop Packet Path packet, being selected from one of multiple queues, considering the length of the Head-of-Line packet in each queue.

In addition to scheduling a single SM Next Hop Packet Path packet, the Optimum Integrated Hybrid Traffic Process can schedule an SM Next Hop Packet Path packet from a set of queues. FIG. 31 illustrates an algorithm for scheduling an SM Next Hop Packet Path packet selected from one of multiple queues, by considering the length of the Head-of-Line (HOL) packet in each queue. A gap after an HL packet or between HL packets (GHL) is monitored at a Line Interface Input 8200. If the gap is vacant for an SM packet 8210, then all the packet lengths of the first packets (Head-of-Line packets) of all the SM Next Hop Packet Path queues are monitored 8220. All the Head-of-Line packets having length less or equal to GHL are included in a set of possible SM packets (SMSET) 8230. If there is at least one packet in the SMSET 8240, then the longest packet in SMSET is scheduled for a Line Interface Output, and the value of GHL is updated accordingly 8250. If there is still space to be filled in the gap, the process is repeated 8260.

Figure 32:
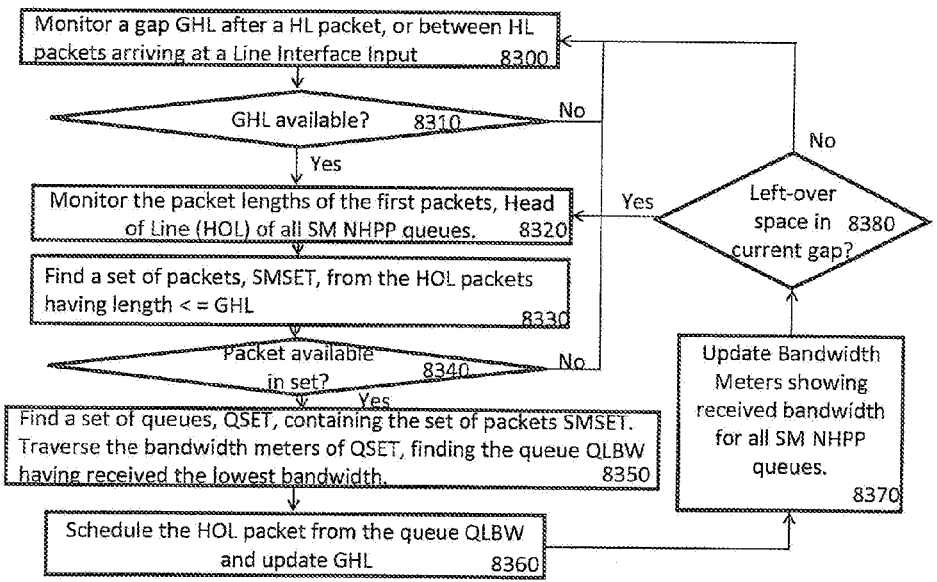
FIG. 32 is a flow diagram showing an algorithm for scheduling an SM Next Hop Packet Path packet being selected from one of multiple queues, considering the length of the Head-of-Line packet in each queue, and the bandwidth each queue receives.

Typically, some queues will schedule more packets than others. However, the Bandwidth Meters 8030, as shown in FIG. 29, may be used to monitor the bandwidth received by each queue, enabling a fair scheduling from the queues. FIG. 32 illustrates an algorithm for scheduling an SM Next Hop Packet Path packet selected from one of multiple queues, taking account of the length of the Head-of-Line packet in each queue, and the bandwidth each queue receives. The scheduling algorithm is expanded by the step of the scheduler finding a set of queues (QSET) containing a set of possible packets (SMSET). The scheduler then traverses the bandwidth meters of QSET and selects the queue having received the lowest bandwidth (QLBW) 8350. A SM packet from the selected queue QLBW is then scheduled, and GHL is updated by subtracting SML 8360. After that all bandwidth meters are updated 8370.

Figure 33:
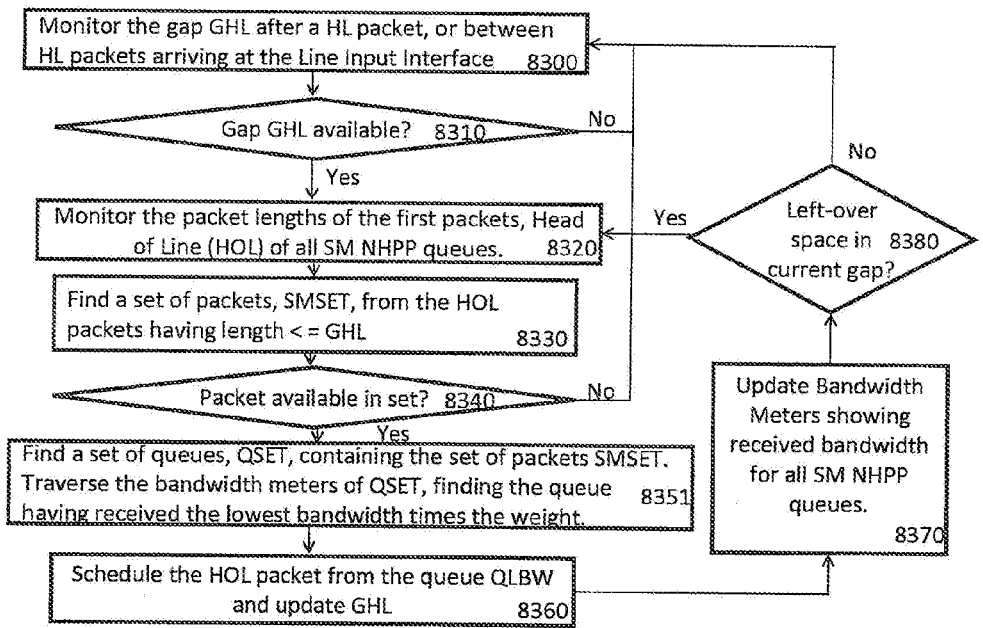
FIG. 33 is a flow diagram showing an algorithm for scheduling an SM Next Hop Packet Path packet being selected from one of multiple queues, considering the length of the Head-of-Line packet in each queue, and the weighted bandwidth each queue receives.

Instead of having a fair sharing of the bandwidth for each queue, the bandwidth for each queue can be weighted, for example for sharing bandwidth between interfaces when queues are associated with individual interfaces. FIG. 33 shows an algorithm for scheduling an SM Next Hop Packet Path packet selected from one of multiple queues, where the selection is based on considering the length of the Head-of-Line packet in each queue and the weighted bandwidth each queue receives. The algorithm is similar to the algorithm in FIG. 32, but the scheduler traverses the bandwidth meters of QSET, and finds and selects the queue having received the lowest value determined by the product of the bandwidth and a weight specific for each queue.

Figure 34:
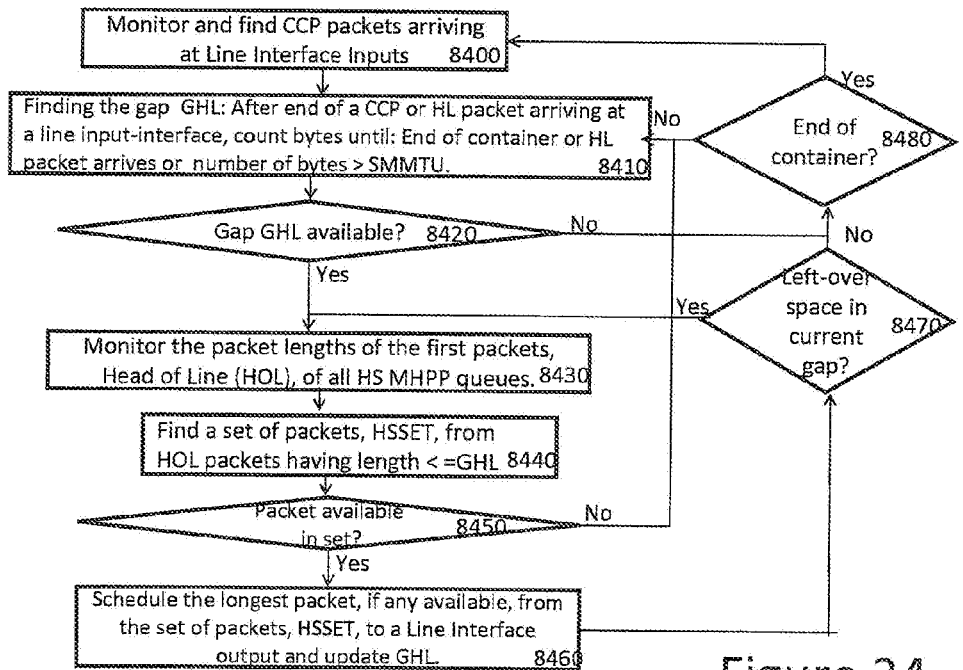
FIG. 34 is a flow diagram showing an algorithm for scheduling a hybrid-SM Multi-Hop Packet Path packet being selected from one of multiple queues, considering the length of the Head-of-Line packet in each queue.
Figure 35:
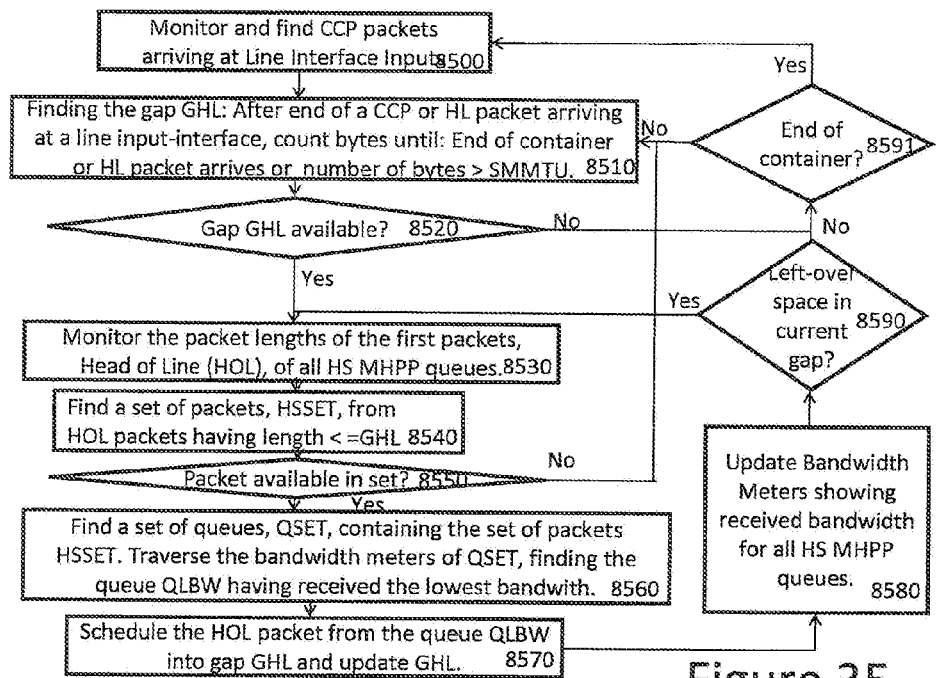
FIG. 35 is a flow diagram showing an algorithm for scheduling a hybrid-SM Multi-Hop Packet Path packet being selected from one of multiple queues, considering the length of the Head-of-Line packet in each queue, and the bandwidth each queue receives.
Figure 36:
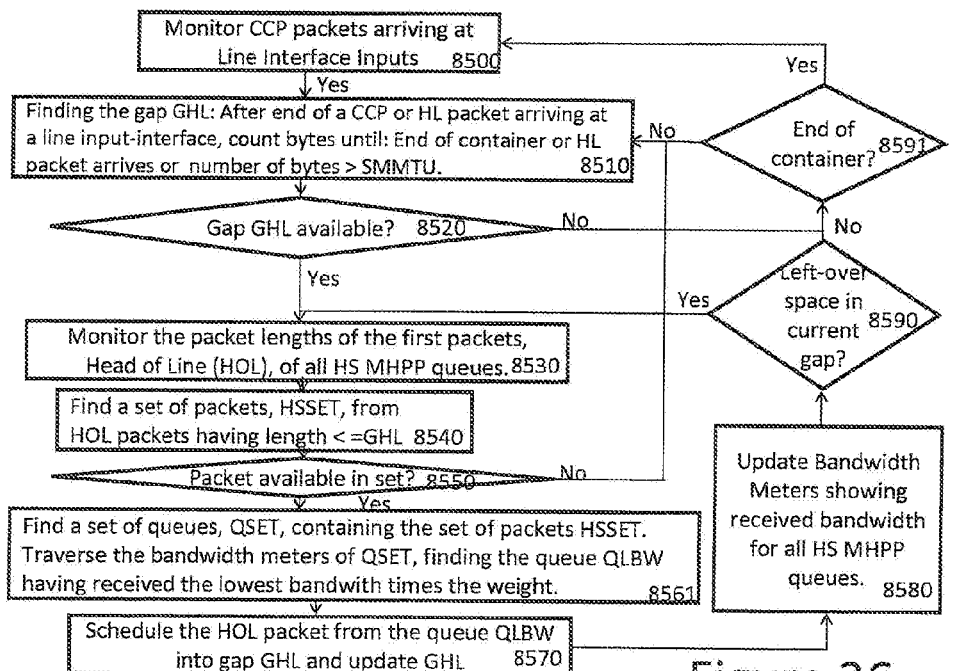
FIG. 36 is a flow diagram showing an algorithm for scheduling a hybrid-SM Multi-Hop Packet Path packet being selected from one of multiple queues, considering the length of the Head-of-Line packet in each queue, and the weighted bandwidth of each queue.

FIGS. 34-36 describe algorithms that can be used when an SM packet is transported as a hybrid-SM (HS) packet.

FIG. 34 illustrates an algorithm for scheduling a hybrid-SM Multi-Hop Packet Path packet selected from one of multiple queues, where the selection is based on considering the length of the Head-of-Line packet in each queue. The Line Monitor Unit 130 monitors all the packets, including the container-control packets, arriving at the Line Interface inputs 8400. To find the gap size if a container-control packet or an HL packet arrives, the bytes are counted until another container or another HL packet arrives, or until the number of bytes is larger than SMMTU, 8410. If a gap is available 8420, the packet lengths of the first packets (Head-of-Line packets) in all the hybrid-SM (HS) Multi-Hop Packet Path queues are monitored 8430 to find a set of packets (HSSET) with Head-of-Line packets having length smaller or equal to GHL 8440. If there is a packet in HSSET 8450, the longest packet in HSSET is scheduled to a Line Interface Output and GHL is updated 8460. If there is leftover space in the GHL 8470, the algorithm starts over with monitoring of the hybrid-SM (HS) Multi-Hop Packet Path queues to find a new HSSET. On the other hand, if there is no leftover capacity in the gap, the algorithm checks if there are more gaps in the container, and if there is still a gap, the process starts over by finding the gap size. If there are no more gaps, the algorithm starts from the beginning 8480.

FIG. 35 illustrates an algorithm for scheduling a hybrid-SM (HS) Multi-Hop Packet Path packet selected from one of multiple queues, where the selection is based on considering the length of the Head-of-Line packet in each queue, and the bandwidth each queue receives. In the algorithm, the scheduler finds the set of queues (QSET) containing the set of possible packets (HSSET). The scheduler then traverses the bandwidth meters of QSET and selects the queue having received the lowest bandwidth (QLBW) 8560. A hybrid-SM packet from the selected queue QLBW is then scheduled. GHL is updated 8570 and all bandwidth meters for hybrid-SM Multi-Hop Packet Path are also updated 8580.

FIG. 36 is similar to FIG. 35, except the bandwidths for each of the queues are not shared equally but according to a weight system with a specific weight assigned to each of the queues 8561.

The scheduling of hybrid-SM packets and/or SM packets follows an algorithm for optimizing insertion and throughput of traffic. The algorithm may be a first packet (Head-of-Line packet) gap-fitting algorithm, a fair-bandwidth-sharing algorithm, a longest-packet-fitting-the-gap algorithm, a queue-bandwidth-sharing-with-weighting algorithm, or a combination of these algorithms. Other scheduling algorithms may be used. Overall, depending on parameter setting, the Optimized Integrated Hybrid Traffic Node dynamically selects the scheduling algorithm that achieves the most optimal processing of SM traffic.

Figure 37:
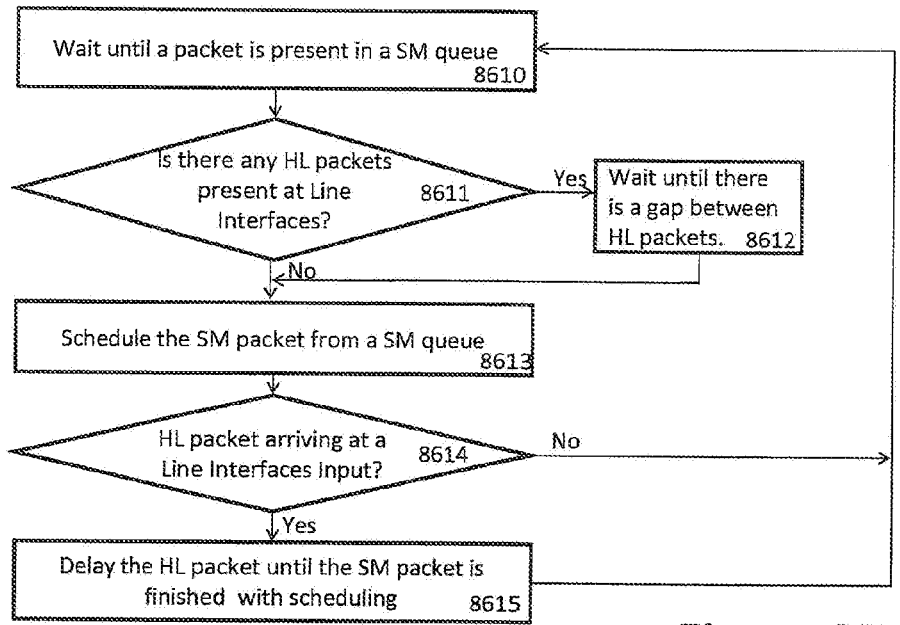
FIG. 37 is a flow diagram showing an algorithm for delaying HL traffic with a minimum and variable delay, when scheduling SM NPHH traffic.

In some embodiments of the Optimum Integrated Hybrid Traffic Process, HL traffic can be delayed until an SM packet is scheduled. FIG. 37 illustrates an algorithm for delaying HL traffic with a minimum and variable delay while scheduling SM Next Hop Packet Path traffic. When an SM packet is present in an SM queue 8610, the Line Monitor Unit 130 checks if there is HL traffic on a hybrid line 8611. If there is HL traffic, the scheduling of SM traffic waits until there is a gap between HL packets 8612. However, if there is no HL traffic and if there is a vacant gap available, then an SM packet from an SM queue is scheduled 8613. If an HL packet arrives while an SM packet is being scheduled 8614, then the HL packet is delayed until the SM packet is finished with scheduling 8615. Overall, the Optimized Integrated Hybrid Traffic Node can be versatile and dynamically select the scheduling algorithm that achieves the most optimal and suitable processing of traffic.

In the adding sub-processes and algorithms, comprising buffering, sorting and scheduling of hybrid-SM and SM packets, as discussed above, the said packets may be grouped. The grouping alternatives for hybrid-SM packets and SM packets include: single, burst, sequence, containers, super-container, or a combination of these, and in addition each group may have subgroups. Other grouping options are possible.

For controlling and administrating a number of line circuits and line paths in an integrated hybrid network, the Central Unit 139,140 in the Optimized Integrated Hybrid Traffic Node can be equipped with a Management and Control layer over the Functional Data layer.

Figure 38:
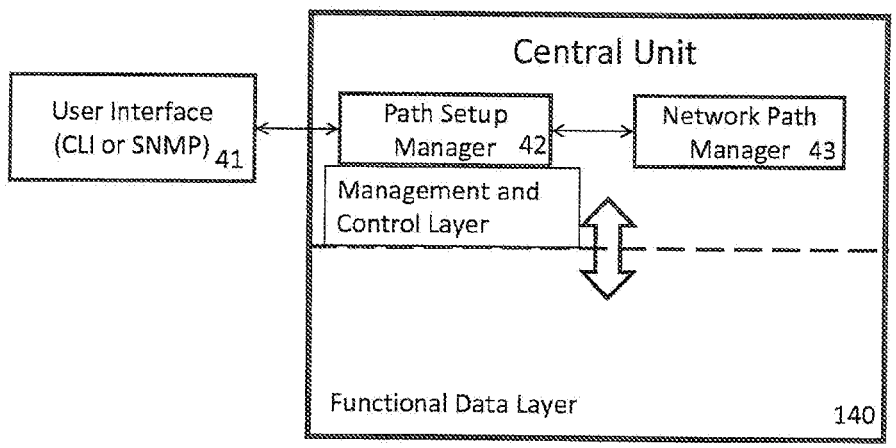
FIG. 38 is a schematic drawing showing the Management and Control Layer in a Central Unit comprising the Path Setup blocks.

FIG. 38 illustrates a Path Setup block diagram overview of the Central Unit 139, 140. In the Management and Control layer, there is a Path Setup Manager 42 and a Network Path Manager 43. The Path Setup Manager (PSM) sends setup request messages to the Network Path Manager (NPM).

The tasks of a Network Path Manager may be to contain information about allocated paths in a register, to establish and close down paths from an Ingress node to an Egress node, and to contain information about the surrounding network of nodes. When the Network Path Manager is setting up a path, the Network Path Manager gets information about possible routes through the network from other Network Path Managers. If a node falls out, the Network Path Manager may direct the traffic to alternative routes or paths, in other words administer a protection switching setup.

The Path Setup Manager is connected to a User Interface 41. The User Interface (UI) is outside the Central Unit 140 and is used to configure control parameters. The parameters can be used for controlling various mechanisms; for example: path setup, algorithm for queuing, algorithm for sorting queues, algorithm for SM scheduling, algorithm for GST queuing, GST scheduling, use of burst, use of sequence, and/or use of containers or super-containers. The UI may be a human to machine interface or a machine to machine interface and may give input to a Path Setup Manager through a command interface, for example with use of a Command Line Interface (CLI) or a Simple Network Management Protocol (SNMP).

Figure 39:
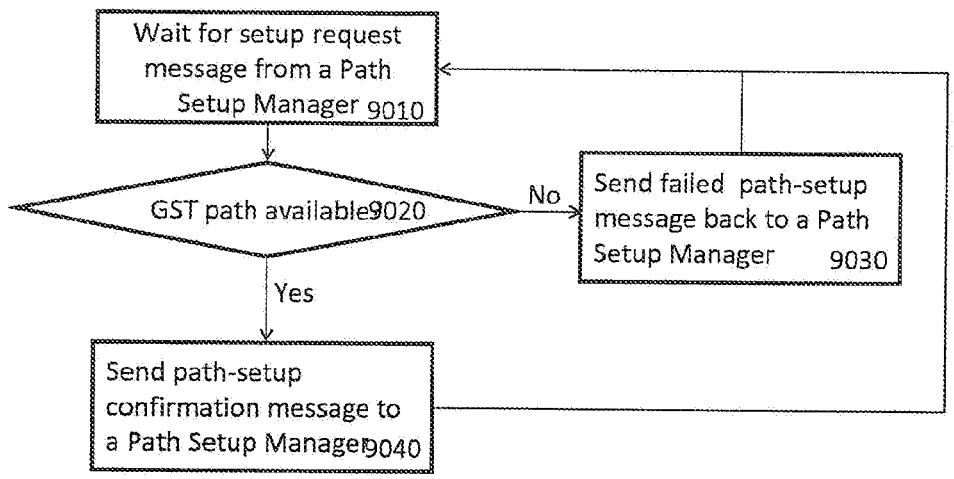
FIG. 39 is a flow diagram showing an algorithm for allocating a GST path with a Network Path Manager.

FIG. 39 illustrates an algorithm for allocating a GST path by a Network Path Manager (NPM). The Network Path Manager waits for a setup request from the Path Setup Manager 9010, and when the Network Path Manager receives a request, it checks if there is a GST path available 9020. If no GST paths are available, the NPM sends a failed path setup message back to the Path Setup Manager 9030. If a GST path is available, a path is established, and a path setup confirmation message is sent from the NPM to the Path Setup Manager 9040.

Figure 40:
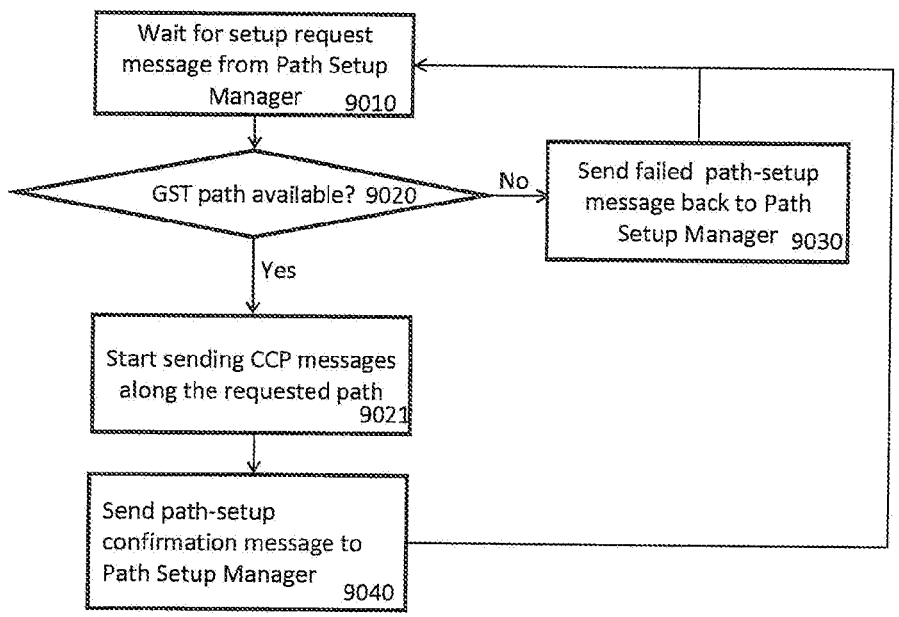
FIG. 40 is a flow diagram showing an algorithm for allocating a GST container path with a Network Path Manager.

A GST path supporting containers may be established. FIG. 40 illustrates an algorithm for allocating a GST container path by a Network Path Manager. The algorithm is similar to that shown in FIG. 39, except that an additional step is inserted into the algorithm. This step includes letting the Network Path Manager start sending container-control packet messages along the requested path to inform other nodes about the new GST path 9021.

Figure 41:
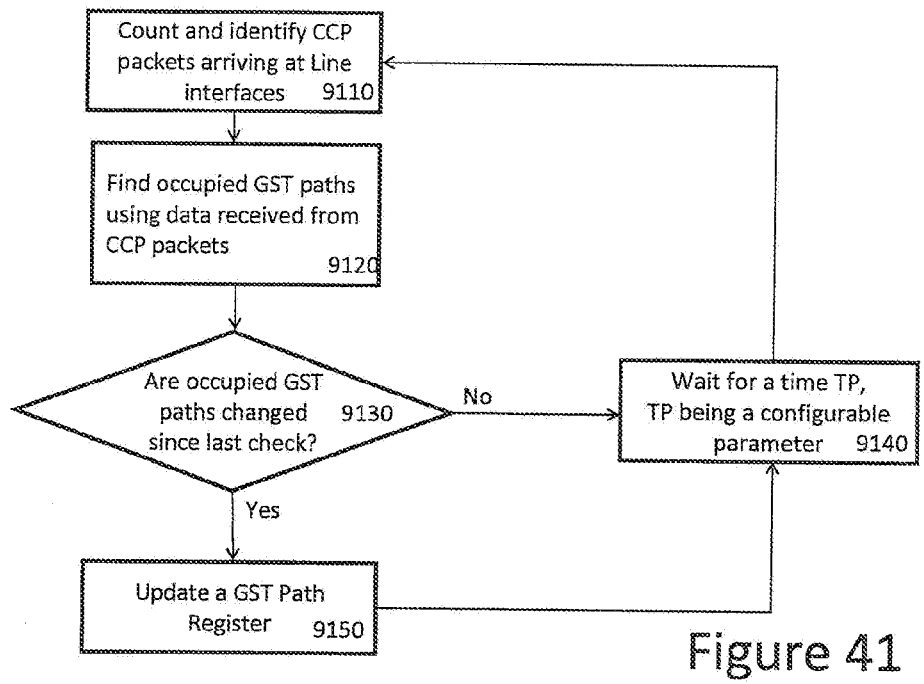
FIG. 41 is a flow diagram showing an algorithm for checking GST path availability with a Network Path Manager.

In a network using Optimized Integrated Hybrid Traffic Nodes, a number of GST paths may be occupied. FIG. 41 illustrates an algorithm for checking GST path availability. The NPM count and identify container-control packets arriving at the Line interfaces 9110 using information received from the Line Monitor unit(s) 130. The NPM finds the occupied GST paths by analyzing the data received from the arriving container-control packets 9120. If there is no change found in the occupied GST paths since the last check 9130, the NPM waits a time TP wherein TP is a configurable parameter, before starting the process over again 9140. If there is a change in occupied GST paths since last check, then the GST path register in the NPM is updated 9150, before the NPM waits a time TP 9140 and the process starts over again.

Figure 42:
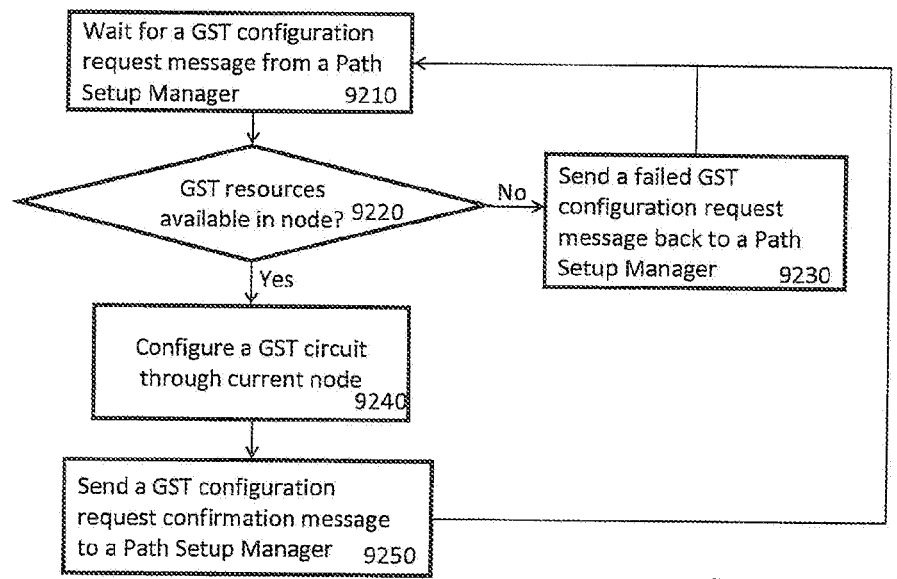
FIG. 42 is a flow diagram showing an algorithm for setting up a GST path through an intermediate node.

A GST path may transport traffic through a number of intermediate nodes. FIG. 42 illustrates an algorithm for setting up a GST path or circuit through an intermediate node. In the algorithm, a NPM waits for a GST configuration request message from a Path Setup Manager 9210. The NPM in the current node, checks if there are GST resources available in the node 9220. If there are no GST resources available, for example no vacant GST paths are found, the NPM sends a failed GST configuration request message back to the Path Setup Manager 9230. If there are GST resources available in the node, the NPM configures a GST path through the current node 9240 and sends a GST configuration request confirmation message to the Path Setup Manager.

Figure 43:
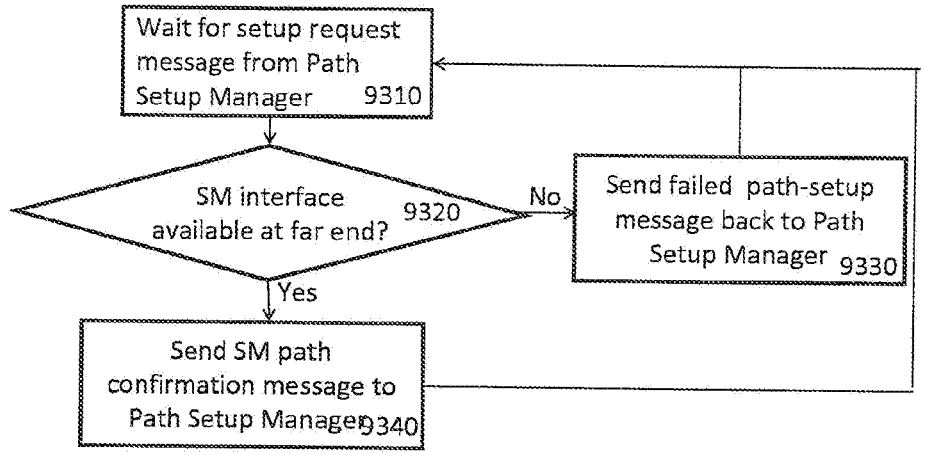
FIG. 43 is a flow diagram showing an algorithm for allocating an SM path with a Network Path Manager.

In the Optimum Integrated Hybrid Traffic Process, the GST paths are established by the Network Path Manager. However, the Network Path Manager may also allocate SM paths. FIG. 43 illustrates an algorithm for allocating an SM path by a Network Path Manager. In the algorithm, the Network Path Manager waits for a setup request from the Path Setup Manager 9310, and when a request is received, the Network Path Manager checks if there is an SM interface available at the far end of the path; i.e. if a far-end SM interface is capable of communicating with the local SM interface at this node 9320. If no interface is available, the NPM sends a failed path setup message back to the Path Setup Manager 9330. However, if SM interfaces and resources are available, a path is established and a path setup confirmation message is sent from the NPM to the Path Setup Manager 9340.

Finally, after packets have been buffered in queues, sorted and scheduled for selected paths, the packets are added into vacant gaps at the line-outputs.

The skilled person will appreciate that the order of events described with reference to the various embodiments is not always critical, and can be varied where appropriate. Some method steps may be carried out in parallel. Components described herein may be implemented in a single apparatus or on a single processor, but may, in other embodiments, be distributed across multiple processors or units. Method steps may be carried out in software or hardware or a combination of both.

Features described with reference to one embodiment or aspect of the invention may be used in any other embodiment and aspect wherever appropriate.

The invention claimed is:

1. A network switch comprising:
an optical input; and
an optical output,
the network switch being configured:
to receive one or more complete data packets, at a first data rate, at the optical input during a time window;
if an incomplete data packet is received at the optical input during the time window, to extend the time window and receive the complete data packet in an extended time window; and
to transmit all the complete data packets received in the time window or in the extended time window from the optical output at a second data rate, faster than the first data rate, with the complete data packets and any gaps between adjacent data packets of the complete data packets being in the same order as the network switch received said complete data packets and gaps, and with a substantially uniform time compression factor applied to the complete data packets and to any gaps between adjacent data packets of the complete data packets.

2. The network switch of claim 1, configured to receive the complete data packets asynchronously.

3. The network switch of claim 1, configured to transmit the complete data packets in a container.

4. The network switch of claim 3, configured to include container control information in the container.

5. The network switch of claim 4, wherein the container control information comprises information relating to a length or duration of the container.

6. The network switch of claim 1, configured to reserve one or more time slots of length equal to the duration of the time window plus the length of a maximum size of a data packet that the network switch may receive.

7. The network switch of claim 1, wherein the time compression factor is constant for a given time window or for a given communication session.

8. The network switch of claim 1, wherein the time compression factor is the ratio of the first data rate to the second data rate.

9. The network switch of claim 1, comprising a plurality of optical inputs and configured to aggregate data from said optical inputs on the optical output.

10. The network switch of claim 9, comprising a plurality of optical outputs and configured to aggregate data from a respective set of optical inputs on each optical output.

11. The network switch of claim 1, configured so that, if the time window has been extended by an amount of time, a next time window in respect of the optical input will start with a gap corresponding to the amount of extension.

12. The network switch of claim 1, wherein the original time window has a predetermined duration.

13. The network switch of claim 1, configured to schedule the received data packets on the optical output as soon as (i) the original time window has elapsed, and (ii) no incomplete data packet is in a receive buffer connected to the optical input.

14. The network switch of claim 1, further configured to:
convert received optical data packets to an electrical form to yield electrical data packets;
analyse each electrical data packet to determine whether it is a guaranteed-service packet or a statistically-multiplexed packet;

convert guaranteed-service packets to optical form and send each guaranteed-service packet from the optical output within a predetermined maximum time of receipt of the respective guaranteed-service packet at the optical input;

add statistically-multiplexed packets to an electronic queue; and determine, for a statistically-multiplexed packet in the electronic queue, whether the length of the statistically-multiplexed packet and the length of a gap between two outgoing guaranteed-service packets are such that the statistically-multiplexed packet will fit within the gap, and, if so, convert the statistically-multiplexed packet to optical form and send the statistically-multiplexed packet from the optical output between the two guaranteed-service packets, at said second data rate.

15. The network switch of claim 1, wherein the network switch is an optical add-drop multiplexer.

16. A network comprising:

an ingress node, and an egress node, wherein the ingress node comprises an optical input and an optical output, and is configured:

to receive one or more complete data packets, at a first data rate, at the optical input during a time window;

if an incomplete data packet is received at the optical input during the time window, to extend the time window and receive the complete data packet in an extended time window; and to transmit all the complete data packets received in the time window or extended time window from the optical output at a second data rate, faster than the first data rate, with the complete data packets and any gaps between adjacent data packets of the complete data packets being in the same order as the ingress node received said complete data packets and gaps, and with a substantially uniform time compression factor applied to the complete data packets and to any gaps between adjacent data packets of the complete data packets, and wherein the egress node comprises an optical input and an optical output, and is configured:

to receive one or more data packets, from the ingress node, at the optical input of the egress node at the second data rate, and to transmit the one or more data packets from the optical output of the egress node at the first data rate with an inverse of the time compression factor applied to the one or more data packets and to any gaps between adjacent data packets of the one or more data packets.

17. A method of processing optical data packets comprising:

receiving one or more complete data packets, at a first data rate, during a time window at an optical input;

in response to receiving an incomplete data packet at the optical input during the time window, extending the time window and receiving the complete data packet in an extended time window; and transmitting all the complete data packets received in the extended time window at a second data rate, faster than the first data rate, with the complete data packets and any gaps between adjacent data packets of the complete data packets being in the same order as said complete data packets and gaps were received, and with a substantially uniform time compression factor applied to the complete data packets and to any gaps between adjacent data packets of the complete data packets.

18. The method of claim 17, further comprising transmitting all the complete data packets in a container, said container including container control information that comprises information relating to a length or duration of the container.

19. The method of claim 17, wherein the time compression factor is the ratio of the first data rate to the second data rate.

20. The method of claim 17, further comprising receiving data packets on a plurality of optical inputs, and aggregating data from a respective set of the optical inputs on each of a plurality of optical outputs.

21. The method of claim 17, further comprising starting a transmission in a next time window with a gap corresponding to an amount of extension applied to said extended time window.

* * * * *